United States Patent
Fujie et al.

(10) Patent No.: US 9,963,605 B2
(45) Date of Patent: May 8, 2018

(54) COLORING COMPOSITION, INK JET RECORDING INK, AND INK JET RECORDING METHOD

(71) Applicant: FUJIFILM Corporation, Tokyo (JP)

(72) Inventors: Yoshihiko Fujie, Kanagawa (JP); Yusuke Sakai, Kanagawa (JP); Takashi Saitou, Kanagawa (JP); Keiichi Tateishi, Kanagawa (JP); Hiromi Kobayashi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days. days.

(21) Appl. No.: 15/464,821

(22) Filed: Mar. 21, 2017

(65) Prior Publication Data

US 2017/0190928 A1 Jul. 6, 2017

Related U.S. Application Data

(63) Continuation of application No. PCT/JP2015/077890, filed on Sep. 30, 2015.

(30) Foreign Application Priority Data

Sep. 30, 2014 (JP) ................................. 2014-202535
Jun. 5, 2015 (JP) ................................. 2015-115102

(51) Int. Cl.
 *B41J 2/01* (2006.01)
 *C09D 11/328* (2014.01)
 *C09B 11/28* (2006.01)

(52) U.S. Cl.
 CPC ............... *C09D 11/328* (2013.01); *B41J 2/01* (2013.01); *C09B 11/28* (2013.01)

(58) Field of Classification Search
 CPC ....... B41J 2/01; B41J 2/02; B41J 2/135; B41J 2/14; B41J 2/14008; B41J 2/14016; B41J 2/14201; B41J 2/14314
 See application file for complete search history.

(56) References Cited

U.S. PATENT DOCUMENTS

| | | |
|---|---|---|
| 2004/0194660 A1 | 10/2004 | Taguchi et al. |
| 2011/0067598 A1 | 3/2011 | Takahashi et al. |
| 2013/0319287 A1 | 12/2013 | Fujie et al. |
| 2014/0305336 A1 | 10/2014 | Fujie et al. |
| 2016/0312032 A1 | 10/2016 | Fujie et al. |

FOREIGN PATENT DOCUMENTS

| | | |
|---|---|---|
| EP | 2752465 A1 | 7/2014 |
| EP | 2781514 A1 | 9/2014 |
| JP | 9-241553 A | 9/1997 |
| JP | 2004-285269 A | 10/2004 |
| JP | 2011-148973 A | 8/2011 |
| JP | 2013-133394 A | 7/2013 |
| JP | 2014-5462 A | 1/2014 |
| JP | 5451556 B2 | 3/2014 |
| JP | 2015-193800 A | 11/2015 |
| JP | 2015-193801 A | 11/2015 |
| WO | 2015/105108 A1 | 7/2015 |
| WO | 2015/147112 A1 | 10/2015 |

OTHER PUBLICATIONS

Written Opinion dated Dec. 1, 2016, issued by the International Searching Authority in counterpart International Patent Application No. PCT/JP2015/077890 (PCT/ISA/237).
Office Action dated Jun. 27, 2017 by the Japanese Patent Office in counterpart Japanese PAtent Application No. 2016-552157.
Communication dated Jul. 25, 2017, issued by the European Patent Office in counterpart European Patent Application No. 15847235.7.
International Search Report, issued by International Searching Authority in corresponding International Application No. PCT/JP2015/077890, dated Jan. 12, 2016, (PCT/ISA/210).
Written Opinion, issued by International Searching Authority in corresponding International Application No. PCT/JP2015/077890, dated Jan. 12, 2016, (PCT/ISA/237).

*Primary Examiner* — Kristal Feggins
(74) *Attorney, Agent, or Firm* — Sughrue Mion, PLLC

(57) ABSTRACT

Provided are a coloring composition, an ink jet recording ink, and an ink jet recording method, the coloring composition including a betaine compound and at least one xanthene compound of a compound represented by Formula (1), a compound represented by Formula (2), a compound having a repeating unit represented by Formula (3), or a compound represented by Formula (4).

13 Claims, No Drawings

COLORING COMPOSITION, INK JET RECORDING INK, AND INK JET RECORDING METHOD

CROSS REFERENCE TO RELATED APPLICATION(S)

This is a continuation of International Application No. PCT/JP2015/077890 filed on Sep. 30, 2015, and claims priority from Japanese Patent Application No. 2014-202535 filed on Sep. 30, 2014, and priority from Japanese Patent Application No. 2015-115102 filed on Jun. 5, 2015, the entire disclosures of which are incorporated herein by reference.

BACKGROUND OF THE INVENTION

1. Field of the Invention

The present invention relates to a coloring composition, an ink jet recording ink, and an ink jet recording method.

2. Description of the Related Art

In the ink jet recording method, as is well-known in the related art, small ink droplets are jetted to be attached to a recording medium such as paper to perform printing. In this printing method, a high-resolution and high-quality image can be printed rapidly and simply using an inexpensive device. Particularly in color printing, recently, a technique of the printing method has been developed as an image forming method capable of replacing photography.

In a case where a color image is formed using the ink jet recording method, in general, at least a yellow ink, a magenta ink, a cyan ink, and a black ink are used. In these inks, for example, the following performances are required: that values of properties such as viscosity or surface tension are in appropriate ranges; that nozzle clogging is not likely to occur, storage stability are excellent, and a recording image having a high density can be obtained; and that light fastness, ozone fastness, water fastness, and moisture fastness are excellent.

In many cases, these performances are satisfied by using an aqueous ink in which water or a mixed solution of water and a water-soluble organic solvent is used as a main solvent. However, in particular, tone, vividness, light fastness, ozone fastness, water fastness, moisture fastness, and the like largely depend on colorants and additives, and various dyes and additives have been studied in the related art.

For example, JP2004-285269A discloses an ink composition including a betaine compound. JP5451556B discloses an ink composition which includes a xanthene compound having a specific structure.

SUMMARY OF THE INVENTION

However, in the dye field, further improvement in the performances is required, and a coloring composition capable of further improving image fastness such as moisture fastness or light fastness is required.

The present invention has been made in consideration of the above-described circumstances, and an object thereof is to provide a coloring composition having excellent moisture fastness and light fastness. In addition, another object of the present invention is to provide an ink jet recording ink including the above-described coloring composition, and an ink jet recording method using the ink jet recording ink.

The present inventors performed a thorough investigation and found that light fastness and moisture fastness can be improved using a coloring composition including a specific xanthene compound and a betaine compound, and effects thereof are significant. That is, the present invention relates to the following features.

[1] A coloring composition comprising a betaine compound and at least one of a compound represented by Formula (1), a compound represented by Formula (2), a compound having a repeating unit represented by Formula (3), or a compound represented by Formula (4).

Formula (1)

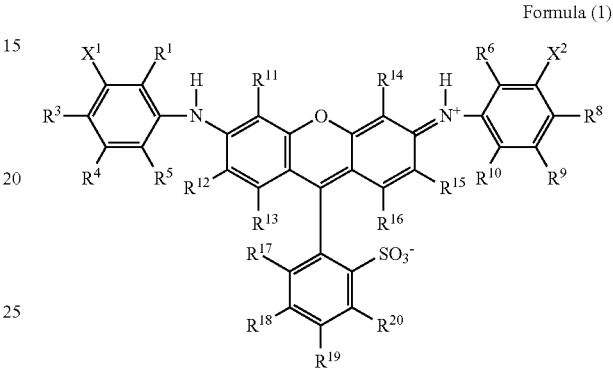

Formula (2)

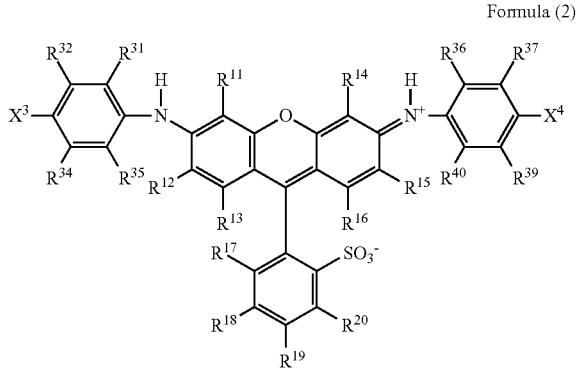

In Formula (1) and Formula (2), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ each independently represent a hydrogen atom or a substituent, and $X^1$, $X^2$, $X^3$, and $X^4$ each independently represent a hydroxyl group, a substituted or unsubstituted alkoxy group, a substituted or unsubstituted aryloxy group, a substituted or unsubstituted heterocyclic oxy group, a substituted or unsubstituted alkylamino group, a substituted or unsubstituted arylamino group, a substituted or unsubstituted heterylamino group, a substituted or unsubstituted carbonylamino group, a substituted or unsubstituted acyloxy group, a substituted or unsubstituted aminocarbonyloxy group, a substituted or unsubstituted sulfonylamino group, a substituted or unsubstituted alkoxycarbonylamino group, a substituted or unsubstituted aryloxycarbonylamino group, a substituted or unsubstituted ureido group, a substituted or unsubstituted alkylthio group, or a substituted or unsubstituted arylthio group.

Formula (3)

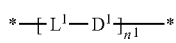

In Formula (3), $L^1$ represents a divalent linking group, and $D^1$ represents a partial structure obtained by removing two hydrogen atoms from the compound represented by Formula (1) or (2). $n^1$ represents 2 to 100. A plurality of $L^1$'s and a plurality of $D^1$'s may be the same as or different from each other.

Formula (4)

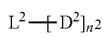

In Formula (4), $L^2$ represents a $n^2$-valent linking group, and $D^2$ represents a partial structure obtained by removing one hydrogen atom from the compound represented by Formula (1) or (2). $n^2$ represents an integer of 2 to 6. A plurality of $D^2$'s may be the same as or different from each other.

[2] The coloring composition according to [1],
in which the compound represented by Formula (1) or Formula (2) is a compound represented by the following Formula (1-1) or Formula (2-1).

Formula (1-1)

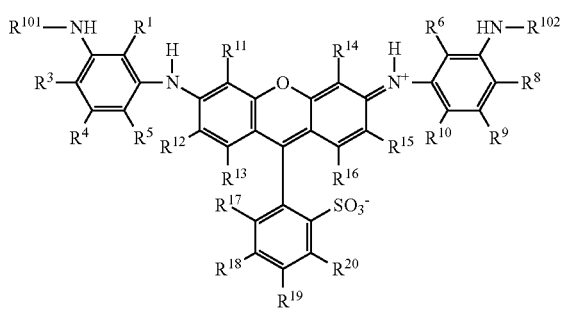

Formula (2-1)

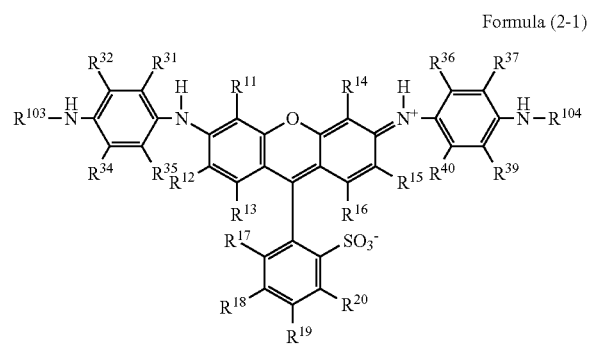

In Formula (1-1) and Formula (2-1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ each independently represent a hydrogen atom or a substituent, and $R^{101}$, $R^{102}$, $R^{103}$, and $R^{104}$ each independently represent a substituted or unsubstituted alkyl group, a substituted or unsubstituted aryl group, a substituted or unsubstituted heterocyclic group, a substituted or unsubstituted carbonyl group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group.

[3] The coloring composition according to [2],
in which $R^{101}$, $R^{102}$, $R^{103}$, and $R^{104}$ each independently represent a substituted or unsubstituted alkyl group, a substituted or unsubstituted aryl group, a substituted or unsubstituted heterocyclic group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group.

[4] The coloring composition according to any one of [1] to [3],
in which $R^1$, $R^5$, $R^6$, $R^{10}$, $R^{31}$, $R^{35}$, $R^{36}$, and $R^{40}$ in Formula (1), Formula (2), Formula (1-1), or Formula (2-1) each independently represent an alkyl group having 1 to 6 carbon atoms.

[5] The coloring composition according to any one of [1] to [4],
in which $R^4$ and $R^9$ in Formula (1) or Formula (1-1) each independently represent a sulfo group.

[6] The coloring composition according to any one of [1] to [4],
in which $R^{12}$ and $R^{15}$ in Formula (1) or Formula (1-1) each independently represent a sulfo group.

[7] The coloring composition according to any one of [1] to [6],
in which the betaine compound is a compound represented by the following Formula (A), $$(R_a)_p\text{—N-}[L_a\text{-}(COOM_a)_q]_r \qquad \text{Formula (A):}$$

In Formula (A), $R_a$ represents a hydrogen atom, an alkyl group, an aryl group, or a heterocyclic group. $L_a$ represents a divalent or higher linking group. $M_a$ represents a hydrogen atom, an alkali metal atom, an ammonium group, a protonated organic amine or nitrogen-containing heterocyclic group, or a quaternary ammonium ion group, and in a case where $M_a$ represents a counter ion of an ammonium ion including the N atom in Formula (A), this counter ion does not exist as a cation.

q represents an integer of 1 or more, r represents an integer of 1 to 4. p represents an integer of 0 to 4, p+r represents 3 or 4. In a case where p+r represents 4, the N atom is a protonated ammonium atom.

In a case where q represents 2 or more, $COOM_a$'s may be the same as or different from each other. In a case where r represents 2 or more, $L_a\text{-}(COOM_a)_q$'s may be the same as or different from each other. In a case where p represents 2 or more, $R_a$'s may be the same as or different from each other.

[8] The coloring composition according to any one of [1] to [7],
in which a content of at least one of the compound represented by Formula (1), the compound represented by Formula (2), the compound having the repeating unit represented by Formula (3), or the compound represented by Formula (4) is 1 to 20 mass %.

[9] The coloring composition according to any one of [1] to [8], in which a content of the betaine compound is 0.01 to 20 mass %.

[10] An ink jet recording ink comprising the coloring composition according to any one of [1] to [9].

[11] The ink jet recording ink according to [10] comprising a betaine compound, water, and at least one of a compound represented by Formula (1), a compound represented by Formula (2), a compound having a repeating unit represented by Formula (3), or a compound represented by Formula (4), in which a total mass of inorganic ions in the ink jet recording ink is 2 mass % or lower with respect to the mass of the ink jet recording ink.

[12] An ink jet recording method comprising forming an image using the coloring composition according to any one of [1] to [9] or using the ink jet recording ink according to [10] or [11].

According to the present invention, a coloring composition having excellent moisture fastness and light fastness can be provided. In addition, an ink jet recording ink including the above-described coloring composition, and an ink jet recording method using the ink jet recording ink can be provided.

DESCRIPTION OF THE PREFERRED EMBODIMENTS

Hereinafter, the present invention will be described in detail.

First, specific examples of a substituent in the present invention are defined as a substituent group A.

(Substituent Group A)

Examples of the substituent group A includes a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group, an acylamino group, an aminocarbonylamino group, an alkoxycarbonylamino group, an aryloxycarbonylamino group, a sulfamoylamino group, an alkyl- or aryl-sulfonylamino group, a mercapto group, an alkylthio group, an arylthio group, a heterocyclic thio group, a sulfamoyl group, an alkyl- or aryl-sulfinyl group, an alkyl- or aryl-sulfonyl group, an acyl group, an aryloxycarbonyl group, an alkoxycarbonyl group, a carbamoyl group, an aryl or heterocyclic azo group, an imido group, a phosphino group, a phosphinyl group, a phosphinyloxy group, a phosphinylamino group, a silyl group, and an ionic hydrophilic group. These substituents may further have a substituent, and examples of this substituent include a group selected from the above-described substituent group A.

Examples of the halogen atom include a fluorine atom, a chlorine atom, a bromine atom, and a iodine atom.

Examples of the alkyl group include a linear, branched, or cyclic substituted or unsubstituted alkyl group. In addition, a cycloalkyl group, a bicycloalkyl group, a tricycloalkyl group and the like having many ring structures are also included. Alkyl groups (for example, an alkoxy group or an alkylthio group) in substituents described below are also included in the examples of the above-described alkyl group.

As the alkyl group, an alkyl group having 1 to 30 carbon atoms is preferable, and examples thereof include a methyl group, an ethyl group, a n-propyl group, an i-propyl group, a t-butyl group, a n-octyl group, an eicosyl group, a 2-chloroethyl group, a 2-cyanoethyl group, and a 2-ethylhexyl group. As the cycloalkyl group, a substituted or unsubstituted cycloalkyl group having 3 to 30 carbon atoms is preferable, and examples thereof include a cyclohexyl group, a cyclopentyl group, and a 4-n-dodecylcyclohexyl group. As the bicycloalkyl group, a substituted or unsubstituted bicycloalkyl group having 5 to 30 carbon atoms is preferable, that is, a monovalent group obtained by removing one hydrogen atom from bicycloalkane having 5 to 30 carbon atoms is preferable, and examples thereof include a bicyclo[1,2,2]heptan-2-yl group and a bicyclo[2,2,2]octan-3-yl group.

Examples of the aralkyl group include a substituted or unsubstituted aralkyl group. As the substituted or unsubstituted aralkyl group, an aralkyl group having 7 to 30 carbon atoms is preferable, and examples thereof include a benzyl group and a 2-phenethyl group.

Examples of the alkenyl group include a linear, branched, or cyclic substituted or unsubstituted alkenyl group. In addition, a cycloalkenyl group and a bicycloalkenyl group are also included.

As the alkenyl group, a substituted or unsubstituted alkenyl group having 2 to 30 carbon atoms is preferable, and examples thereof include a vinyl group, an allyl group, a prenyl group, a geranyl group, and an oleyl group. As the cycloalkenyl group, a substituted or unsubstituted cycloalkenyl group having 3 to 30 carbon atoms is preferable, that is, a monovalent group obtained by removing one hydrogen atom from cycloalkene having 3 to 30 carbon atoms is preferable, and examples thereof include a 2-cyclopenten-1-yl group and a 2-cyclohexen-1-yl group. As the bicycloalkenyl group, a substituted or unsubstituted bicycloalkenyl group can be used. A substituted or unsubstituted bicycloalkenyl group having 5 to 30 carbon atoms is preferable, that is, a monovalent group obtained by removing one hydrogen atom from bicycloalkene having one double bond is preferable, and examples thereof include a bicyclo[2,2,1]hept-2-en-1-yl group and a bicyclo[2,2,2]oct-2-en-4-yl group.

As the alkynyl group, a substituted or unsubstituted alkynyl group having 2 to 30 carbon atoms is preferable, and examples thereof include an ethynyl group, a propargyl group, and a trimethylsilylethynyl group.

As the aryl group, a substituted or unsubstituted aryl group having 6 to 30 carbon atoms is preferable, and examples thereof include a phenyl group, a p-tolyl group, a naphthyl group, a m-chlorophenyl group, an o-hexadecanoylaminophenyl group.

As the heterocyclic group, a monovalent group obtained by removing one hydrogen atom from a 5- or 6-membered substituted or unsubstituted aromatic or nonaromatic heterocyclic compound is preferable, and a 5- or 6-membered aromatic heterocyclic group having 3 to 30 carbon atoms is more preferable, and examples thereof include a 2-furyl group, a 2-thienyl group, a 2-pyrimidinyl group, and a 2-benzothiazolyl group. Examples of the nonaromatic heterocyclic group include a morpholinyl group.

As the alkoxy group, a substituted or unsubstituted alkoxy group alkoxy group having 1 to 30 carbon atoms is preferable, and examples thereof include a methoxy group, an ethoxy group, an isopropoxy group, a t-butoxy group, a n-octyloxy group, and a 2-methoxyethoxy group.

As the aryloxy group, a substituted or unsubstituted aryloxy group having 6 to 30 carbon atoms is preferable, and examples thereof include a phenoxy group, a 2-methylphenoxy group, a 4-t-butylphenoxy group, a 3-nitrophenoxy group, and a 2-tetradecanoylaminophenoxy group.

As the silyloxy group, a substituted or unsubstituted silyloxy group having 0 to 20 carbon atoms is preferable, and examples thereof include a trimethylsilyloxy group and a diphenylmethylsilyloxy group.

As the heterocyclic oxy group, a substituted or unsubstituted heterocyclic oxy group having 2 to 30 carbon atoms is preferable, and examples thereof include a 1-phenyltetrazole-5-oxy group and a 2-tetrahydropyranyloxy group.

As the acyloxy group, a formyloxy group, a substituted or unsubstituted alkylcarbonyloxy group having 2 to 30 carbon atoms, or a substituted or unsubstituted arylcarbonyloxy group having 6 to 30 carbon atoms is preferable, and examples thereof include an acetyloxy group, a pivaloyloxy group, a stearoyloxy group, a benzoyloxy group, and a p-methoxyphenylcarbonyloxy group.

As the carbamoyloxy group, a substituted or unsubstituted carbamoyloxy group having 1 to 30 carbon atoms is preferable, and examples thereof include a N,N-dimethylcarbamoyloxy group, a N,N-diethylcarbamoyloxy group, a morpholinocarbonyloxy group, a N,N-di-n-octylaminocarbonyloxy group, and a N-n-octylcarbamoyloxy group.

As the alkoxycarbonyloxy group, a substituted or unsubstituted alkoxycarbonyloxy group having 2 to 30 carbon atoms is preferable, and examples thereof include a methoxycarbonyloxy group, an ethoxycarbonyloxy group, a t-butoxycarbonyloxy group, and an n-octylcarbonyloxy group.

As the aryloxycarbonyloxy group, a substituted or unsubstituted aryloxycarbonyloxy group having 7 to 30 carbon atoms is preferable, and examples thereof include a phenoxycarbonyloxy group, a p-methoxyphenoxycarbonyloxy group, and a p-n-hexadecyloxyphenoxycarbonyloxy group.

Examples of the amino group include an alkylamino group, an arylamino group, and a heterocyclic amino group. As the amino group, an amino group, a substituted or unsubstituted alkylamino group having 1 to 30 carbon atoms, a substituted or unsubstituted anilino group having 6 to 30 carbon atoms is preferable, and examples thereof include a methylamino group, a dimethylamino group, an anilino group, a N-methyl-anilino group, a diphenylamino group, and a triazinylamino group.

As the acylamino group, a formylamino group, a substituted or unsubstituted alkylcarbonylamino group having 1 to 30 carbon atoms, or a substituted or unsubstituted arylcarbonylamino group having 6 to 30 carbon atoms is preferable, and examples thereof include an acetylamino group, a pivaloylamino group, a lauroylamino group, a benzoylamino group, and a 3,4,5-tri-n-octyloxyphenyl carbonylamino group.

As the aminocarbonylamino group, a substituted or unsubstituted aminocarbonylamino group having 1 to 30 carbon atoms is preferable, and examples thereof include a carbamoylamino group, a N,N-dimethylaminocarbonylamino group, a N,N-diethylaminocarbonylamino group, and a morpholinocarbonylamino group.

As the alkoxycarbonylamino group, a substituted or unsubstituted alkoxycarbonylamino group having 2 to 30 carbon atoms is preferable, and examples thereof include a methoxycarbonylamino group, an ethoxycarbonylamino group, a t-butoxycarbonylamino group, a n-octadecyloxycarbonylamino group, and a N-methyl-methoxycarbonylamino group.

As the aryloxycarbonylamino group, a substituted or unsubstituted aryloxycarbonylamino group having 7 to 30 carbon atoms is preferable, and examples thereof include a phenoxycarbonylamino group, a p-chlorophenoxycarbonylamino group, and a m-n-octyloxyphenoxycarbonylamino group.

As the sulfamoylamino group, a substituted or unsubstituted sulfamoylamino group having 0 to 30 carbon atoms is preferable, and examples thereof include a sulfamoylamino group, a N,N-dimethylaminosulfonylamino group, and a N-n-octylaminosulfonylamino group.

As the alkyl- or aryl-sulfonylamino group, a substituted or unsubstituted alkylsulfonylamino group having 1 to 30 carbon atoms or a substituted or unsubstituted arylsulfonylamino group having 6 to 30 carbon atoms is preferable, and examples thereof include a methylsulfonylamino group, a butylsulfonylamino group, a phenylsulfonylamino group, a 2,3,5-trichlorophenylsulfonylamino group, and a p-methylphenylsulfonylamino group.

As the alkylthio group, a substituted or unsubstituted alkylthio group having 1 to 30 carbon atoms is preferable, and examples thereof include a methylthio group, an ethylthio group, and a n-hexadecylthio group.

As the arylthio group, a substituted or unsubstituted arylthio group having 6 to 30 carbon atoms is preferable, and examples thereof include a phenylthio group, a p-chlorophenylthio group, and a m-methoxyphenylthio group.

As the heterocyclic thio group, a substituted or unsubstituted heterocyclic thio group having 2 to 30 carbon atoms is preferable, and examples thereof include a 2-benzothiazolylthio group and a 1-phenyltetrazole-5-ylthio group.

As the sulfamoyl group, a substituted or unsubstituted sulfamoyl group having 0 to 30 carbon atoms is preferable, and examples thereof include a N-ethylsulfamoyl group, a N-(3-dodecyloxypropyl)sulfamoyl group, a N,N-dimethylsulfamoyl group, a N-acetylsulfamoyl group, a N-benzoylsulfamoyl group, and a N—(N'-phenylcarbamoyl)sulfamoyl group.

As the alkyl- or aryl-sulfinyl group, a substituted or unsubstituted alkylsulfinyl group having 1 to 30 carbon atoms or a substituted or unsubstituted arylsulfinyl group having 6 to 30 carbon atoms is preferable, and examples thereof include a methylsulfinyl group, an ethylsulfinyl group, a phenylsulfinyl group, and a p-methylphenylsulfinyl group.

As the alkyl- or aryl-sulfonyl group, a substituted or unsubstituted alkylsulfonyl group having 1 to 30 carbon atoms or a substituted or unsubstituted arylsulfonyl group having 6 to 30 carbon atoms is preferable, and examples thereof include a methylsulfonyl group, an ethylsulfonyl group, a phenylsulfonyl group, and a p-methylphenylsulfonyl group.

As the acyl group, a formyl group, a substituted or unsubstituted alkylcarbonyl group having 2 to 30 carbon atoms, a substituted or unsubstituted arylcarbonyl group having 7 to 30 carbon atoms, or a substituted or unsubstituted heterocyclic carbonyl group having 2 to 30 carbon atoms and being bonded to a carbonyl group through a carbon atom is preferable, and examples thereof include an acetyl group, a pivaloyl group, a 2-chloroacetyl group, a stearoyl group, a benzoyl group, a p-n-octyloxyphenylcarbonyl group, a 2-pyridylcarbonyl group, and a 2-furylcarbonyl group.

As the aryloxycarbonyl group, a substituted or unsubstituted aryloxycarbonyl group having 7 to 30 carbon atoms is preferable, and examples thereof include a phenoxycarbonyl group, an o-chlorophenoxycarbonyl group, a m-nitrophenoxycarbonyl group, and a p-t-butylphenoxycarbonyl group.

As the alkoxycarbonyl group, a substituted or unsubstituted alkoxycarbonyl group having 2 to 30 carbon atoms is preferable, and examples thereof include a methoxycarbonyl group, an ethoxycarbonyl group, a t-butoxycarbonyl group, and a n-octadecyloxycarbonyl group.

As the carbamoyl group, a substituted or unsubstituted carbamoyl group having 1 to 30 carbon atoms is preferable, and examples thereof include a carbamoyl group, a N-methylcarbamoyl group, a N,N-dimethylcarbamoyl group, a N,N-di-n-octylcarbamoyl group, and a N-(methylsulfonyl) carbamoyl group.

As the aryl- or heterocyclic azo group, a substituted or unsubstituted aryl azo group having 6 to 30 carbon atoms or a substituted or unsubstituted heterocyclic azo group having 3 to 30 carbon atoms is preferable, and examples thereof include a phenylazo group, a p-chlorophenylazo group, and a 5-ethylthio-1,3,4-thiadiazol-2-ylazo group.

As the imido group, for example, a N-succinimido group or a N-phthalimido group is preferable.

As the phosphino group, a substituted or unsubstituted phosphino group having 0 to 30 carbon atoms is preferable, and examples thereof include a dimethylphosphino group, a diphenylphosphino group, and a methylphenoxyphosphino group.

As the phosphinyl group, a substituted or unsubstituted phosphinyl group having 0 to 30 carbon atoms is preferable, and examples thereof include a phosphinyl group, a dioctyloxyphosphinyl group, and a diethoxyphosphinyl group.

As the phosphinyloxy group, a substituted or unsubstituted phosphinyloxy group having 0 to 30 carbon atoms is preferable, and examples thereof include a diphenoxyphosphinyloxy group and a dioctyloxyphosphinyloxy group.

As the phosphinylamino group, a substituted or unsubstituted phosphinylamino group having 0 to 30 carbon atoms is preferable, and examples thereof include a dimethoxyphosphinylamino group and a dimethylaminophosphinylamino group.

As the silyl group, a substituted or unsubstituted silyl group having 0 to 30 carbon atoms is preferable, and examples thereof include a trimethylsilyl group, a t-butyldimethylsilyl group, and a phenyldimethylsilyl group.

Examples of the ionic hydrophilic group include a sulfo group, a carboxyl group, a thiocarboxyl group, a sulfino group, a phosphono group, a dihydroxyphosphino group, and a quaternary ammonium group. Among these a sulfo group or a carboxyl group is more preferable. In addition, the ionic hydrophilic group may be a cation or an anion, and a state including a cation or an anion is called a salt. In addition, the carboxyl group, the phosphono group, or the sulfo group may be in the form of a salt, and examples of a counter cation which forms a salt with the carboxyl group, the phosphono group, or the sulfo group include an ammonium ion, an alkali metal ion (for example, a lithium ion, a sodium ion, or a potassium ion), and an organic cation (for example, a tetramethylammonium ion, a tetramethylguanidium ion, or tetramethylphosphonium). Among these, a lithium salt, a sodium salt, a potassium salt, or an ammonium salt is preferable, a sodium salt or a mixed salt containing a sodium salt as a major component is more preferable, and a sodium salt is most preferable.

In the present invention, in a case where a compound is a salt, the salt is dissociated and present in an water-soluble ink in the form of ions.

The present invention relates to a coloring composition comprising a betaine compound and at least one of a compound represented by Formula (1), a compound represented by Formula (2), a compound having a repeating unit represented by Formula (3), or a compound represented by Formula (4).

[Xanthene Compound]

The coloring composition according to the present invention includes at least one xanthene compound of the compound represented by Formula (1), the compound represented by Formula (2), the compound having the repeating unit represented by Formula (3), or the compound represented by Formula (4). The coloring composition according to the present invention may include only one kind or two or more kinds selected from the group consisting of the compound represented by Formula (1), the compound represented by Formula (2), the compound having the repeating unit represented by Formula (3), and the compound represented by Formula (4). It is preferable that the xanthene compound is soluble in water. Here, "soluble in water" represents that 0.5 mass % or higher of a substance is soluble in water at 25° C.

(Compound Represented by Formula (1) or (2))

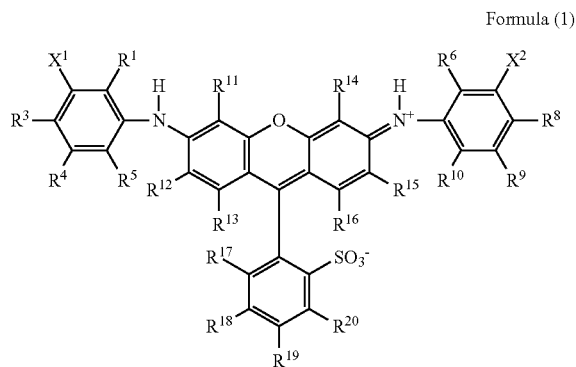

Formula (1):

Formula (2):

In Formula (1) and Formula (2), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ each independently represent a hydrogen atom or a substituent, and $X^1$, $X^2$, $X^3$, and $X^4$ each independently represent a hydroxyl group, a substituted or unsubstituted alkoxy group, a substituted or unsubstituted hydroxyl group, a substituted or unsubstituted alkoxy group, a substituted or unsubstituted aryloxy group, a substituted or unsubstituted heterocyclic oxy group, a substituted or unsubstituted alkylamino group, a substituted or unsubstituted arylamino group, a substituted or unsubstituted heterylamino group, a substituted or unsubstituted carbonylamino group, a substituted or unsubstituted acyloxy group, a substituted or unsubstituted aminocarbonyloxy group, a substituted or unsubstituted sulfonylamino group, a substituted or unsubstituted alkoxycarbonylamino group, a substituted or unsubstituted aryloxycarbonylamino group, a substituted or unsubstituted ureido group, a substituted or unsubstituted alkylthio group, or a substituted or unsubstituted arylthio group.

In Formula (1) and Formula (2), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ each independently represent a hydrogen atom or a substituent. In a case where $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ represent a substituent, the substituent is be selected from, for example, the substituent group A.

In Formula (1) and Formula (2), from the viewpoint of raw material availability and synthesis easiness, $R^1$, $R^5$, $R^6$, $R^{10}$, $R^{31}$, $R^{32}$, $R^{34}$, $R^{35}$, $R^{36}$, $R^{37}$, $R^{39}$, and $R^{40}$ each independently represent preferably a hydrogen atom, a substituted or unsubstituted alkyl group, a substituted or unsubstituted aryl group, a substituted or unsubstituted alkoxy group, a substituted or unsubstituted aryloxy group, a carboxyl group, or a halogen atom, more preferably a substituted or unsubstituted alkyl group, a substituted or unsubstituted aryl group, a substituted or unsubstituted alkoxy group, and still more preferably a substituted or unsubstituted alkyl group. As the alkyl group, an alkyl group having 1 to 6 carbon atoms is preferable, an alkyl group having 1 to 3 carbon atoms is more preferable, and a methyl group is still more preferable. In addition, in a case each group has a substituent, the substituent is selected from, for example, the substituent group A.

In Formula (1), from the viewpoint of raw material availability, synthesis easiness, light fastness, printing density, and saturation, $R^4$ and $R^9$ each independently represent preferably a hydrogen atom, a substituted or unsubstituted alkyl group, a substituted or unsubstituted aryl group, a substituted or unsubstituted alkoxy group, a substituted or unsubstituted aryloxy group, a substituted or unsubstituted amino group, a substituted or unsubstituted acylamino group, a substituted or unsubstituted alkoxycarbonylamino group, a substituted or unsubstituted alkylsulfonylamino group, a substituted or unsubstituted arylsulfonylamino group, a substituted or unsubstituted alkylureido group, a substituted or unsubstituted arylureido group, a sulfo group, a carboxyl group, or a halogen atom, more preferably a hydrogen atom, a substituted or unsubstituted acylamino group, a substituted or unsubstituted alkoxycarbonylamino group, a substituted or unsubstituted alkylsulfonylamino group, a substituted or unsubstituted arylsulfonylamino group, a substituted or unsubstituted alkylureido group, a substituted or unsubstituted arylureido group, or a sulfo group, and still more preferably a hydrogen atom or a sulfo group. In addition, in a case each group has a substituent, the substituent is selected from, for example, the substituent group A.

In Formula (1), from the viewpoint of raw material availability and synthesis easiness, $R^3$ and $R^8$ each independently represent preferably a hydrogen atom, a substituted or unsubstituted alkyl group, a substituted or unsubstituted aryl group, a substituted or unsubstituted alkoxy group, a substituted or unsubstituted aryloxy group, a substituted or unsubstituted amino group, a substituted or unsubstituted acylamino group, a substituted or unsubstituted alkoxycarbonylamino group, a substituted or unsubstituted alkylsulfonylamino group, a substituted or unsubstituted arylsulfonylamino group, a substituted or unsubstituted alkylureido group, a substituted or unsubstituted arylureido group, a sulfo group, a carboxyl group, or a halogen atom, more preferably a hydrogen atom, a substituted or unsubstituted alkyl group, or a sulfo group, and still more preferably a substituted or unsubstituted alkyl group. As the alkyl group, an alkyl group having 1 to 6 carbon atoms is preferable, an alkyl group having 1 to 3 carbon atoms is more preferable, and a methyl group is still more preferable. In addition, in a case each group has a substituent, the substituent is selected from, for example, the substituent group A.

In Formula (1) and Formula (2), from the viewpoint of raw material availability and synthesis easiness, $R^{11}$, $R^{14}$, $R^{13}$, $R^{16}$, $R^7$, $R^{18}$, $R^{19}$, and $R^{20}$ each independently represent preferably a hydrogen atom, a substituted or unsubstituted alkyl group, a substituted or unsubstituted aryl group, a substituted or unsubstituted alkoxy group, a substituted or unsubstituted aryloxy group, a hydroxy group, a halogen atom, or a sulfo group, more preferably a hydrogen atom, a hydroxy group, a halogen atom, or a sulfo group, and still more preferably a hydrogen atom. In addition, in a case each group has a substituent, the substituent is selected from, for example, the substituent group A.

In Formula (1) and Formula (2), from the viewpoint of raw material availability and synthesis easiness, $R^{12}$ and $R^{15}$ each independently represent preferably a hydrogen atom, a substituted or unsubstituted alkyl group, a substituted or unsubstituted aryl group, a halogen atom, or a sulfo group, and more preferably a hydrogen atom or a sulfo group. In addition, in a case each group has a substituent, the substituent is selected from, for example, the substituent group A.

In Formula (1) and Formula (2), $X^1$, $X^2$, $X^3$, and $X^4$ each independently represent a hydroxyl group, a substituted or unsubstituted alkoxy group, a substituted or unsubstituted aryloxy group, a substituted or unsubstituted heterocyclic oxy group, a substituted or unsubstituted alkylamino group, a substituted or unsubstituted arylamino group, a substituted or unsubstituted heterylamino group, a substituted or unsubstituted carbonylamino group, a substituted or unsubstituted acyloxy group, a substituted or unsubstituted aminocarbonyloxy group, a substituted or unsubstituted sulfonylamino group, a substituted or unsubstituted alkoxycarbonylamino group, a substituted or unsubstituted aryloxycarbonylamino group, a substituted or unsubstituted ureido group, a substituted or unsubstituted alkylthio group, or a substituted or unsubstituted arylthio group.

In a case where $X^1$, $X^2$, $X^3$, and $X^4$ represent substituted or unsubstituted alkoxy group, as the alkoxy group, an alkoxy group having 1 to 18 carbon atoms is preferable, and an alkoxy group having 1 to 8 carbon atoms is more preferable. The alkoxy group may be linear, branched, or cyclic. Specifically, as the alkoxy group, a methoxy group, an ethoxy group, a propyloxy group, an isopropyloxy group, a cyclohexyloxy group, or a 2-ethylhexyloxy group is preferable. In addition, in a case where the alkoxy group has a substituent, the substituent is selected from, for example, the substituent group A. As the substituent, an ionic hydrophilic group is preferable, a carboxyl group or a sulfo group is more preferable, and a carboxyl group is still more preferable.

In a case where $X^1$, $X^2$, $X^3$, and $X^4$ represent a substituted or unsubstituted aryloxy group, as the aryloxy group, an aryloxy group having 6 to 14 carbon atoms is preferable, an aryloxy group having 6 to 10 carbon atoms is more preferable, and a phenyloxy group is still more preferable. In addition, in a case where the aryloxy group has a substituent, the substituent is selected from, for example, the substituent group A. As the substituent, an ionic hydrophilic group is preferable, a carboxyl group or a sulfo group is more preferable, and a carboxyl group is still more preferable.

In a case where $X^1$, $X^2$, $X^3$, and $X^4$ represent a substituted or unsubstituted heterocyclic oxy group, as a heterocyclic group included in the heterocyclic oxy group, a triazine group, a thiazolyl group, a benzothiazolyl group, or a thiadiazolyl group is preferable. In addition, in a case the heterocyclic oxy group has a substituent, the substituent is selected from, for example, the substituent group A. As the substituent, a substituted or unsubstituted amino group or a substituted or unsubstituted sulfamoyl group is preferable, a substituted or unsubstituted alkylamino group or a substituted or unsubstituted alkylsulfamoyl group is more preferable, and an alkylamino group or alkylsulfamoyl group which is substituted with an ionic hydrophilic group (preferably a carboxyl group or a sulfo group, more preferably a carboxyl group) is still more preferable.

In a case where $X^1$, $X^2$, $X^3$, and $X^4$ represent a substituted or unsubstituted alkylamino group, the alkylamino group may be a dialkylamino group or a monoalkylamino group. From the viewpoint of synthesis easiness and solubility in water, it is preferable that the alkylamino group is a monoalkylamino group. The alkyl group in the alkylamino group is preferably an alkyl group having 1 to 8 carbon atoms and more preferably an alkyl group having 1 to 3 carbon atoms. In addition, in a case where the alkylamino group has a substituent, the substituent is selected from, for example, the substituent group A.

In a case where $X^1$, $X^2$, $X^3$, and $X^4$ represent a substituted or unsubstituted arylamino group, the arylamino group may be a diarylamino group or a monoarylamino group. From the viewpoint of synthesis easiness and solubility in water, it is preferable that the arylamino group is a monoarylamino group. As the arylamino group, an arylamino group having 6 to 14 carbon atoms is preferable, an arylamino group having 6 to 10 carbon atoms is more preferable, and a phenylamino group is still more preferable. In addition, in a case where the arylamino group has a substituent, the substituent is selected from, for example, the substituent group A.

In a case where $X^1$, $X^2$, $X^3$, and $X^4$ represent a substituted or unsubstituted heterylamino group, as a heterocyclic group included in the heterylamino group, a triazine group, a thiazolyl group, a benzothiazolyl group, or a thiadiazolyl group is preferable. In addition, in a case where the herterylamino group has a substituent, the substituent is selected from, for example, the substituent group A and is preferably a substituted or unsubstituted amino group or a substituted or unsubstituted sulfamoyl group.

In a case where $X^1$, $X^2$, $X^3$, and $X^4$ represent a substituted or unsubstituted carbonylamino group, as the substituted carbonylamino group, a substituted or unsubstituted alkylcarbonylamino group or a substituted or unsubstituted arylcarbonylamino group is preferable. In a case where $X^1$, $X^2$, $X^3$, and $X^4$ represent an unsubstituted carbonylamino group, the unsubstituted carbonylamino group is —NHCO— and is preferably bonded to $L^1$ in Formula (3) or $L^2$ in Formula (4).

In a case where $X^1$, $X^2$, $X^3$, and $X^4$ represent a substituted or unsubstituted alkylcarbonylamino group, the alkylcarbonylamino group is preferably a monoalkylcarbonylamino group from the viewpoint of synthesis easiness and solubility in water. The alkyl group in the alkylcarbonylamino group is preferably an alkyl group having 1 to 8 carbon atoms and more preferably an alkyl group having 1 to 3 carbon atoms. In addition, in a case where the alkylcarbonylamino group has a substituent, the substituent is selected from, for example, the substituent group A.

In a case where $X^1$, $X^2$, $X^3$, and $X^4$ represent a substituted or unsubstituted arylcarbonylamino group, the arylcarbonylamino group is preferably a monoarylcarbonylamino group from the viewpoint of synthesis easiness and solubility in water. The alkyl group in the alkylamino group is preferably an aryl group having 6 to 14 carbon atoms and more preferably an aryl group having 6 to 10 carbon atoms. Specifically, a phenyl group, a biphenyl group, or a naphthyl group is preferable, and a phenyl group is more preferable. In addition, in a case where the arylcarbonylamino group has a substituent, the substituent is selected from, for example, the substituent group A, and is preferably a carboxyl group, a hydroxyl group, a phosphono group, or an alkoxy group (preferably an alkoxy group having 1 to 6 carbon atoms, and more preferably a cyclohexyloxy group).

In a case where $X^1$, $X^2$, $X^3$, and $X^4$ represent substituted or unsubstituted acyloxy group, as the acyloxy group, an acyloxy group having 1 to 18 carbon atoms is preferable, and an acyloxy group having 1 to 8 carbon atoms is more preferable. Specific examples of the acyloxy group include an acetyloxy group and a benzoyloxy group. Among these, an acetyloxy group is preferable. In addition, in a case where the acyloxy group has a substituent, the substituent is selected from, for example, the substituent group A. As the substituent, an ionic hydrophilic group is preferable, a carboxyl group or a sulfo group is more preferable, and a carboxyl group is still more preferable.

In a case where $X^1$, $X^2$, $X^3$, and $X^4$ represent a substituted or unsubstituted aminocarbonyloxy group, as the aminocarbonyloxy group, an aminocarbonyloxy group having 1 to 18 carbon atoms is preferable, and an aminocarbonyloxy group having 1 to 8 carbon atoms is more preferable. Specific examples of the aminocarbonyloxy group include an unsubstituted aminocarbonyloxy group, a dimethylaminocarbonyloxy group, and a phenylaminocarbonyloxy group. Among these, an unsubstituted aminocarbonyloxy group or a dimethylaminocarbonyloxy group is preferable. In addition, in a case where the aminocarbonyloxy group has a substituent, the substituent is selected from, for example, the substituent group A. As the substituent, an ionic hydrophilic group is preferable, a carboxyl group or a sulfo group is more preferable, and a carboxyl group is still more preferable.

In a case where $X^1$, $X^2$, $X^3$, and $X^4$ represent a substituted or unsubstituted sulfonylamino group, as the substituted sulfonylamino group, a substituted or unsubstituted alkylsulfonylamino group or a substituted or unsubstituted arylsulfonylamino group is preferable. In a case where $X^1$, $X^2$, $X^3$, and $X^4$ represent an unsubstituted sulfonylamino group, the unsubstituted sulfonylamino group is —NHSO$_2$— and is preferably bonded to $L^1$ in Formula (3) or $L^2$ in Formula (4).

In a case where $X^1$, $X^2$, $X^3$, and $X^4$ represent a substituted or unsubstituted alkylsulfonylamino group, as the alkylsulfonylamino group, an alkylsulfonylamino group having 1 to 6 carbon atoms is preferable, an alkylsulfonylamino group having 1 to 3 carbon atoms is more preferable, and a methylsulfonyl group is still more preferable. In addition, in a case where the alkylsulfonylamino group has a substituent, the substituent is selected from, for example, the substituent group A.

In a case where $X^1$, $X^2$, $X^3$, and $X^4$ represent a substituted or unsubstituted arylsulfonylamino group, as the arylsulfonylamino group, an arylsulfonylamino group having 6 to 14 carbon atoms is preferable, an arylsulfonylamino group having 6 to 10 carbon atoms is more preferable, and a phenylsulfonylamino group is still more preferable. In a case where the arylsulfonylamino group has a substituent, the substituent is selected from, for example, the substituent group A and is preferably a carboxyl group.

In a case where $X^1$, $X^2$, $X^3$, and $X^4$ represent a substituted or unsubstituted alkoxycarbonylamino group, as an alkoxy group included in the alkoxycarbonylamino group, an alkoxy group having 1 to 8 carbon atoms is preferable, and an alkoxy group having 1 to 3 carbon atoms is more preferable. The alkoxycarbonylamino group may be linear, branched, or cyclic. In addition, in a case where the alkoxycarbonylamino group has a substituent, the substituent is selected from, for example, the substituent group A.

In a case where $X^1$, $X^2$, $X^3$, and $X^4$ represent a substituted or unsubstituted aryloxycarbonylamino group, as an aryloxy group included in the aryloxycarbonylamino group, an aryloxy group having 6 to 14 carbon atoms is preferable, and an aryloxy group having 6 to 10 carbon atoms is more preferable. As the aryloxycarbonylamino group, a phenyloxycarbonylamino group is more preferable. In addition, in a case where the aryloxycarbonylamino group has a substituent, the substituent is selected from, for example, the substituent group A.

In a case where $X^1$, $X^2$, $X^3$, and $X^4$ represent a substituted or unsubstituted ureido group, a substituent included in the substituted ureido group is selected from, for example, the substituent group A. As the substituent, a heterocyclic group, an alkyl group, or an aryl group is preferable, and an alkyl group or an aryl group is more preferable. The substituted ureido group may be a disubstituted ureido group or a monosubstituted ureido group. From the viewpoint of synthesis easiness and solubility in water, it is preferable that the substituted ureido group is a monosubstituted ureido group.

In a case where $X^1$, $X^2$, $X^3$, and $X^4$ represent a substituted or unsubstituted alkylthio group, as the alkylthio group, an alkylthio group having 1 to 18 carbon atoms is preferable, and an alkylthio group having 1 to 8 carbon atoms is more preferable. Specific examples of the alkylthio group include a methylthio group, an ethylthio group, and a propylthio group. Among these, a methylthio group or an ethylthio group is preferable, and a methylthio group is more preferable. In addition, in a case where the alkylthio group has a substituent, the substituent is selected from, for example, the substituent group A. As the substituent, an ionic hydrophilic group is preferable, a carboxyl group or a sulfo group is more preferable, and a carboxyl group is still more preferable.

In a case where $X^1$, $X^2$, $X^3$, and $X^4$ represent a substituted or unsubstituted arylthio group, as the arylthio group, an arylthio group having 6 to 14 carbon atoms is preferable, an arylthio group having 6 to 10 carbon atoms is more preferable, and a phenylthio group is still more preferable. In addition, in a case where the arylthio group has a substituent, the substituent is selected from, for example, the substituent group A. As the substituent, an ionic hydrophilic group is preferable, a carboxyl group or a sulfo group is more preferable, and a carboxyl group is still more preferable.

From the viewpoints of saturation and light fastness, $X^1$, $X^2$, $X^3$, and $X^4$ represent preferably a hydroxyl group, a substituted or unsubstituted alkylamino group, a substituted or unsubstituted arylamino group, a substituted or unsubstituted heterylamino group, a substituted or unsubstituted carbonylamino group, a substituted or unsubstituted acyloxy group, a substituted or unsubstituted sulfonylamino group, or a substituted or unsubstituted ureido group; more preferably a substituted or unsubstituted alkylamino group, a substituted or unsubstituted arylamino group, a substituted or unsubstituted heterylamino group, a substituted or unsubstituted carbonylamino group, a substituted or unsubstituted alkylsulfonylamino group, a substituted or unsubstituted arylsulfonylamino group, or a substituted or unsubstituted ureido group; and still more preferably a substituted or unsubstituted alkylcarbonylamino group, a substituted or unsubstituted arylcarbonylamino group, a substituted or unsubstituted alkylsulfonylamino group, a substituted or unsubstituted arylsulfonylamino group, or a substituted or unsubstituted ureido group.

In addition, from the viewpoint of solubility in water, it is preferable that at least one of $R^1$, $R^3$, $R^4$, $R^5$, $R^6$, $R^8$, $R^9$, $R^{10}$, $R^{11}$, $R^{14}$, $R^{13}$, $R^{16}$, $R^{17}$, $R^{18}$, $R^{19}$, $R^{20}$, $X^1$, or $X^2$ in Formula (1), or at least one of $R^{11}$, $R^{14}$, $R^{13}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, $R^{40}$, $X^3$, or $X^4$ in Formula (2) has an ionic hydrophilic group such as a carboxyl group, a sulfo group, or a phosphono group. The compound becomes soluble in water by having an ionic hydrophilic group. Examples of a counter cation of the ionic hydrophilic group include a hydrogen atom (proton), an alkali metal cation (a lithium ion, a sodium ion, or a potassium ion), and an ammonium ion.

The amount of the compound represented by Formula (1) or (2) dissolved in water at 25° C. is preferably 1 to 70 mass % and more preferably 2 to 50 mass % with respect to the amount of water. The number of ionic hydrophilic groups in the compound represented by Formula (1) or Formula (2) is preferably 1 to 9 and more preferably 1 to 5.

From the viewpoints of saturation and light fastness, it is preferable that the compound represented by Formula (1) or Formula (2) is a compound represented by the following Formula (1-1) or Formula (2-1).

Formula (1-1)

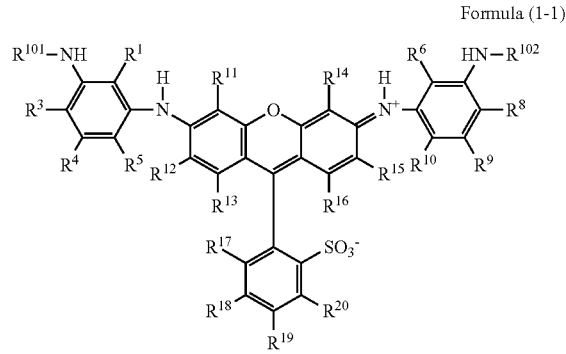

Formula (2-1)

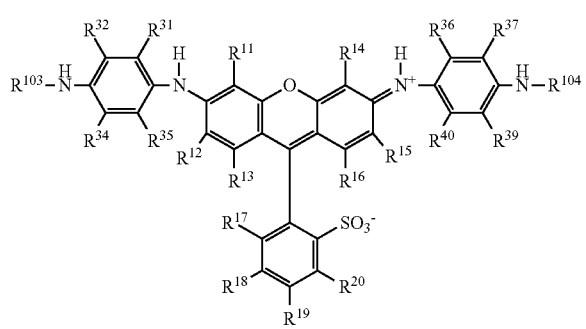

In Formula (1-1) and Formula (2-1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ each independently represent a hydrogen atom or a substituent, and $R^{101}$, $R^{102}$, $R^{103}$, and $R^{104}$ each independently represent a substituted or unsubstituted alkyl group, a substituted or unsubstituted aryl group, a substituted or unsubstituted heterocyclic group, a substituted or unsubstituted carbonyl group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ in Formula (1-1) and Formula (2-1) have the same specific examples and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ in Formula (1) and Formula (2).

In a case where $R^{101}$, $R^{102}$, $R^{103}$, and $R^{104}$ represent a substituted or unsubstituted alkyl group, as the alkyl group, an alkyl group having 1 to 8 carbon atoms is preferable, and an alkyl group having 1 to 3 carbon atoms is more preferable. In addition, in a case where the alkyl group has a substituent, the substituent is selected from, for example, the substituent group A.

In a case where $R^{101}$, $R^{102}$, $R^{103}$, and $R^{104}$ represent a substituted or unsubstituted aryl group, as the aryl group, an aryl group having 6 to 14 carbon atoms is preferable, an aryl group having 6 to 10 carbon atoms is more preferable, and a phenyl group is still more preferable. In addition, in a case where the aryl group has a substituent, the substituent is selected from, for example, the substituent group A.

In a case where $R^{101}$, $R^{102}$, $R^{103}$, and $R^{104}$ represent a substituted or unsubstituted heterocyclic group, as the heterocyclic group, a triazine group, a thiazolyl group, a benzothiazolyl group, or a thiadiazolyl group is preferable. In addition, in a case where the heterocyclic group has a substituent, the substituent is selected from, for example, the substituent group A and is preferably a substituted or unsubstituted amino group or a substituted or unsubstituted sulfamoyl group.

In a case where $R^{101}$, $R^{102}$, $R^{103}$, and $R^{104}$ represent a substituted or unsubstituted carbonyl group, as the substituted carbonyl group, a substituted or unsubstituted alkylcarbonyl group or a substituted or unsubstituted arylcarbonyl group is preferable. In a case where $R^{101}$, $R^{102}$, $R^{103}$, and $R^{104}$ represent an unsubstituted carbonyl group, the unsubstituted carbonyl group is —CO— and is preferably bonded to $L^1$ in Formula (3) or $L^2$ in Formula (4).

In a case where $R^{101}$, $R^{102}$, $R^{103}$, and $R^{104}$ represent a substituted or unsubstituted alkylcarbonyl group, as an alkyl group included in the alkylcarbonyl group, an alkyl group having 1 to 8 carbon atoms is preferable, and an alkyl group having 1 to 3 carbon atoms is more preferable. In addition, in a case where the alkylcarbonyl group has a substituent, the substituent is selected from, for example, the substituent group A.

In a case where $R^{101}$, $R^{102}$, $R^{103}$, and $R^{104}$ represent a substituted or unsubstituted arylcarbonyl group, as an aryl group included in the arylcarbonyl group, an aryl group having 6 to 14 carbon atoms is preferable, and an aryl group having 6 to 10 carbon atoms is more preferable. As the arylcarbonyl group, specifically, a phenylcarbonyl group, a biphenylcarbonyl group, or a naphtylcarbonyl group is preferable, and a phenylcarbonyl group is more preferable. In addition, in a case where the arylcarbonyl group has a substituent, the substituent is selected from, for example, the substituent group A, and is preferably a carboxyl group, a hydroxyl group, a phosphono group, or an alkoxy group (preferably an alkoxy group having 1 to 6 carbon atoms, and more preferably a cyclohexyloxy group).

In a case where $R^{101}$, $R^{102}$, $R^{103}$, and $R^{104}$ represent a substituted or unsubstituted sulfonyl group, as the substituted sulfonyl group, a substituted or unsubstituted alkylsulfonyl group or a substituted or unsubstituted arylsulfonyl group is preferable. In a case where $R^{101}$, $R^{102}$, $R^{103}$, and $R^{104}$ represent an unsubstituted sulfonyl group, the unsubstituted sulfonyl group is —SO$_2$— and is preferably bonded to $L^1$ in Formula (3) or $L^2$ in Formula (4).

In a case where $R^{101}$, $R^{102}$, $R^{103}$, and $R^{104}$ represent a substituted or unsubstituted alkylsulfonyl group, as the alkylsulfonyl group, an alkylsulfonyl group having 1 to 86 carbon atoms is preferable, an alkylsulfonyl group having 1 to 3 carbon atoms is more preferable, and a methylsulfonyl group is still more preferable. In addition, in a case where the alkylsulfonyl group has a substituent, the substituent is selected from, for example, the substituent group A.

In a case where $R^{101}$, $R^{102}$, $R^{103}$, and $R^{104}$ represent a substituted or unsubstituted arylsulfonyl group, as the arylsulfonyl group, an arylsulfonyl group having 6 to 14 carbon atoms is preferable, an arylsulfonyl group having 6 to 10 carbon atoms is more preferable, and a phenylsulfonyl group is still more preferable. In a case where the arylsulfonyl group has a substituent, the substituent is selected from, for example, the substituent group A and is preferably a carboxyl group.

In a case where $R^{101}$, $R^{102}$, $R^{103}$, and $R^{104}$ represent a substituted or unsubstituted alkoxycarbonyl group, as an alkoxy group included in the alkoxycarbonyl group, an alkoxy group having 1 to 8 carbon atoms is preferable, and an alkoxy group having 1 to 3 carbon atoms is more preferable. In addition, in a case where the alkoxycarbonyl group has a substituent, the substituent is selected from, for example, the substituent group A.

In a case where $R^{101}$, $R^{102}$, $R^{103}$, and $R^{104}$ represent a substituted or unsubstituted aryloxycarbonyl group, as an aryloxy group included in the aryloxycarbonyl group, an aryloxy group having 6 to 14 carbon atoms is preferable, and an aryloxy group having 6 to 10 carbon atoms is more preferable. As the aryloxycarbonyl group, a phenyloxycarbonyl group is more preferable. In a case where the aryloxycarbonyl group has a substituent, the substituent is selected from, for example, substituent group A and is preferably a nitro group.

In a case where $R^{101}$, $R^{102}$, $R^{103}$, and $R^{104}$ represent a substituted or unsubstituted monoalkylaminocarbonyl group, it is preferable that the monoalkylaminocarbonyl group is represented by —CONHR$^{203}$. Here, $R^{203}$ represents an alkyl group having 1 to 12 carbon atoms, preferably an alkyl group having 1 to 10 carbon atoms, more preferably an alkyl group having 1 to 6 carbon atoms, still more preferably a methyl group, an ethyl group, an isopropyl group, a hexyl group, a 2-ethylhexyl group, a dodecyl group, or a cyclohexyl group, and even still more preferably an isopropyl group. In addition, in a case where the monoalkylaminocarbonyl group has a substituent, the substituent is selected from, for example, the substituent group A and is preferably a phenyl group, a carboxyl group, a substituted or unsubstituted amino group, or a hydroxyl group.

In a case where $R^{101}$, $R^{102}$, $R^{103}$, and $R^{104}$ represent a substituted or unsubstituted dialkylaminocarbonyl group, it is preferable that the dialkylaminocarbonyl group is represented by —CONR$^{204}$R$^{205}$. Here, R$^{204}$ and R$^{205}$ each independently represent an alkyl group having 1 to 10 carbon atoms, preferably an alkyl group having 1 to 6 carbon atoms, and more preferably a methyl group or an isopropyl group. In addition, in a case where the dialkylaminocarbonyl group has a substituent, the substituent is selected from, for example, the substituent group A, and is preferably a carboxyl group or an alkyloxycarbonyl group (preferably an alkyloxycarbonyl group having 2 to 6 carbon atoms, and more preferably an ethyloxycarbonyl group).

In a case where R$^{101}$, R$^{102}$, R$^{103}$, and R$^{104}$ represent a substituted or unsubstituted monoarylaminocarbonyl group, it is preferable that the monoarylaminocarbonyl group is represented by —CONHR$^{206}$. Here, R$^{206}$ represents an aryl group having 6 to 14 carbon atoms, preferably an aryl group having 6 to 12 carbon atoms, and more preferably an aryl group having 6 to 10 carbon atoms. Specifically, a phenyl group, a biphenyl group, or a naphthyl group is preferable, and a phenyl group is more preferable. In addition, in a case where the monoarylaminocarbonyl group has a substituent, the substituent is selected from, for example, the substituent group A, and is preferably a carboxyl group, a hydroxyl group, a phosphono group, or an alkoxy group (preferably an alkoxy group having 1 to 6 carbon atoms, and more preferably a cyclohexyloxy group).

In a case where R$^{101}$, R$^{102}$, R$^{103}$, and R$^{104}$ represent a substituted or unsubstituted diarylaminocarbonyl group, it is preferable that the diarylaminocarbonyl group is represented by —CONR$^{207}$R$^{208}$. Here, R$^{207}$ and R$^{208}$ each independently represent an aryl group having 6 to 14 carbon atoms, preferably an aryl group having 6 to 10 carbon atoms, and more preferably a phenyl group. In addition, in a case where the diarylaminocarbonyl group has a substituent, the substituent is selected from, for example, the substituent group A.

In a case where R$^{101}$, R$^{102}$, R$^{103}$, and R$^{104}$ represent a substituted or unsubstituted alkylarylaminocarbonyl group, it is preferable that the alkylarylaminocarbonyl group is represented by —CONR$^{209}$R$^{210}$. Here, R$^{209}$ represents an alkyl group having 1 to 12 carbon atoms, preferably an alkyl group having 1 to 10 carbon atoms, more preferably an alkyl group having 1 to 6 carbon atoms, still more preferably a methyl group, an ethyl group, an isopropyl group, a hexyl group, a 2-ethylhexyl group, a dodecyl group, or a cyclohexyl group, and even still more preferably a methyl group. R$^{210}$ represents an aryl group having 6 to 14 carbon atoms, preferably an aryl group having 6 to 12 carbon atoms, and more preferably an aryl group having 6 to 10 carbon atoms. Specifically, a phenyl group, a biphenyl group, or a naphthyl group is preferable, and a phenyl group is more preferable. In addition, in a case where the alkylarylaminocarbonyl group has a substituent, the substituent is selected from, for example, the substituent group A.

R$^{101}$, R$^{102}$, R$^{103}$, and R$^{104}$ each independently represent preferably a substituted or unsubstituted alkyl group, a substituted or unsubstituted aryl group, a substituted or unsubstituted heterocyclic group, a substituted or unsubstituted sulfonyl group, a substituted or unsubstituted alkoxycarbonyl group, a substituted or unsubstituted aryloxycarbonyl group, a carbamoyl group, a substituted or unsubstituted alkylcarbonyl group, a substituted or unsubstituted arylcarbonyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group; and more preferably a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group.

(Compound Having Repeating Unit Represented by Formula (3))

Formula (3):

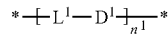

In Formula (3), L$^1$ represents a divalent linking group, and D$^1$ represents a partial structure obtained by removing two hydrogen atoms from the compound represented by Formula (1) or (2). n$^1$ represents 2 to 100. A plurality of L$^1$'s and a plurality of D$^1$'s may be the same as or different from each other.

In Formula (3), L$^1$ represents a divalent linking group and preferably a substituted or unsubstituted alkylene group, a substituted or unsubstituted arylene group, a substituted or unsubstituted alkenylene group, or a divalent linking group which is a combination of two or more kinds selected from the above-described groups.

The alkylene group may be linear, branched, or cyclic. The alkylene group has preferably 1 to 18 carbon atoms, more preferably 2 to 16 carbon atoms, and still more preferably 4 to 8 carbon atoms. Preferable specific examples of the alkylene group include a methylene group, an ethylene group, a propylene group, and a cyclohexylene group (preferably a 1,3-cyclohexylene group or a 1,4-cyclohexylene group). In a case where the alkylene group has a substituent, the substituent is selected from, for example, substituent group A and is preferably a 1,4-cyclohexylene group.

As the arylene group, an arylene group having 6 to 14 carbon atoms is preferable, an arylene group having 6 to 10 carbon atoms is more preferable, and a phenylene group (preferably, a 1,3-phenylene group or a 1,4-phenylene group) or a naphthylene group (preferably a 1,5-naphthylene group) is still more preferable. In addition, in a case where the aryloxy group has a substituent, the substituent is selected from, for example, the substituent group A. As the substituent, an ionic hydrophilic group is preferable, a carboxyl group or a sulfo group is more preferable, and a sulfo group is still more preferable.

As the alkenylene group, an alkenylene group having 2 to 18 carbon atoms is preferable, an alkenylene group having 2 to 12 carbon atoms is more preferable, and an alkenylene group having 2 to 8 carbon atoms is still more preferable.

Preferable specific examples of the alkenylene group include a vinylene group and a 2-butenylene group. In a case where the alkenylene group has a substituent, the substituent is selected from, for example, substituent group A and is preferably an alkyl group.

In addition, $L^1$ may represent the above-described divalent linking group which is a combination of two or more kinds selected from a substituted or unsubstituted alkylene group, a substituted or unsubstituted arylene group, and a substituted or unsubstituted alkenylene group.

Specific examples of the divalent linking group are the following linking groups. In the following linking groups, * represents a binding site.

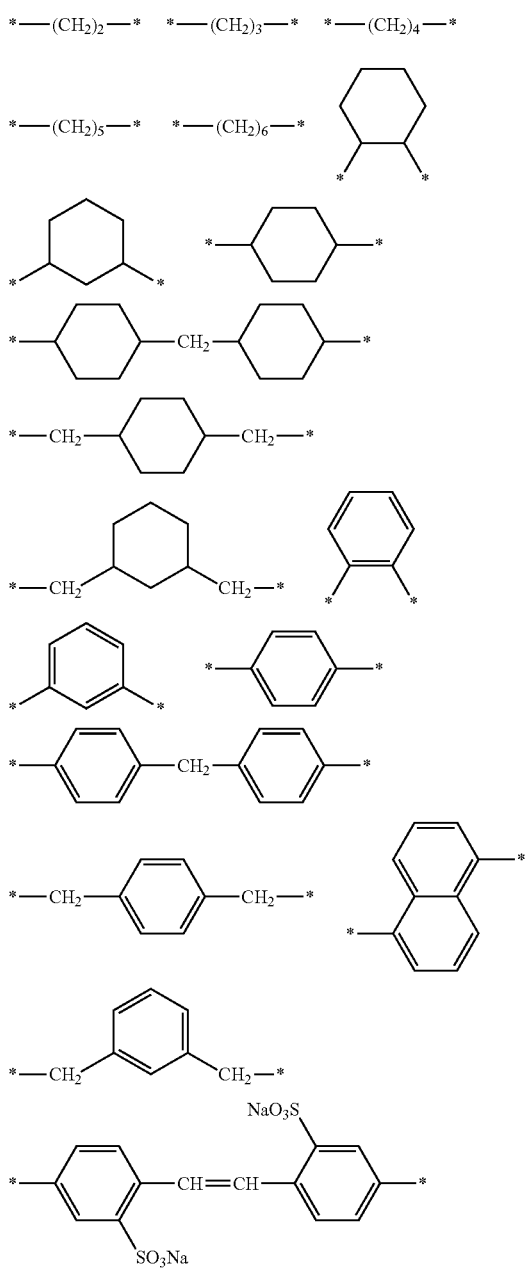

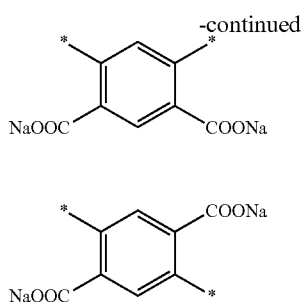

In Formula (3), $D^1$ represents a partial structure obtained by removing two hydrogen atoms from the compound represented by Formula (1) or (2). Formula (1) and Formula (2) are as described above.

From the viewpoint of solubility, it is preferable that at least one of $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, or $R^{20}$ in the partial structure represented by $D^1$ which is obtained by removing two hydrogen atoms from the compound represented by Formula (1), and at least one of $R^{31}$, $R^{32}$, $R^{34}$, $R^{35}$, $R^{36}$, $R^{37}$, $R^{39}$, $R^{40}$, $R^{11}$, $R^{12}$, $R^{13}$, $R^{14}$, $R^{15}$, $R^{16}$, $R^{17}$, $R^{18}$, $R^{19}$, or $R^{20}$ in the partial structure represented by $D^1$ which is obtained by removing two hydrogen atoms from the compound represented by Formula (2) have an ionic hydrophilic group such as a carboxyl group, a sulfo group, or a phosphono group, and it is more preferable that at least two have an ionic hydrophilic group. As the ionic hydrophilic group, a sulfo group is preferable. Examples of a counter cation of the ionic hydrophilic group include a hydrogen atom (proton), an alkali metal cation (a lithium ion, a sodium ion, or a potassium ion), and an ammonium ion. From the viewpoint of synthesis easiness (easy handleability of dye powder), the counter cation of the ionic hydrophilic group is preferably an alkali metal cation.

In Formula (3), $n^1$ represents 2 to 100. From the viewpoints of solubility and moisture fastness, $n^1$ represents preferably an integer of 2 to 50, more preferably 2 to 30, and still more preferably 2 to 15. It is not necessary that $n^1$ represents an integer. In a case where $n^1$ represents a decimal, the decimal is an average of a mixture and is calculated from molecular weight determination by gel permeation chromatography (GPC). In GPC described in this specification, unless specified otherwise, HLC-8220GPC (manufactured by Tosoh Corporation) is used, and TSKgel Super HZM-H, TSKgel Super HZ4000, or TSKgel Super HZ200 (manufactured by Tosoh Corporation) is used as a column. The number average molecular weight is calculated in terms of polystyrene. A carrier may be appropriately selected as long as it is soluble, and N-methylpyrrolidone (NMP) is used.

In addition, a terminal structure of the compound having the repeating unit represented by Formula (3) is not particularly limited and is formed of a compound used for synthesis.

From the viewpoints of saturation and light fastness, it is preferable that the compound having the repeating unit represented by Formula (3) is a compound having a repeating unit represented by any one of the following Formulae (3-1) to (3-4).

Formula (3-1)

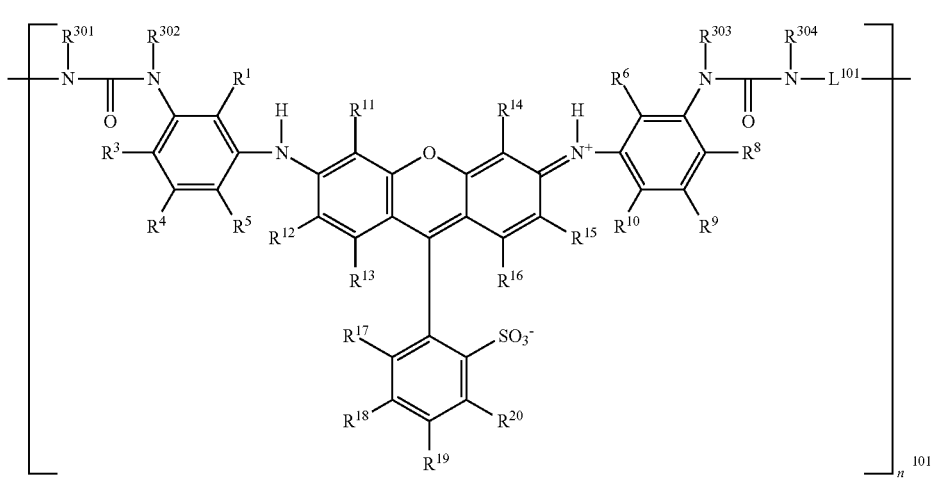

Formula (3-1)

In Formula (3-1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{301}$, $R^{302}$, $R^{303}$, and $R^{304}$ each independently represent a hydrogen atom or a substituent, $L^{101}$ represents a divalent linking group, and $n^{101}$ represents 2 to 100.

$n^{101}$ in Formula (3-1) has the same definition and the same preferable ranges as $n^1$ in Formula (3).

$L^{101}$ in Formula (3-1) has the same definition, the same specific example, and the same preferable ranges as $L^1$ in Formula (3).

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (3-1) have the same definitions, the same specific examples, and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (1).

In addition, from the viewpoint of solubility, it is preferable that at least one of $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, or $R^{20}$ in Formula (3-1) has an ionic hydrophilic group such as a carboxyl group, a sulfo group, or a phosphono group, and it is more preferable that at least two have an ionic hydrophilic group. As the ionic hydrophilic group, a sulfo group is preferable. Examples of a counter cation of the ionic hydrophilic group include a hydrogen atom (proton), an alkali metal cation (a lithium ion, a sodium ion, or a potassium ion), and an ammonium ion. From the viewpoint of synthesis easiness (easy handleability of dye powder), the counter cation of the ionic hydrophilic group is preferably an alkali metal cation.

In Formula (3-1), $R^{301}$, $R^{302}$, $R^{303}$, and $R^{304}$ each independently represent a hydrogen atom or a substituent. From the viewpoint of raw material availability, a hydrogen atom, a substituted or unsubstituted alkyl group, or a substituted or unsubstituted aryl group is preferable, a hydrogen atom or a substituted or unsubstituted alkyl group is more preferable, a hydrogen atom or an alkyl group having 1 to 6 carbon atoms is still more preferable, and a hydrogen atom is most preferable.

Formula (3-2):

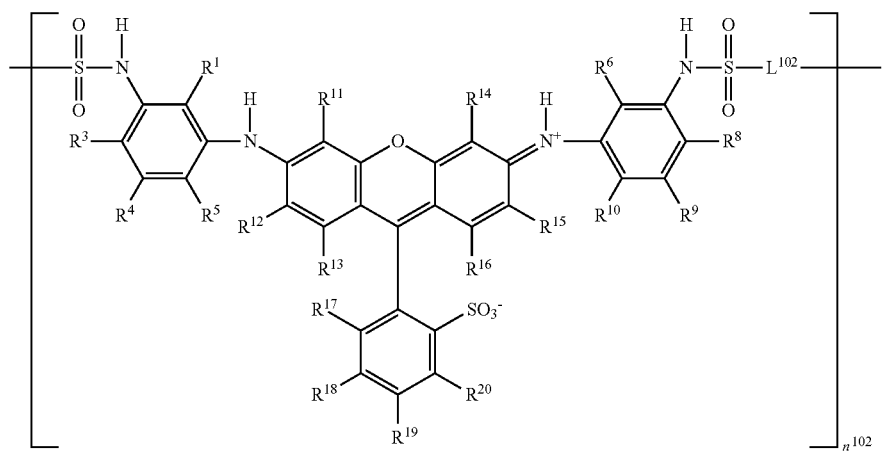

Formula (3-2)

In Formula (3-2), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent, $L^{102}$ represents a divalent linking group, and $n^{102}$ represents 2 to 100.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $L^{102}$, and $n^{102}$ in Formula (3-2) have the same definitions and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $L^{101}$, and $n^{101}$ in Formula (3-1).

Formula (3-3):

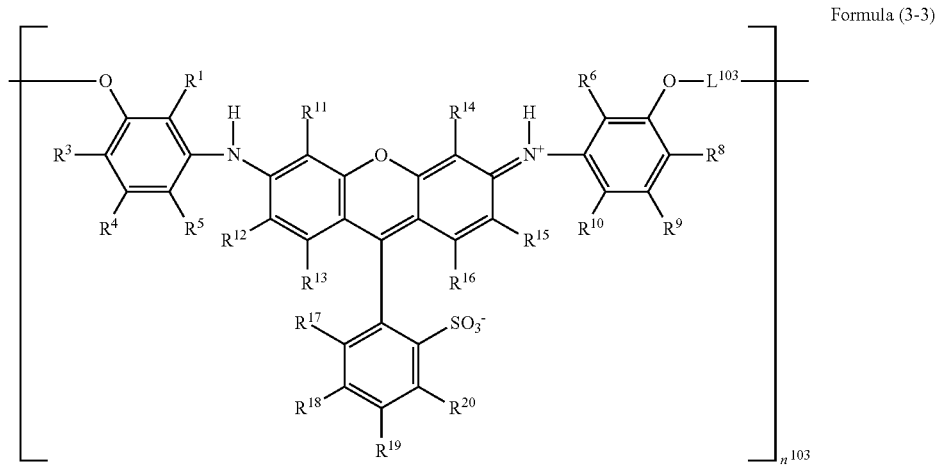

Formula (3-3)

In Formula (3-3), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent, $L^{103}$ represents a divalent linking group, and $n^{103}$ represents 2 to 100.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $L^{103}$, and $n^{103}$ in Formula (3-3) have the same definitions and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $L^{101}$, and $n^{101}$ in Formula (3-1).

Formula (3-4)

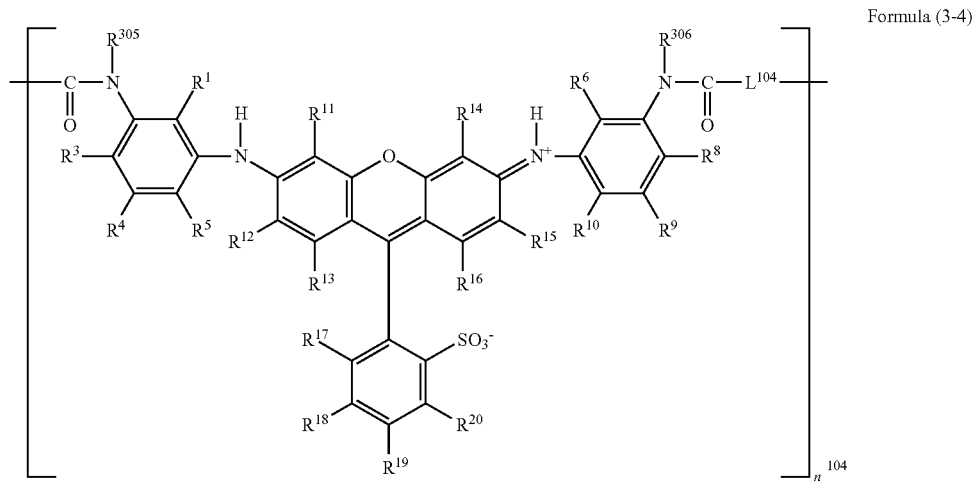

Formula (3-4)

In Formula (3-4), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{305}$, and $R^{306}$ each independently represent a hydrogen atom or a substituent, $L^{104}$ represents a divalent linking group, and $n^{104}$ represents 2 to 100.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $L^{104}$, and $n^{104}$ in Formula (3-4) have the same definitions and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $L^{101}$, and $n^{101}$ in Formula (3-1).

$R^{305}$ and $R^{306}$ in Formula (3-4) have the same definitions and the same preferable ranges as $R^{302}$ and $R^{303}$ in Formula (3-1), respectively.

(Compound Represented by Formula (4))

[Formula (4):

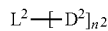

In Formula (4), $L^2$ represents a $n^2$-valent linking group, and $D^2$ represents a partial structure obtained by removing one hydrogen atom from the compound represented by Formula (1) or (2). $n^2$ represents an integer of 2 to 6. A plurality of $D^2$'s may be the same as or different from each other.

In Formula (4), $L^2$ represents a $n^2$-valent linking group, a substituted or unsubstituted alkylene group, a substituted or unsubstituted arylene group, a substituted or unsubstituted alkenylene group, an ether group, a triazine group, a cyanuric group, an amino group, a pentaerythritol derivative, a dipentaerythritol derivative, or a divalent to hexavalent linking group which is a combination of two or more kinds selected from the above-described groups.

$L^2$ in Formula (4) which represents an alkylene group, an arylene group, or an alkenylene group has the same specific examples and the same preferable ranges as $L^1$ in Formula (3) which represents an alkylene group, an arylene group, or an alkenylene group.

Specific examples of the linking group represented by $L^2$ are the following linking groups. In the following linking groups, * represents a binding site.

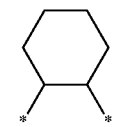

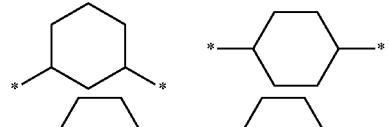

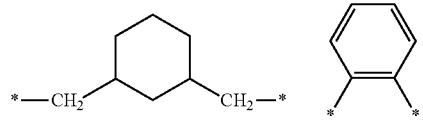

-continued

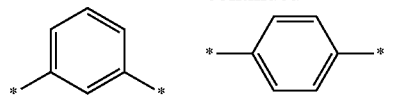

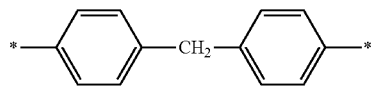

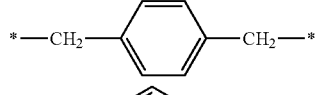

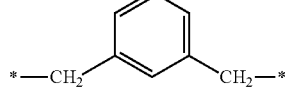

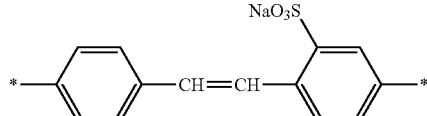

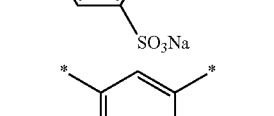

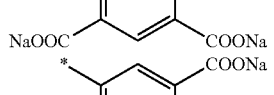

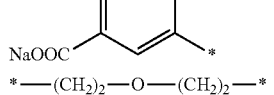

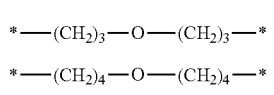

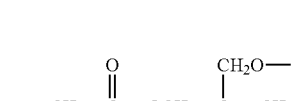

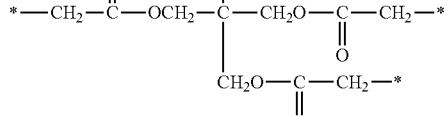

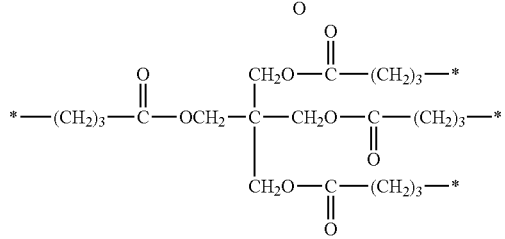

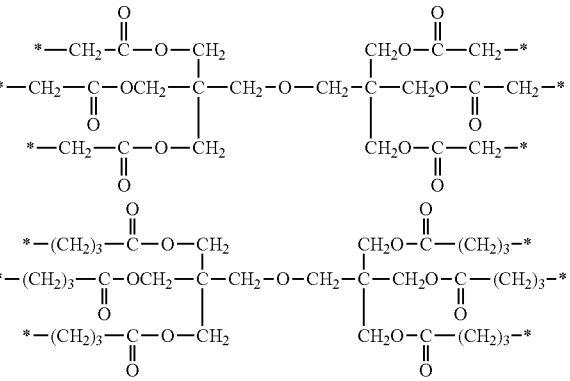

-continued

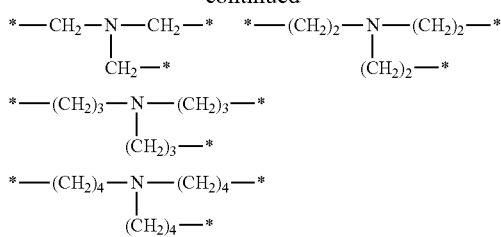

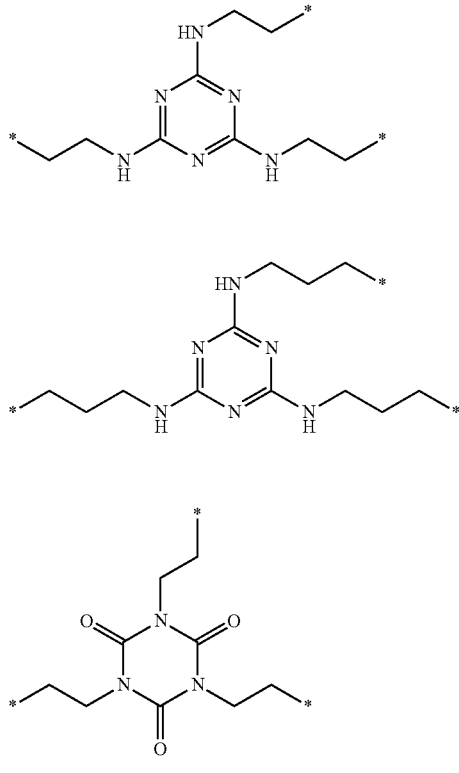

-continued

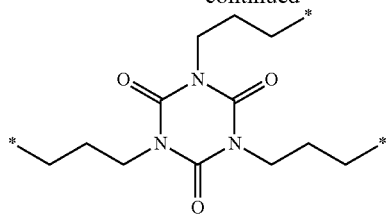

In Formula (4), $D^2$ represents a partial structure obtained by removing one hydrogen atom from the compound represented by Formula (1) or (2). Formula (1) or Formula (2) is as described above.

From the viewpoint of solubility, it is preferable that at least one of $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, or $R^{20}$ in the partial structure represented by $D^2$ which is obtained by removing one hydrogen atom from the compound represented by Formula (1), and at least one of $R^{31}$, $R^{33}$, $R^{24}$, $R^{35}$, $R^{36}$, $R^{38}$, $R^{39}$, $R^{40}$, $R^{11}$, $R^{12}$, $R^{13}$, $R^{14}$, $R^{15}$, $R^{16}$, $R^{17}$, $R^{18}$, $R^{19}$, or $R^{20}$ in the partial structure represented by $D^2$ which is obtained by removing two hydrogen atoms from the compound represented by Formula (2) have an ionic hydrophilic group such as a carboxyl group, a sulfo group, or a phosphono group, and it is more preferable that at least two have an ionic hydrophilic group. As the ionic hydrophilic group, a sulfo group is preferable. Examples of a counter cation of the ionic hydrophilic group include a hydrogen atom (proton), an alkali metal cation (a lithium ion, a sodium ion, or a potassium ion), and an ammonium ion. From the viewpoint of synthesis easiness (easy handleability of dye powder), the counter cation of the ionic hydrophilic group is preferably an alkali metal cation.

In Formula (4), $n^2$ represents an integer of 2 to 6. From the viewpoints of raw material availability, synthesis easiness, and solubility in water, $n^2$ represents preferably 2 or 3 and most preferably 2.

From the viewpoints of saturation and light fastness, it is preferable that the compound represented by Formula (4) is a compound represented by any one of the following Formulae (4-1) to (4-4).

Formula (4-1):

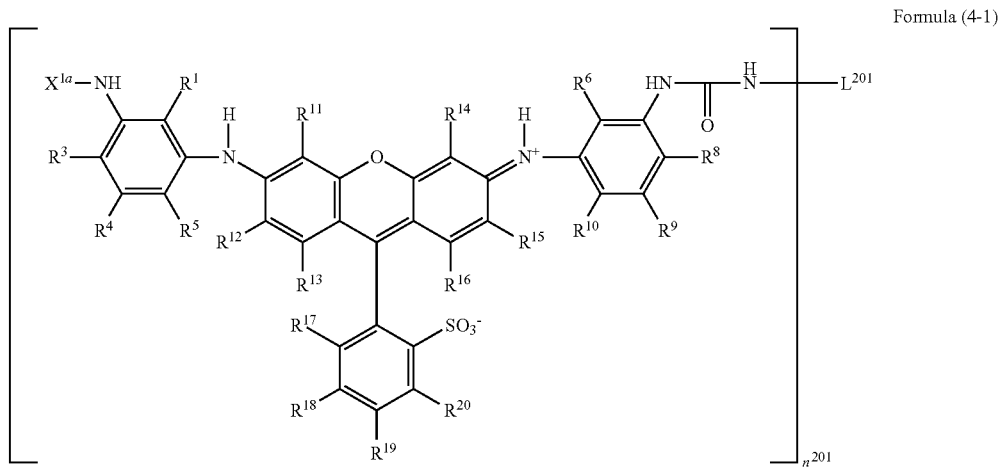

Formula (4-1)

In Formula (4-1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent, and $X^{1a}$ represents a substituted or unsubstituted alkyl group, a substituted or unsubstituted aryl group, a substituted or unsubstituted heterocyclic group, a substituted or unsubstituted carbonyl group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group. $n^{201}$ represents an integer of 2 to 6.

In Formula (4-1), $L^{201}$ represents a $n^{201}$-valent linking group.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (4-1) have the same definitions, the same specific examples, and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ in Formula (1).

In addition, from the viewpoint of solubility, it is preferable that at least one of $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, or $R^{20}$ in the partial structure represented by $D^2$ which is obtained by removing one hydrogen atom from the compound represented by Formula (1) has an ionic hydrophilic group such as a carboxyl group, a sulfo group, or a phosphono group, and it is more preferable that at least two have an ionic hydrophilic group. As the ionic hydrophilic group, a sulfo group is preferable. Examples of a counter cation of the ionic hydrophilic group include a hydrogen atom (proton), an alkali metal cation (a lithium ion, a sodium ion, or a potassium ion), and an ammonium ion. From the viewpoint of synthesis easiness (easy handleability of dye powder), the counter cation of the ionic hydrophilic group is preferably an alkali metal cation.

$X^{1a}$ in Formula (4-1) has the same definition, the same specific example, and the same preferable ranges as $R^{101}$ in Formula (1-1).

$L^{201}$ in Formula (4-1) has the same definition, the same specific example, and the same preferable ranges as $L^2$ in Formula (4).

$n^{201}$ in Formula (4-1) has the same definition and the same preferable ranges as $n^2$ in Formula (4).

Formula (4-2):

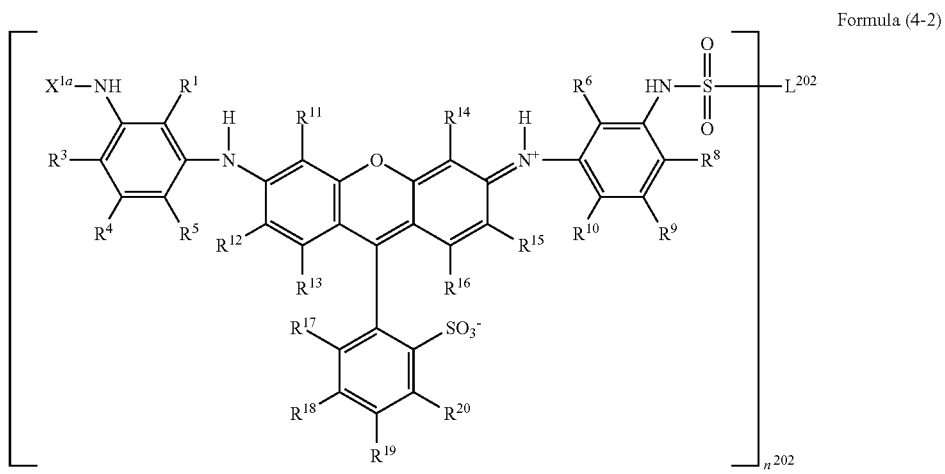

Formula (4-2)

In Formula (4-2), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent, and $X^{1a}$ represents a substituted or unsubstituted alkyl group, a substituted or unsubstituted aryl group, a substituted or unsubstituted heterocyclic group, a substituted or unsubstituted carbonyl group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group. $n^{202}$ represents an integer of 2 to 6.

In Formula (4-2), $L^{202}$ represents a $n^{202}$-valent linking group.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $X^{1a}$, $L^{202}$, and $n^{202}$ in Formula (4-2) have the same definitions and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $X^{1a}$, $L^{201}$, and $n^{201}$ in Formula (4-1).

Formula (4-3):

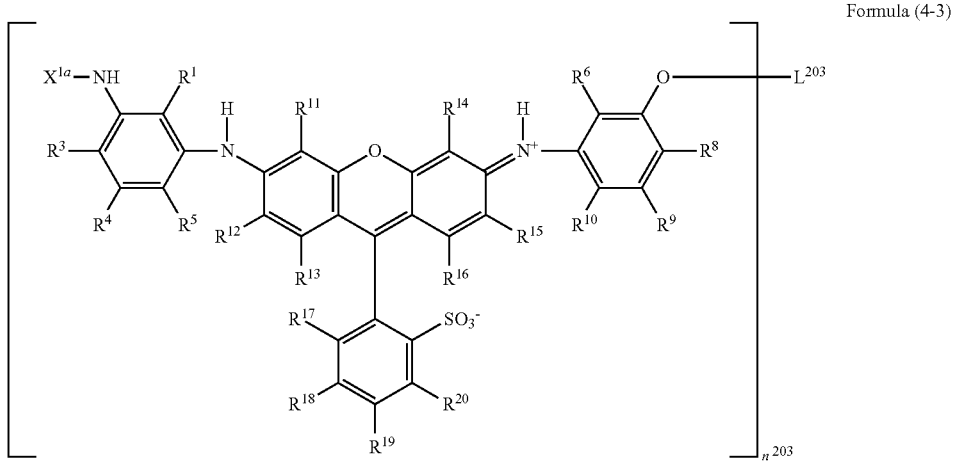

Formula (4-3)

In Formula (4-3), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, and $R^{20}$ each independently represent a hydrogen atom or a substituent, and $X^{1a}$ represents a substituted or unsubstituted alkyl group, a substituted or unsubstituted aryl group, a substituted or unsubstituted heterocyclic group, a substituted or unsubstituted carbonyl group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group. $n^{203}$ represents an integer of 2 to 6.

In Formula (4-3), $L^{203}$ represents a $n^{203}$-valent linking group.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $X^{1a}$, $L^{203}$, and $n^{203}$ in Formula (4-3) have the same definitions and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $X^{1a}$, $L^{201}$, and $n^{201}$ in Formula (4-1).

Formula (4-4):

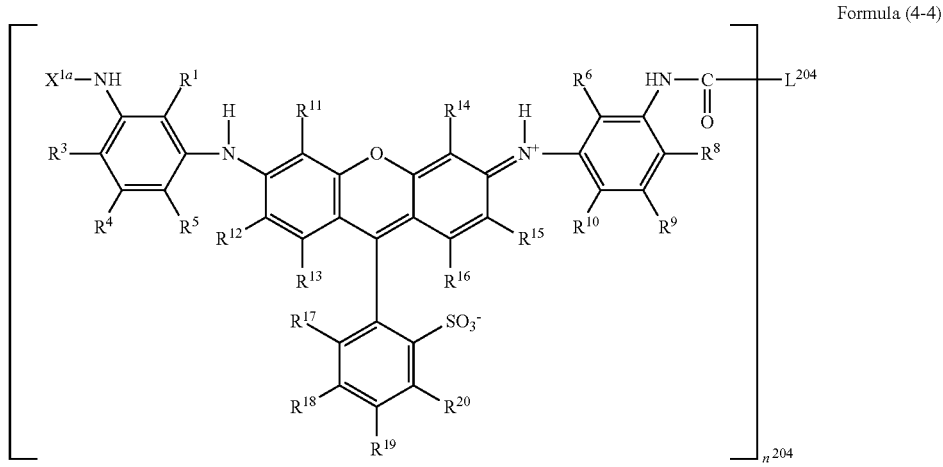

Formula (4-4)

In Formula (4-4), $R^1$, $R^3$, $R^4$, $R^5$, $R^6$, $R^8$, $R^9$, $R^{10}$, $R^{11}$, $R^{12}$, $R^{13}$, $R^{14}$, $R^1$, $R^{16}$, $R^{17}$, $R^{18}$, $R^{19}$, and $R^{20}$ each independently represent a hydrogen atom or a substituent, and $X^{1a}$ represents a substituted or unsubstituted alkyl group, a substituted or unsubstituted aryl group, a substituted or unsubstituted heterocyclic group, a substituted or unsubstituted carbonyl group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group. $n^{204}$ represents an integer of 2 to 6.

In Formula (4-4), $L^{204}$ represents a $n^{204}$-valent linking group.

$R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $X^{1a}$, $L^{204}$, and $n^{204}$ in Formula (4-4) have the same definitions and the same preferable ranges as $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $X^{1a}$, $L^{201}$, and $n^{201}$ in Formula (4-1).

Hereinafter, specific examples of the compound represented by Formula (1), the compound represented by Formula (2), the compound having the repeating unit represented by Formula (3), and the compound represented by Formula (4) will be shown, but the compounds are not limited to the specific examples. In the following specific formulae of the compounds, Me represents a methyl group, Et represents an ethyl group, $^i$Pr represents an isopropyl group, and Ph represents a phenyl group.

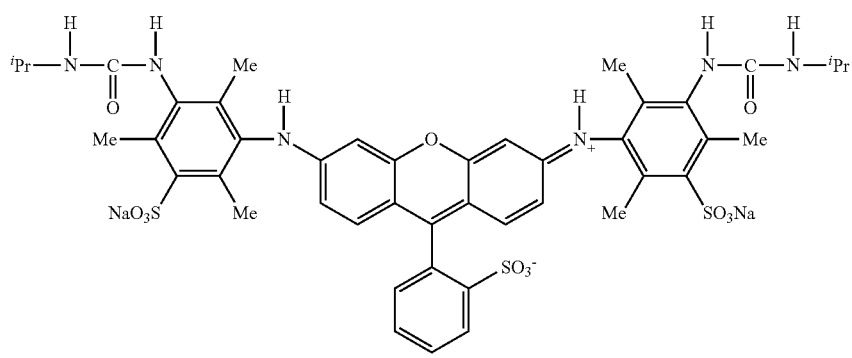

(1-1)

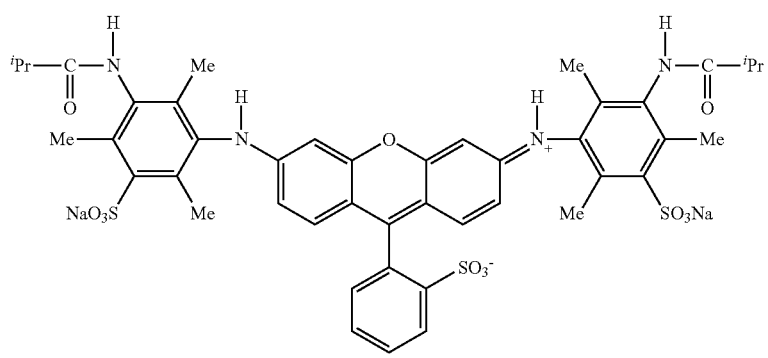

(1-2)

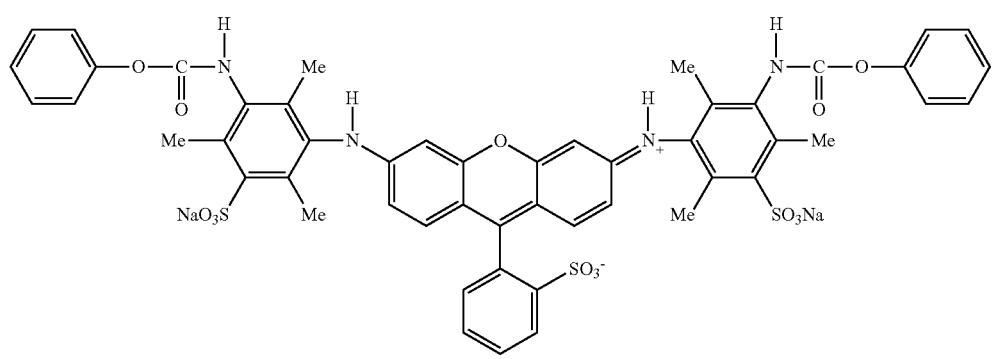

(1-3)

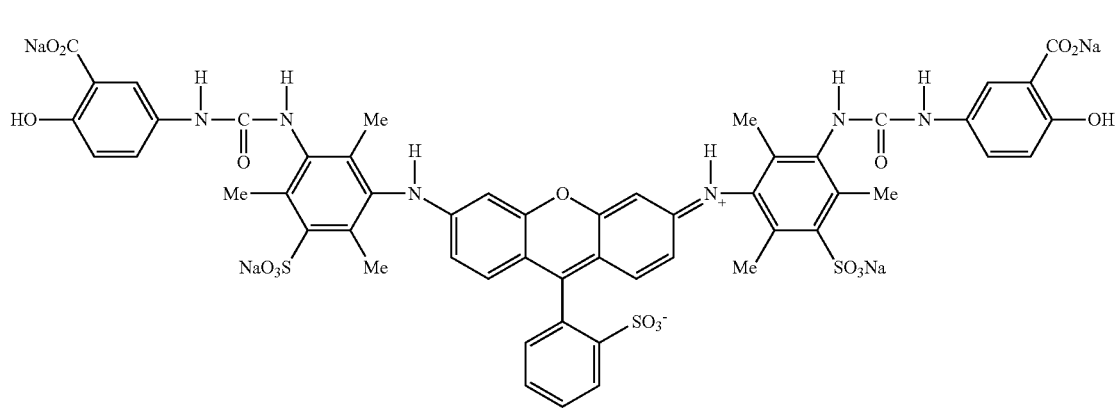

(1-4)

-continued
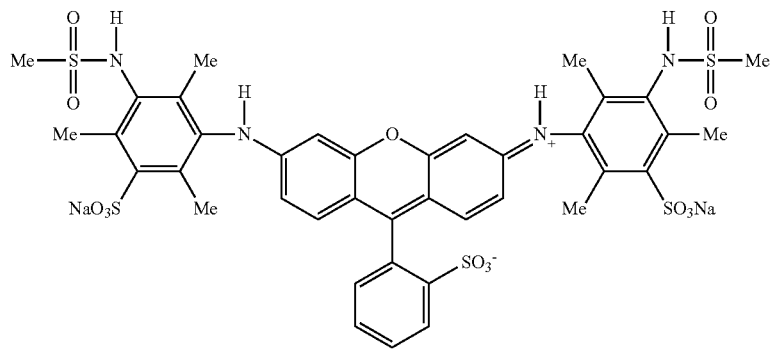
(1-5)
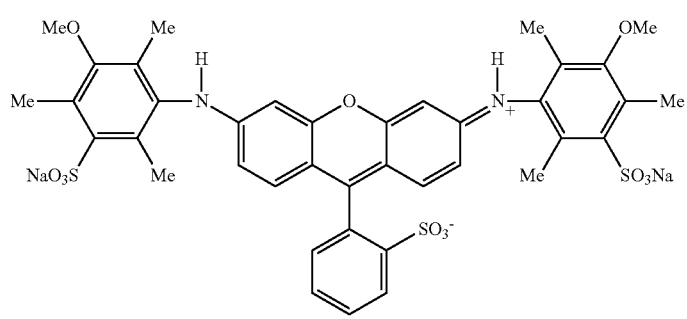
(1-6)
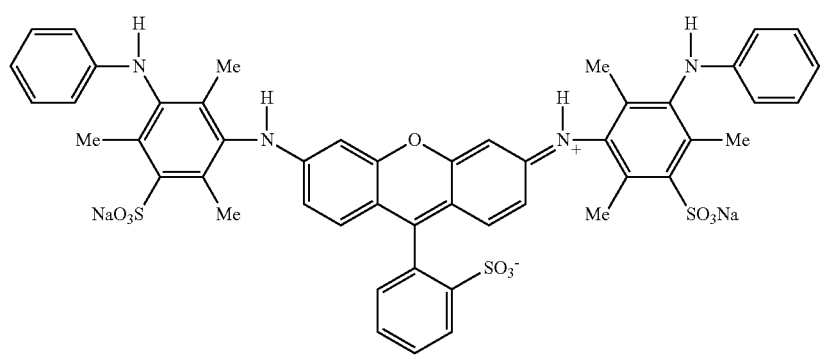
(1-7)
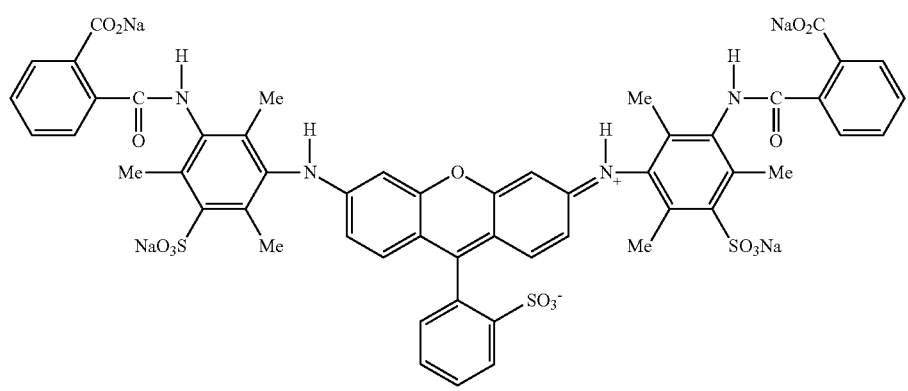
(1-8)

-continued
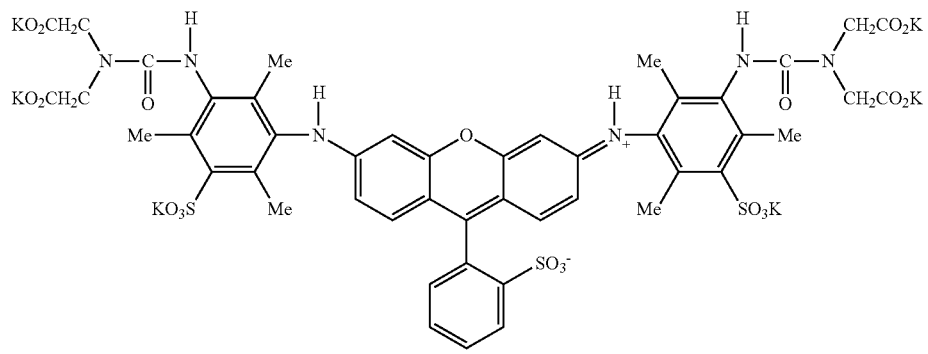
(1-9)
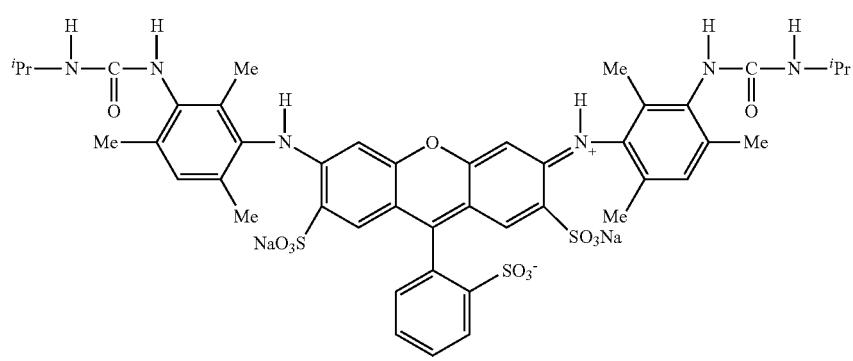
(1-10)
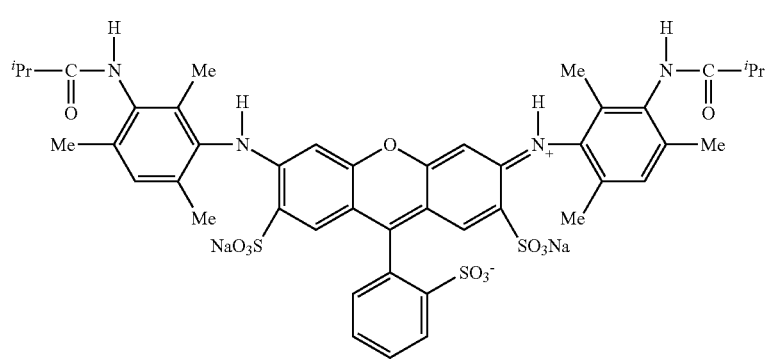
(1-11)
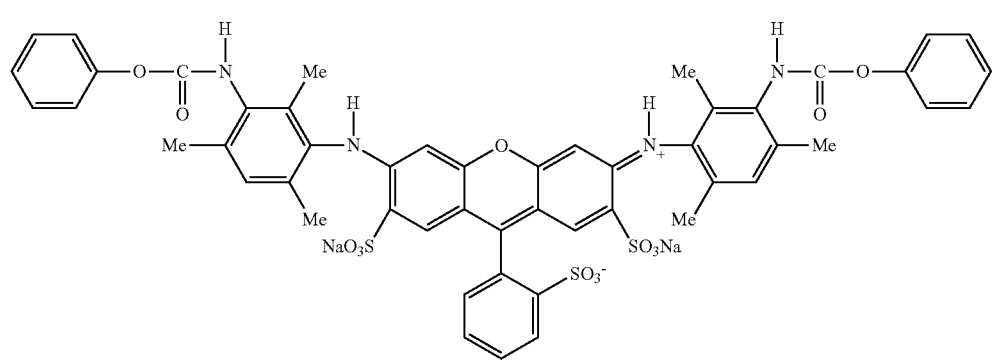
(1-12)

-continued
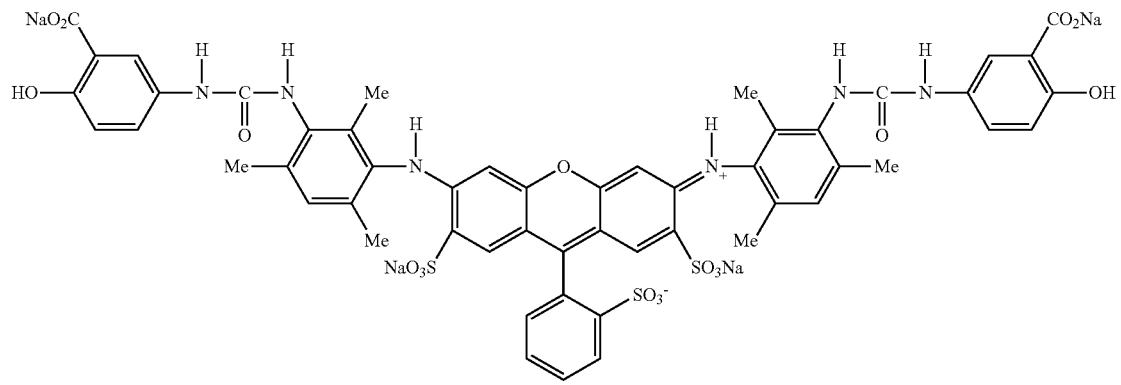
(1-13)
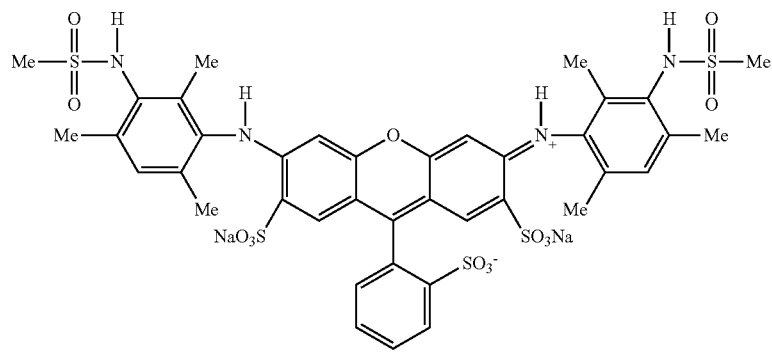
(1-14)
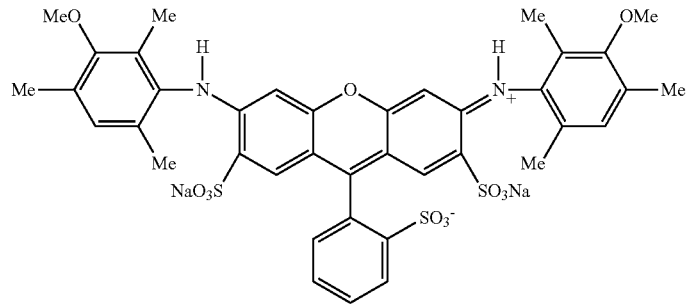
(1-15)
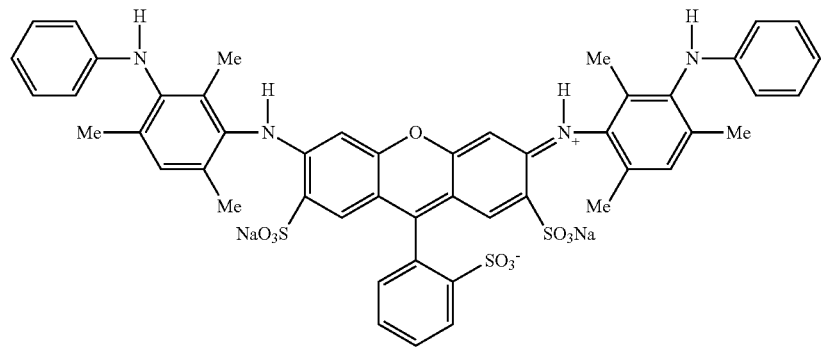
(1-16)

-continued
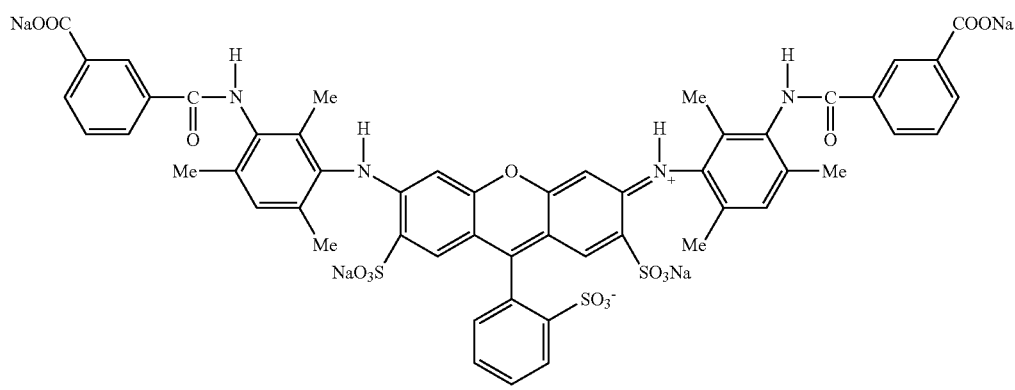
(1-17)
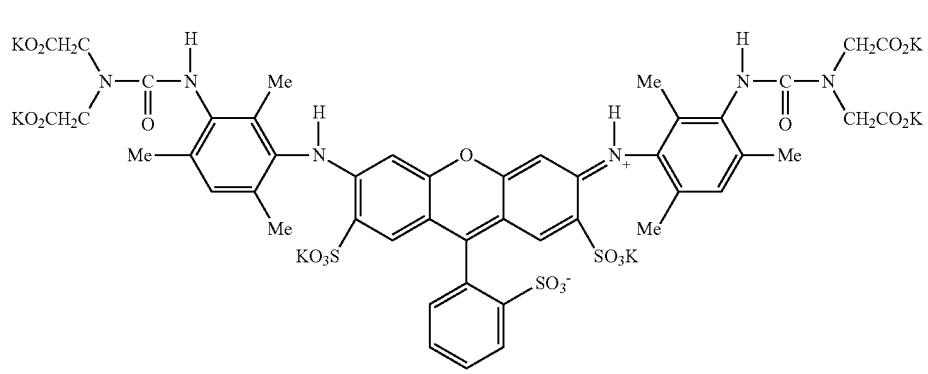
(1-18)
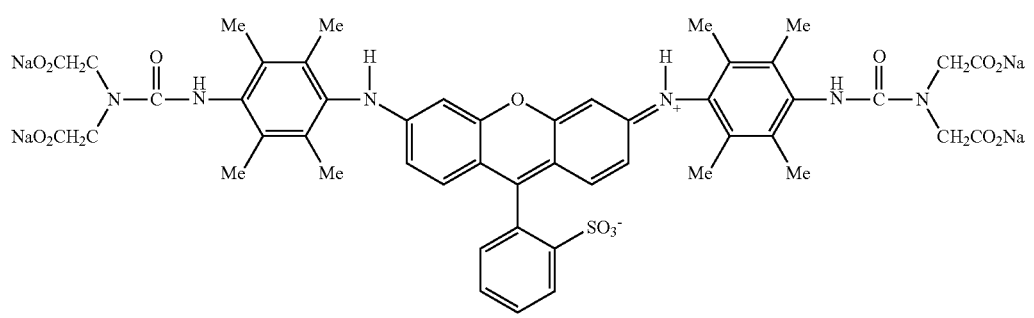
(2-1)
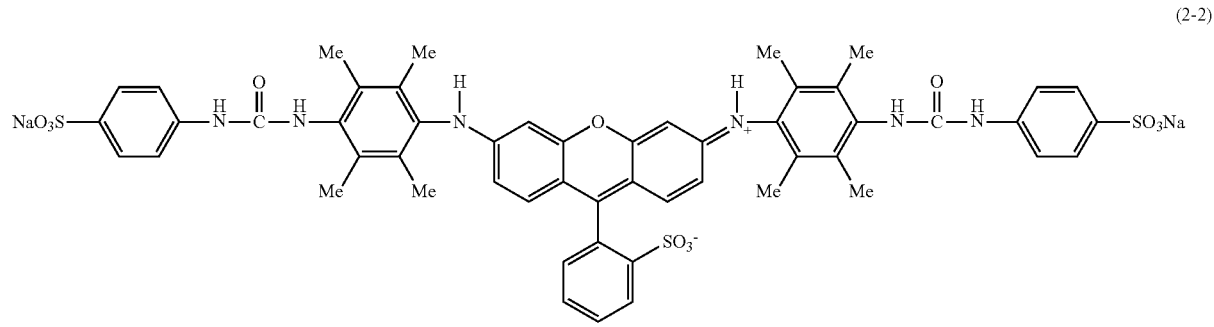
(2-2)

-continued
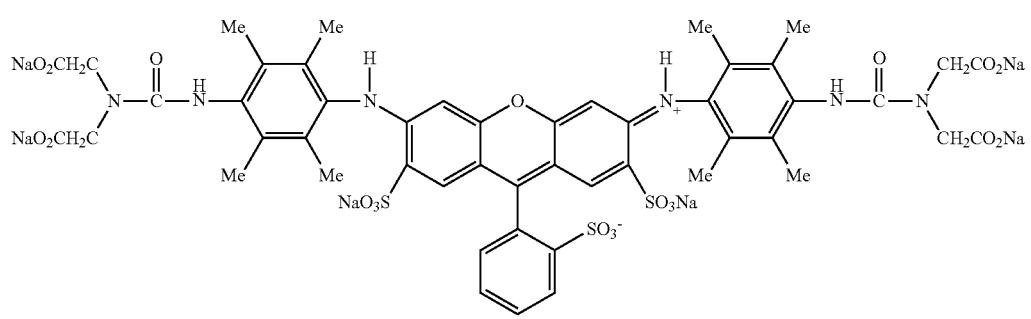
(2-3)
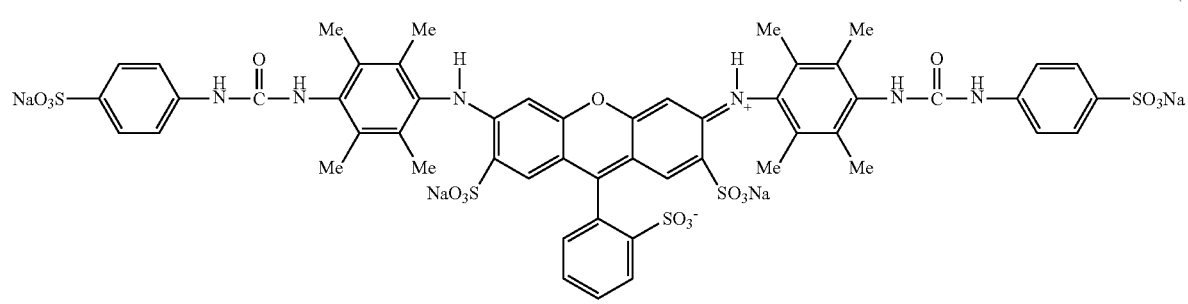
(2-4)
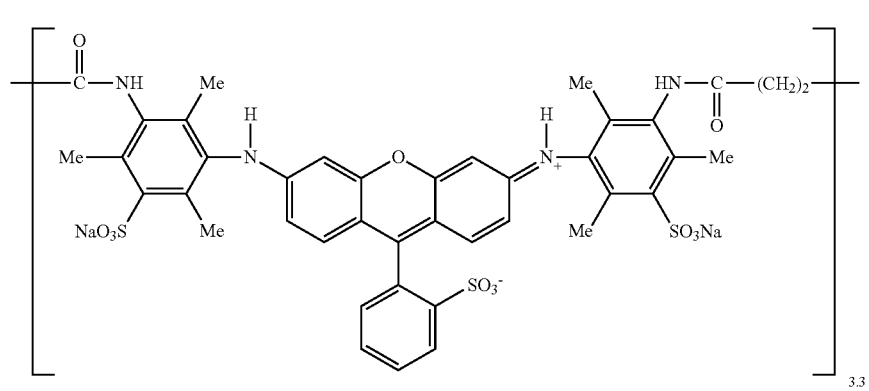
(3-1)
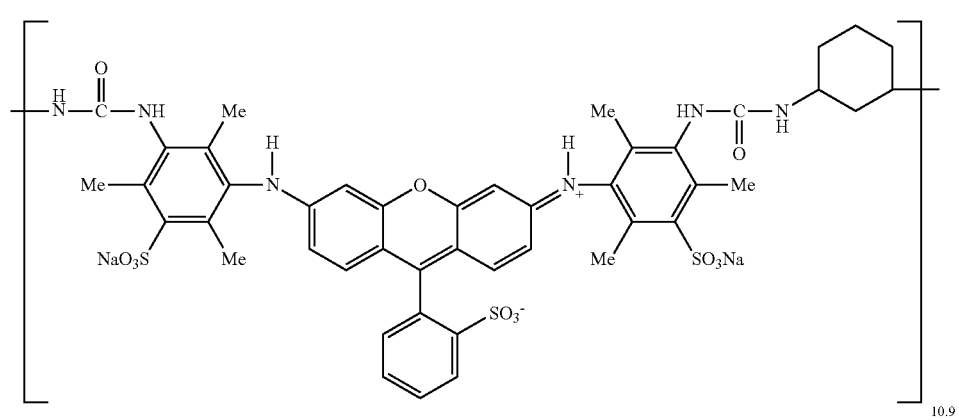
(3-2)

-continued
(3-3)
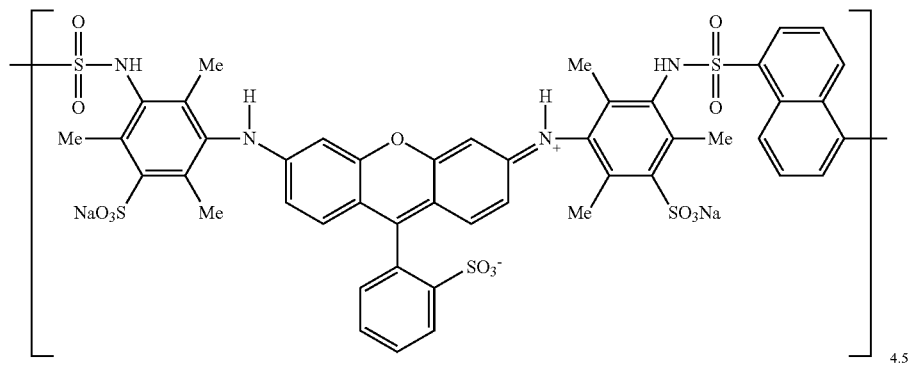
(3-4)
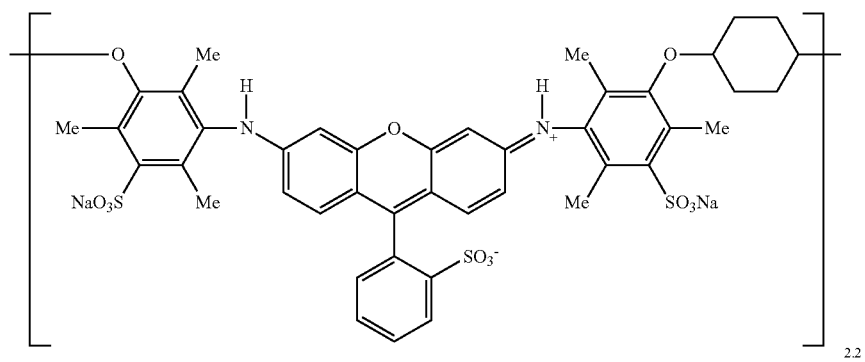
(3-5)
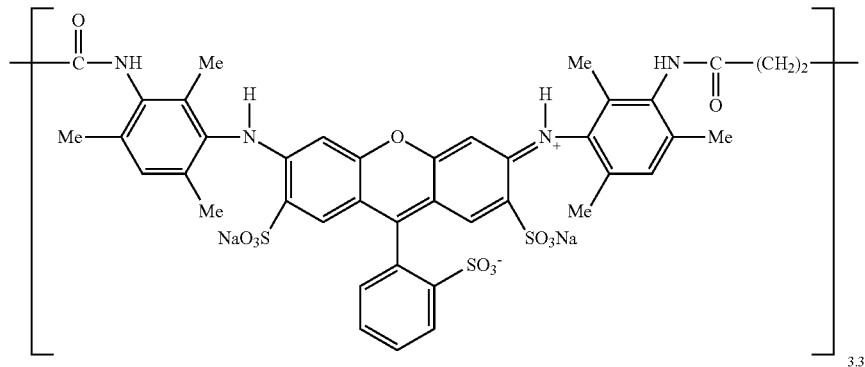
(3-6)
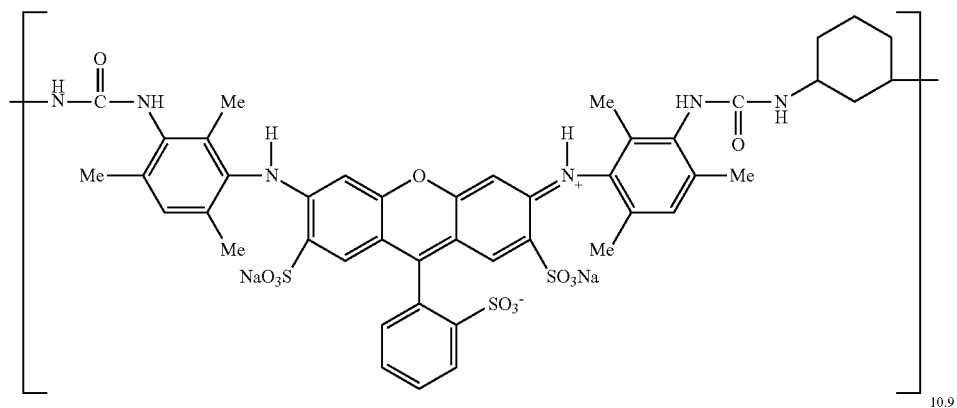

-continued
(3-7)
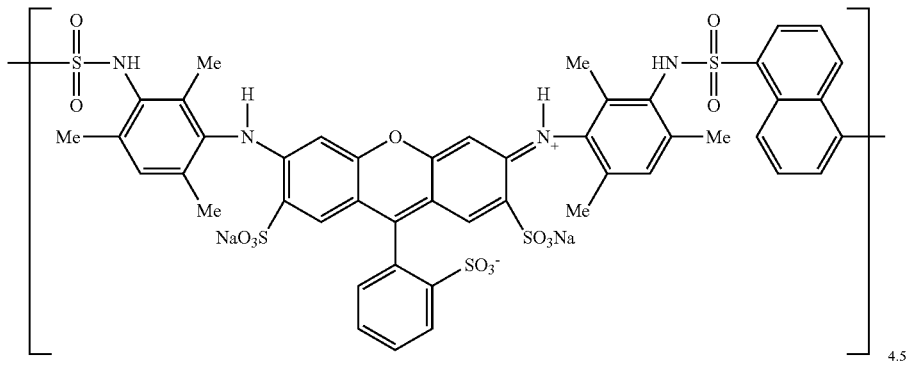
(3-8)
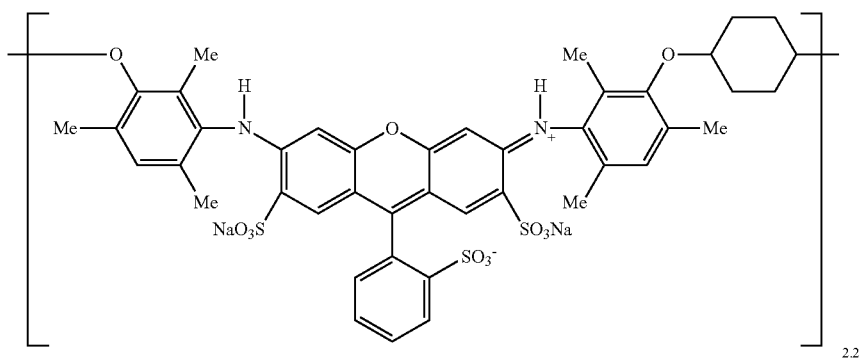
(4-1)
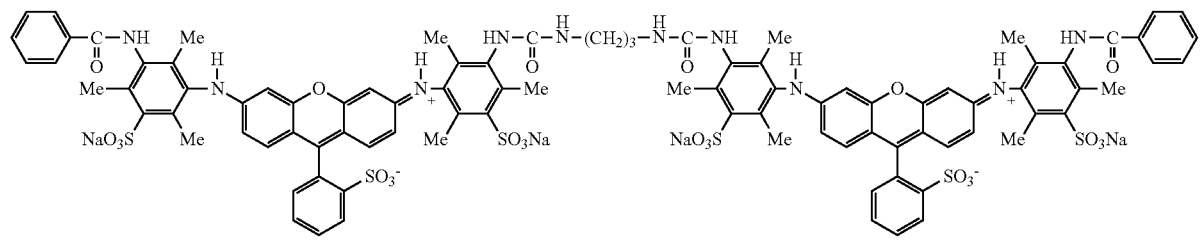
(4-2)
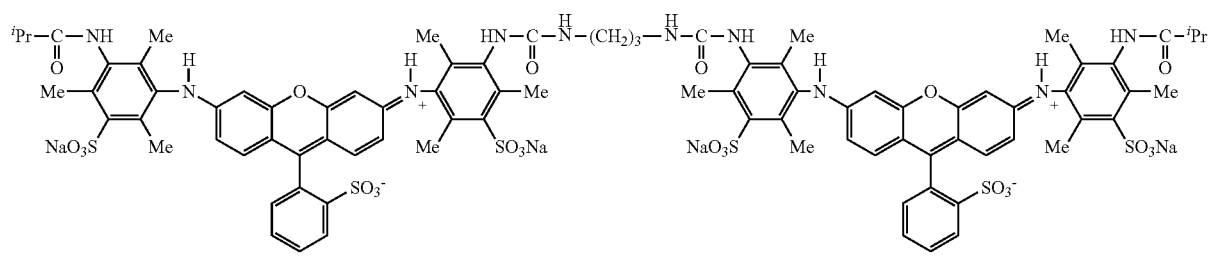
(4-3)
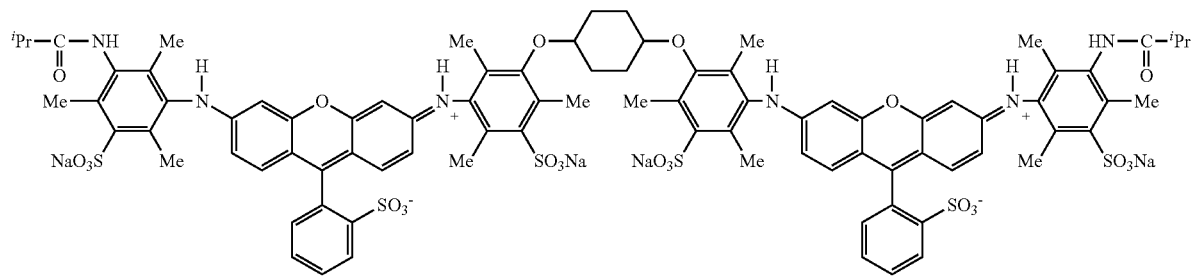

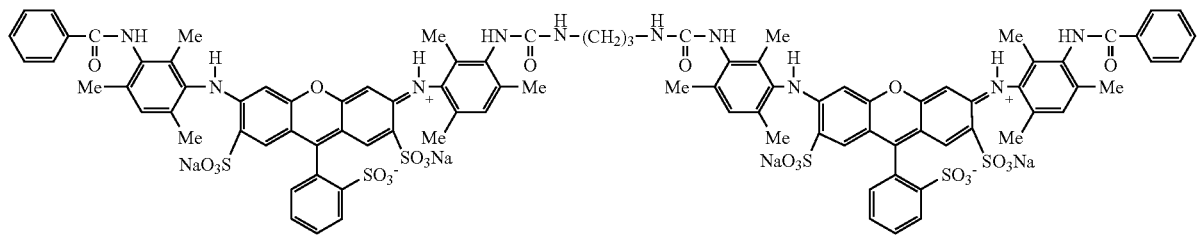

(4-4)

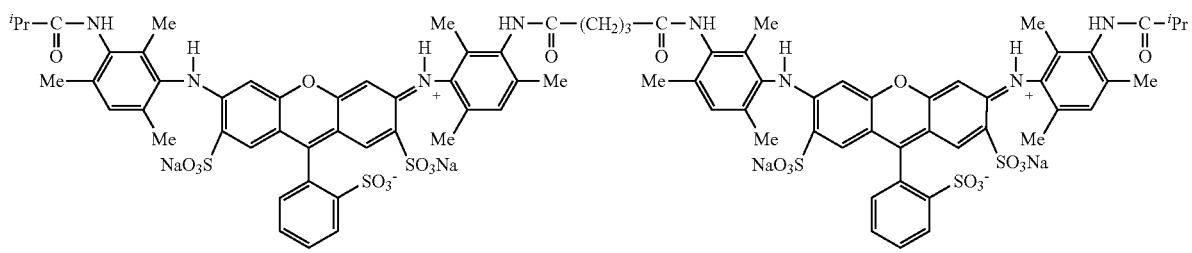

(4-5)

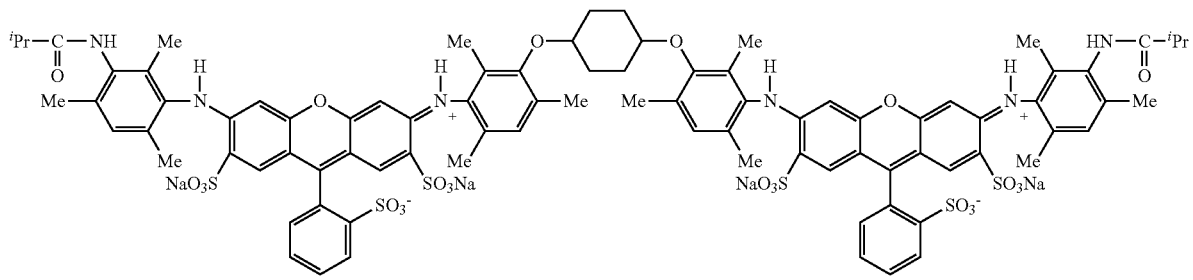

(4-6)

[Betaine Compound]

The coloring composition according to the present invention includes a betaine compound. In particular, it is preferable that the betaine compound is a betaine surfactant having an oil-soluble group. In the betaine compound, compounds represented by Formulae described below are preferably used in the present invention.

It is preferable that the betaine compound which is preferably used in the present invention is a betaine surfactant having surface activity.

The betaine compound described herein refers to a compound having both a cationic site and an anionic site in the molecules. Examples of the cationic site include an amine nitrogen atom, a heteroaromatic nitrogen atom, a boron atom having four bonds with carbon, and a phosphorus atom. Among these, an amine nitrogen atom or a heteroaromatic nitrogen atom is preferable, and a quaternary nitrogen atom is more preferable. Examples of the anionic site include a hydroxyl group, a thio group, a sulfonamide group, a sulfo group, a carboxyl group, an imido group, a phosphate group, and a phosphonate group. Among these, a carboxyl group or a sulfo group is preferable. The electric charge of the molecules as a whole may be cationic, anionic, or neutral and is preferably neutral.

As the betaine compound, a compound represented by the following Formula (A) is preferably used.

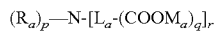    Formula (A):

In Formula (A), $R_a$ represents a hydrogen atom, an alkyl group, an aryl group, or a heterocyclic group. $L_a$ represents a divalent or higher linking group. $M_a$ represents a hydrogen atom, an alkali metal atom, an ammonium group, a protonated organic amine or nitrogen-containing heterocyclic group, or a quaternary ammonium ion group, and in a case where $M_a$ represents a counter ion of an ammonium ion including the N atom in Formula (A), this counter ion does not exist as a cation.

q represents an integer of 1 or more, r represents an integer of 1 to 4. p represents an integer of 0 to 4, and p+r represents 3 or 4. In a case where p+r represents 4, the N atom is a protonated ammonium atom ($=N^+=$).

In a case where q represents 2 or more, $COOM_a$'s may be the same as or different from each other. In a case where r represents 2 or more, $L_a\text{-}(COOM_a)_q$'s may be the same as or different from each other. In a case where p represents 2 or more, $R_a$'s may be the same as or different from each other.

Among the compounds represented by Formula (A), a compound represented by the following Formula (A2) or (A3) is preferably used as the betaine compound according to the present invention.

Formula (A2):

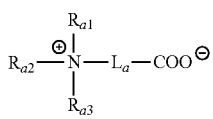

In Formula (A2), $R_{a1}$, $R_{a2}$, and $R_{a3}$ each independently represent an alkyl group (which may be substituted; preferably an alkyl group having 1 to 20 carbon atoms; for example, a methyl group, an ethyl group, a propyl group, a butyl group, a hexyl group, an octyl group, a dodecyl group, a cetyl group, a stearyl group, or an oleyl group), an aryl group (which may be substituted; preferably an aryl group having 6 to 20 carbon atoms; for example, a phenyl group, a tolyl group, a xylyl group, a naphthyl group, a cumyl group, or a dodecylphenyl group), or a heterocyclic group (which may be substituted; preferably a heterocyclic group having 2 to 20 carbon atoms; for example, a pyridyl group or a quinolyl group), and may be linked to each other to form a cyclic structure.

Among these, an alkyl group is preferable.

$L_a$ represents a divalent linking group. As an example of the divalent linking group, a divalent linking group having an alkylene group or an arylene group as a basic constituent unit is preferable. A linking main chain portion may include a heteroatom such as an oxygen atom, a sulfur atom, or a nitrogen atom.

$L_a$ represents preferably a substituted or unsubstituted alkylene group having 1 to 18 carbon atoms, more preferably an unsubstituted alkylene group having 1 to 8 carbon atoms, and still more preferably a methylene group or an ethylene group.

$R_{a1}$, $R_{a2}$, $R_{a3}$, and $L_a$ may be substituted with various substituents.

Examples of the substituents include an alkyl group (preferably having preferably 1 to 20 carbon atoms, more preferably an alkyl group 1 to 12 carbon atoms, and still more preferably 1 to 8 carbon atoms; for example, methyl, ethyl, iso-propyl, tert-butyl, n-octyl, n-decyl, n-hexadecyl, cyclopropyl, cyclopentyl, or cyclohexyl). an alkenyl group (having preferably 2 to 20 carbon atoms, more preferably 2 to 12 carbon atoms, and still more preferably 2 to 8 carbon atoms; for example, vinyl, allyl, 2-butenyl, or 3-pentenyl), an alkynyl group (having preferably 2 to 20 carbon atoms, more preferably 2 to 12 carbon atoms, and still more preferably 2 to 8 carbon atoms; for example, propargyl or 3-pentynyl), an aryl group (having preferably 6 to 30 carbon atoms, more preferably 6 to 20 carbon atoms, and still more preferably 6 to 12 carbon atoms; for example, p-methylphenyl or naphtyl), an amino group (having preferably 0 to 20 carbon atoms, more preferably 0 to 12 carbon atoms, still more preferably 0 to 6 carbon atoms; for example, amino, methylamino, dimethylamino, diethylamino, diphenylamino, or dibenzylamino), an alkoxy group (having preferably 1 to 20 carbon atoms, more preferably 1 to 12 carbon atoms, and still more preferably 1 to 8 carbon atoms; for example, methoxy, ethoxy, or butoxy), an aryloxy group (having preferably 6 to 20 carbon atoms, more preferably 6 to 16 carbon atoms, and still more preferably 6 to 12 carbon atoms; for example, phenyloxy or 2-naphtyloxy), an acyl group (having preferably from 1 to 20 carbon atoms, more preferably from 1 to 16 carbon atoms, and still more preferably from 1 to 12 carbon atoms; for example, acetyl, benzoyl, formyl or pivaloyl), an alkoxycarbonyl groups (having preferably from 2 to 20 carbon atoms, more preferably from 2 to 16 carbon atoms, and still more preferably from 2 to 12 carbon atoms; for example, methoxycarbonyl or ethoxycarbonyl), an aryloxycarbonyl group (having preferably from 7 to 20 carbon atoms, more preferably from 7 to 16 carbon atoms, and still more preferably from 7 to 10 carbon atoms; for example, phenyloxycarbonyl), an acyloxy group (having preferably from 2 to 20 carbon atoms, more preferably from 2 to 16 carbon atoms, and still more preferably from 2 to 10 carbon atoms; for example, acetoxy or benzoyloxy), an acylamino group (having preferably from 2 to 20 carbon atoms, more preferably from 2 to 16 carbon atoms, and still more preferably from 2 to 10 carbon atoms; for example, acetylamio or benzoylamino), an alkoxycarbonylamino group (having preferably from 2 to 20 carbon atoms, more preferably from 2 to 16 carbon atoms, and still more preferably from 2 to 12 carbon atoms; for example, methoxy-carbonylamino), an aryloxycarbonylamino group (having preferably from 7 to 20 carbon atoms, more preferably from 7 to 16 carbon atoms, and still more preferably from 7 to 12 carbon atoms; for example, phenyloxycarbonylamino), a sulfonylamino group (having preferably from 1 to 20 carbon atoms, more preferably from 1 to 16 carbon atoms, and still more preferably from 1 to 12 carbon atoms; for example, methanesulfonylamino or benzenesulfonylamino), a sulfamoyl group (having preferably from 0 to 20 carbon atoms, more preferably from 0 to 16 carbon atoms, and still more preferably from 0 to 12 carbon atoms; for example, sulfamoyl, methylsulfamoyl, dimethylsulfamoyl, or phenylsulfamoyl), a carbamoyl group (having preferably from 1 to 20 carbon atoms, more preferably from 1 to 16 carbon atoms, and still more preferably from 1 to 12 carbon atoms; for example, carbamoyl, methylcarbamoyl, diethylcarbamoyl or phenylcarbamoyl), an alkylthio group (having preferably from 1 to 20 carbon atoms, more preferably from 1 to 16 carbon atoms, and still more preferably from 1 to 12 carbon atoms; for example, methylthio or ethylthio), an arylthio group (having preferably from 6 to 20 carbon atoms, more preferably from 6 to 16 carbon atoms, and still more preferably from 6 to 12 carbon atoms; for example, phenylthio), a sulfonyl group (having preferably from 1 to 20 carbon atoms, more preferably from 1 to 16 carbon atoms, and still more preferably from 1 to 12 carbon atoms; for example, mesyl or tosyl), a sulfinyl group (having preferably from 1 to 20 carbon atoms, more preferably from 1 to 16 carbon atoms, and still more preferably from 1 to 12 carbon atoms; for example, methanesulfinyl or benzenesulfinyl), a ureido group (having preferably from 1 to 20 carbon atoms, more preferably from 1 to 16 carbon atoms, and still more preferably from 1 to 12 carbon atoms; for example, ureido, methylureido or phenylureido), a phosphoric amide group (having preferably from 1 to 20 carbon atoms, more preferably from 1 to 16 carbon atoms, and still more preferably from 1 to 12 carbon atoms; for example, diethylphosphoric amide or phenylphosphoric amide), a hydroxyl group, a mercapto group, a halogen atom (for example, a fluorine atom, a chlorine atom, a bromine atom, or an iodine atom), a cyano group, a sulfo group, a carboxyl group, a nitro group, a hydroxamic acid group, a sulfino group, a hydrazino group, an imino group, a heterocyclic group (having preferably from 1 to 30 carbon atoms, and more preferably from 1 to 12 carbon atoms and having a heteroatom such as a nitrogen atom, an oxygen atom, or a sulfur atom; for example, imidazolyl, pyridyl, quinolyl, furyl, thienyl, piperidyl, morpholino, benzoxazolyl, benzimidazolyl, benzthiazolyl, carbazolyl, or azepinyl), and a silyl group (having preferably from 3 to 40 carbon atoms, more preferably from 3 to 30 carbon atoms, and still more preferably from 3 to 24 carbon atoms; for example, trimethylsilyl or triphenylsilyl). These substituents may be further substituted. In addition, in a case where two or more substituents are present, the substituents may be the same as or different from each other. In addition, if possible, the substituents may be bonded to each other to form a ring. In addition, a plurality of betaine structures may be included through $R_{a1}$, $R_{a2}$, $R_{a3}$, or $L_a$.

In the betaine compound used in the present invention, at least one of $R_{a1}$, $R_{a2}$, $R_{a3}$, or $L_a$ include a group having 8 or more carbon atoms. In particular, it is preferable that $R_{a1}$, $R_{a2}$, or $R_{a3}$ includes a long-chain alkyl group.

   Formula (A3):

$R_a$, $L_a$, and q in Formula (A3) have the same definitions as $R_a$, $L_a$, and q in Formula (A).

$M_a^1$ represents an alkali metal ion or a hydrogen atom.

p1 represents an integer of 0 to 2, and r1 represents an integer of 1 to 3. In this case, p1+r1 represents 3.

In a case where p1 represents 2 or more, $R_a$'s may be the same as or different from each other.

Formula (A) and Formula (A3) will be described below.

In Formula (A) and Formula (A3), $R_a$ represents an alkyl group (which may be substituted; preferably an alkyl group having 1 to 20 carbon atoms; for example, a methyl group, an ethyl group, a propyl group, a butyl group, a hexyl group, an octyl group, a dodecyl group, a cetyl group, a stearyl group, or an oleyl group), an aryl group (which may be substituted; preferably an aryl group having 6 to 20 carbon atoms; for example, a phenyl group, a tolyl group, a xylyl group, a naphthyl group, a cumyl group, or a dodecylphenyl group), a heterocyclic group (which may be substituted; preferably a heterocyclic group having 2 to 20 carbon atoms; for example, a pyridyl group or a quinolyl group), and may be linked to each other to form a cyclic structure. Among these, an alkyl group is preferable.

$L_a$ represents a divalent or higher linking group. As an example of the divalent linking group, a divalent or higher linking group having an alkylene group, an arylene group, or the like as a basic constituent unit is preferable. A linking main chain portion may include a heteroatom such as an oxygen atom, a sulfur atom, or a nitrogen atom.

$L_a$ represents preferably a substituted or unsubstituted alkylene group having 1 to 18 carbon atoms, more preferably an unsubstituted alkylene group having 1 to 8 carbon atoms, and still more preferably a methylene group or an ethylene group.

$R_a$ and $L_a$ may be substituted with various substituents. Examples of the substituents with which $R_a$ and $L_a$ may be substituted are the same as those with which $R_{a1}$, $R_{a2}$, $R_{a3}$, and $L_a$ in Formula (A2) may be substituted, and preferable examples are also the same.

In addition, a plurality of betaine structures may be included through $R_a$ or $L_a$.

$M_a$ represents a hydrogen atom, an alkali metal cation (for example, a sodium ion, a potassium ion, a lithium ion, or a cesium ion), an ammonium ion, an organic amine cation (in the case of primary to tertiary amines, $M_a$ represents a protonated organic amine, for example, protonated methylamine, dimethylamine, ethylamine, diethylamine, triethylamine, diazabicycloundecene, diazabicyclooctane, piperidine, pyrrolidine, morpholine, N-methylpiperidine, N-methylmorpholine, pyridine, pyrazine, aniline, or N,N-dimethylaniline; and in the case of a quaternary ammonium salt, $M_a$ represents a tetramethylammonium ion, a tetraethylammonium ion, a trimethylbenzylammonium ion, a methylpyridinium ion, or a benzylpyridinium ion). Among these, an alkali metal ion or a hydrogen atom is preferable.

q represents an integer of 1 or more (preferably 1 to 5, and more preferably 1 or 2), and r represents an integer of 1 to 4 (preferably 1 or 2). p represents an integer of 0 to 4 (preferably 1 or 2), and p+r represents 3 or 4.

In a case where p+r represents 4, the N atom is a quaternary ammonium cation, and one of $M_a$'s represents a dissociated anion. In a case where q represents 2 or more, $COOM_a$'s may be the same as or different from each other, In a case where r represents 2 or more, $L_a$-$(COOM_a)_q$'s may be the same as or different from each other. In a case where p represents 2 or more, $R_a$'s may be the same as or different from each other.

p1 represents an integer of 0 to 2, and r1 represents an integer of 1 to 3. In this case, p1+r1 represents 3. In a case where p1 represents 2 or more, $R_a$'s may be the same as or different from each other.

Further, it is preferable that $R_a$ or $L_a$ includes a hydrocarbon group having 8 or more carbon atoms. Among the compounds represented by Formula (A3), a compound represented by the following Formula (A4) is most preferably used.

   Formula (A4):

$R_a$, $L_a$, and $M_a^1$ in Formula (A4) are the same as $R_a$, $L_a$, and $M_a^1$ in Formula (A3). Two $(L_a$-$COOM_a^1)$'s may be the same as or different from each other (two $L_a$'s and two $M_a^1$'s may be the same as or different from each other). $R_a$ represents preferably an alkyl group, and $L_a$ represents preferably an alkylene group.

Preferable examples of the betaine compound will be described below. However, of course, the present invention is not limited to these examples.

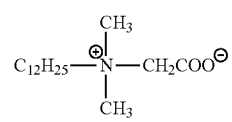

X1-1

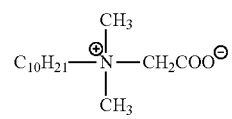

X1-2

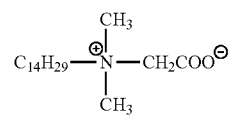

X1-3

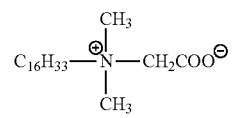

X1-4

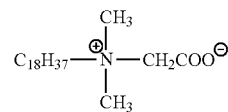

X1-5

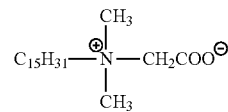

X1-6

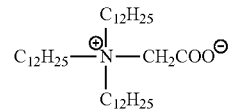

X1-7

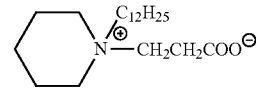

X1-8

-continued
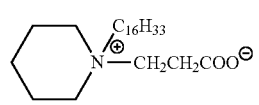 X1-9
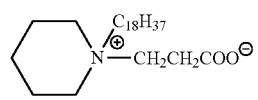 X1-10
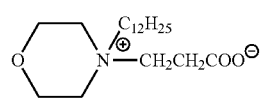 X1-11
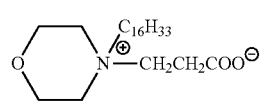 X1-12
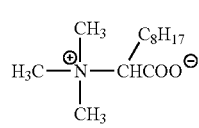 X1-13
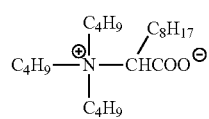 X1-14
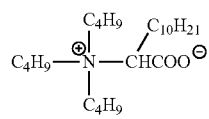 X1-15
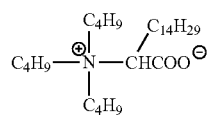 X1-16
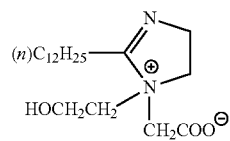 X1-17
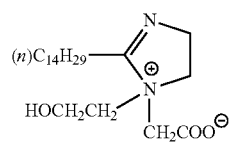 X1-18
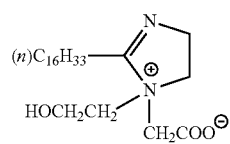 X1-19
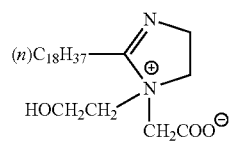 X1-20
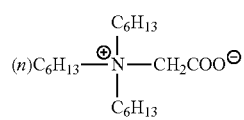 X1-21
-continued
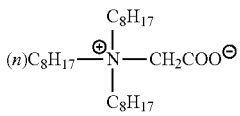 X1-22
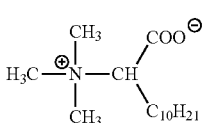 X1-23
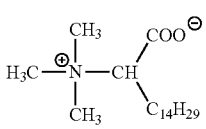 X1-24
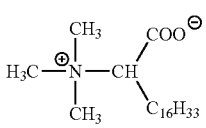 X1-25
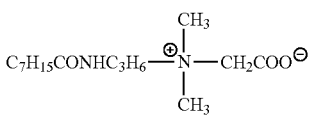 X1-26
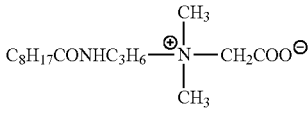 X1-27
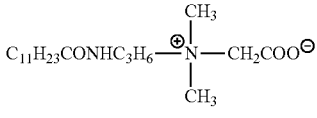 X1-28
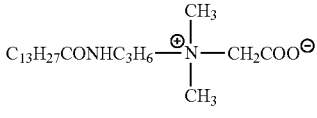 X1-29
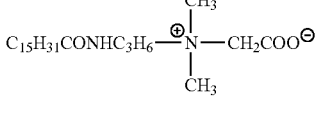 X1-30
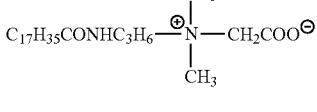 X1-31
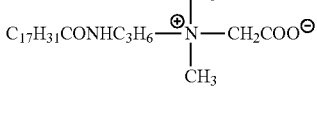 X1-32
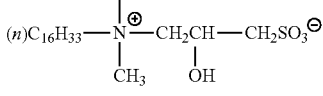 X1-33

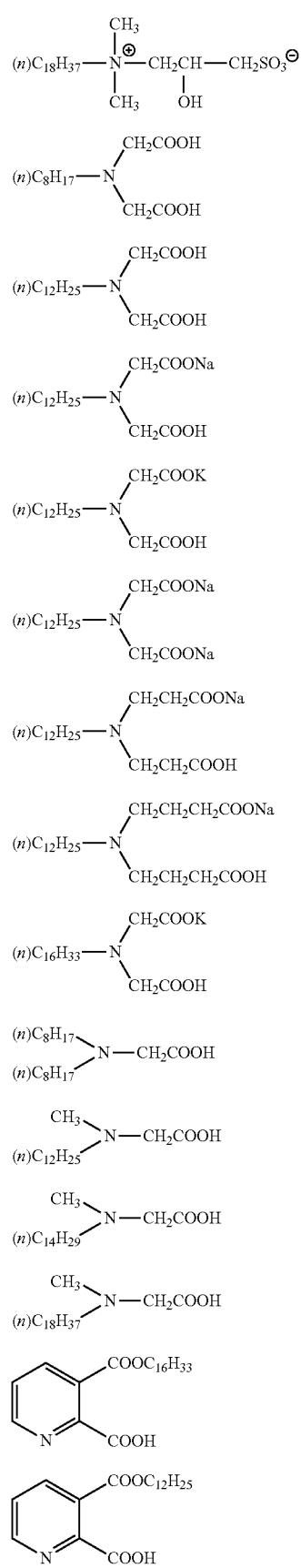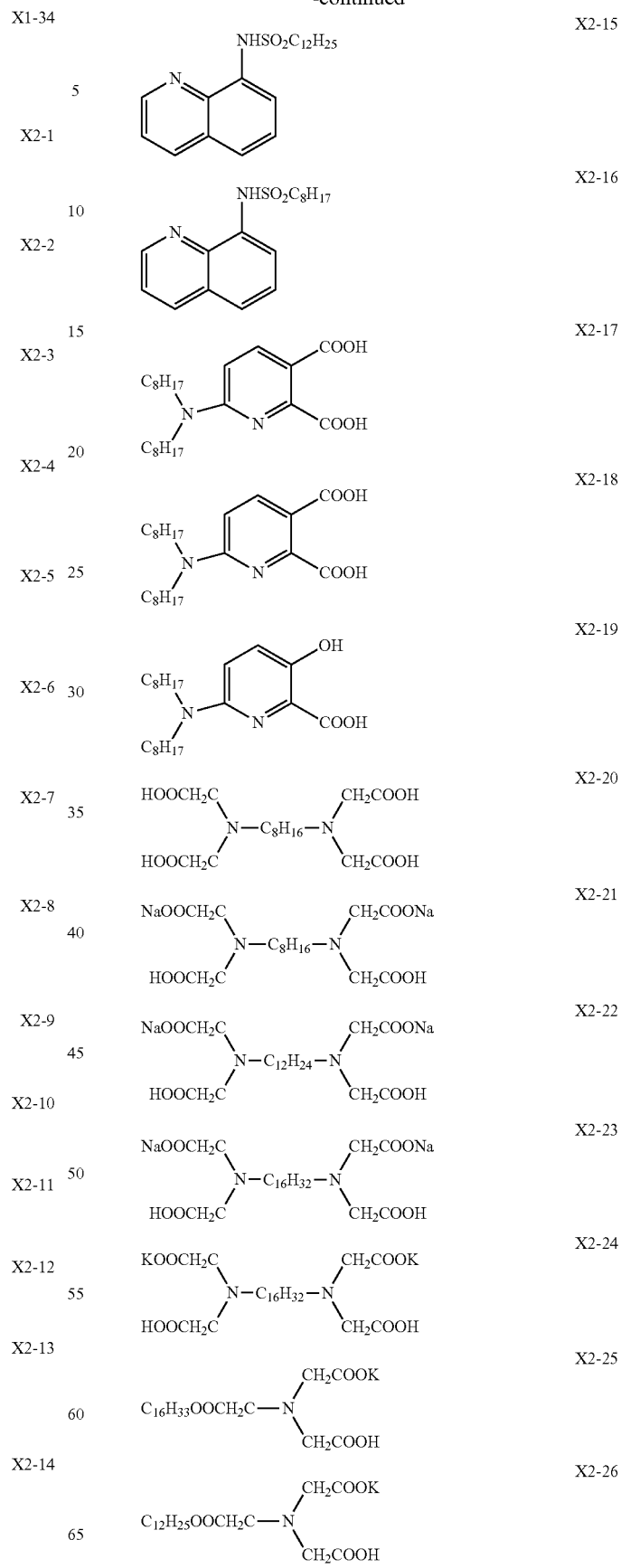

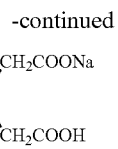

X2-27

[Coloring Composition]

The coloring composition according to the present invention comprising a betaine compound and at least one xanthene compound (preferably a xanthene compound which is soluble in water) of a compound represented by Formula (1), a compound represented by Formula (2), a compound having a repeating unit represented by Formula (3), or a compound represented by Formula (4).

By combining the specific xanthene compound used in the present invention with the betaine compound, a coloring composition can be obtained in which light fastness is excellent and image bleeding is not likely to occur under high humidity conditions, that is, moisture fastness is excellent.

It is thought that the specific xanthene compound used in the present invention acts to improve light fastness because it has a characteristic substituent or linking group and that the use of the betaine compound improves moisture fastness. By combining both of the compounds, light fastness and moisture fastness are significantly improved although the action mechanism thereof is not clear.

The coloring composition according to the present invention may include a medium and, in a case where a solvent is used as the medium, is suitable as an ink jet recording ink. The coloring composition according to the present invention can be prepared by using a lipophilic medium or an aqueous medium as the medium and dissolving and/or dispersing the compounds according to the present invention therein. It is preferable that an aqueous medium is used as the medium. Examples of the coloring composition according to the present invention includes an ink composition excluding a medium.

In the present invention, the content of the xanthene compound, which is soluble in water and is included in the coloring composition, selected from the compound represented by Formula (1), the compound represented by Formula (2), the compound having the repeating unit represented by Formula (3), and the compound represented by Formula (4) is determined according to the kind of the xanthene compound to be used, the solvent component used to prepare the coloring composition, and the like. For example, the content of the xanthene compound in the coloring composition is preferably 1 to 20 mass %, more preferably 1 to 10 mass %, and still more preferably 2 to 6 mass % with respect to the total mass of the coloring composition.

By adjusting the content of the xanthene compound, which is soluble in water, in the coloring composition to be 1 mass % or higher, the color developability of ink on a recording medium during printing can be improved, and a required image density can be secured. In addition, by adjusting the content of the xanthene compound, which is soluble in water, in the coloring composition in the coloring composition to be 20 mass % or lower, in a case where the coloring composition is used in an ink jet recording method, the jettability of the coloring composition can be made to be excellent, and an effect of preventing the clogging or the like of an ink jet nozzle can be obtained.

The content of the betaine compound in the coloring composition according to the present invention is not particularly limited as long as it is in a range where the effects of the present invention are exhibited, and is preferably 0.001 to 50 mass % and more preferably 0.01 to 20 mass %. In a case where two or more betaine compounds are used in combination, a weight ratio of a compound having the maximum amount is 1 to 10000 times that of a compound having the minimum amount. In the above-described range, a recording image having excellent moisture fastness can be realized.

The coloring composition according to the present invention optionally includes other additives within a range where the effects of the present invention do not deteriorate. Examples of the other additives include additives which may be used in an ink jet recording ink described below.

[Ink Jet Recording Ink]

Next, the ink jet recording ink according to the present invention will be described.

The present invention relates to an ink jet recording ink including the coloring composition according to the present invention.

The ink jet recording ink according to the present invention comprising a betaine compound and at least one xanthene compound (preferably a xanthene compound which is soluble in water) of a compound represented by Formula (1), a compound represented by Formula (2), a compound having a repeating unit represented by Formula (3), or a compound represented by Formula (4).

The ink jet recording ink according to the present invention can be prepared by dissolving and/or dispersing the compounds according to the present invention in a lipophilic medium or an aqueous medium. In the ink jet recording ink, an aqueous medium is preferably used.

The ink jet recording ink according to the present invention optionally includes other additives within a range where the effects of the present invention do not deteriorate. Examples of the other additives include well-known additives such as an anti-drying agent (wetting agent), an anti-fading agent, an emulsion stabilizer, a penetration enhancer, a ultraviolet absorber, a preservative, a fungicide, a pH adjuster, a surface tension adjuster, an anti-foaming agent, a viscosity adjuster, a dispersant, a dispersion stabilizer, a rust inhibitor, or a chelating agent. In the case of a water-soluble ink, these various additives are directly added to the ink solution. In a case where an oil-soluble dye is used in the form of a dispersion, in general, the additives are added to a dye dispersion after the preparation of the dispersion. However, the additives may be added in the form of an oil phase or an aqueous phase during the preparation.

As the additives used in the present invention, additives described in paragraphs "0091" to "0101" of JP2013-133394A can be used. Regarding the form, method, and the like of use, the contents described in JP2013-133394A can be preferably adopted.

The content of the xanthene compound which is soluble in water is preferably 0.2 mass % to 10 mass % and more preferably 1 mass % to 6 mass % with respect to 100 parts by mass of the ink jet recording ink according to the present invention. In addition, in the ink jet recording ink according to the present invention, other colorants may be used in combination with the xanthene compound which is soluble in water. In a case where two or more colorants are used in combination, it is preferable that the total content of the colorants is in the above-described range.

The addition amount of the betaine compound is not particularly limited as long as it is in a range where the effects of the present invention are exhibited, and is preferably 0.001 to 50 mass % and more preferably 0.01 to 20 mass % with respect to 100 parts by mass of the ink jet recording ink according to the present invention. In a case where two or more betaine compounds are used in combination, a weight ratio of a compound having the maximum amount is 1 to 10000 times that of a compound having the minimum amount.

In particular, in the ink jet recording ink according to the present invention including the xanthene compound used in the present invention, the betaine compound, and water, it is preferable that the total mass of inorganic ions incorporated from the betaine compound (in particular, a betaine surfactant) and the like into the ink is reduced to be 2 mass % or lower with respect to the total weight of the ink. The inorganic ions described herein refers to all the inorganic ions including an inorganic ion of a counter ion of a dye, an inorganic ion derived from an inorganic salt which is an impurity included in the betaine surfactant, an inorganic ion which becomes a counter ion of an ionic component excluded from the ion equivalent of the betaine compound, an inorganic ion which is introduced from an inorganic salt used for pH adjustment, and an inorganic ion which is introduced from an ink additive such as a chelating agent or a preservative. In the present invention, an ammonium ion is considered as a volatile compound and is excluded from the inorganic ions.

The total mass of the inorganic ions is preferably 2 mass % or lower, more preferably 1 mass % or lower, and still more preferably 0.5 mass % or lower with respect to the total weight of the ink.

As the concentration of the inorganic ions in the ink increases, an effect of preventing bleeding caused by the betaine compound can be reduced.

In order to reduce the content of the inorganic ions in the ink to be as low as possible, various methods can be used.

Firstly, a method of removing inorganic ions included in the materials (for example, the betaine compound) used for the ink during the synthesis of the materials can be adopted. In many cases, a water-soluble ink material includes many ionic-dissociable groups in order to improve particularly water solubility. At this time, a large amount of inorganic materials may be introduced during the synthesis of the material, and inorganic ions may be unavoidably introduced as counter ions. In order to remove the ions of the former case, for example, a desalting purification method by electrodialysis using an ion selective permeable membrane, a method using an ion exchange resin, or a desalting purification method by gel filtration can be performed.

In addition, a method of actively using ions during the synthesis can be used. For example, a method of adding an excess amount of ammonia or organic amine and exchanging it with a metal ion or, in the case of an anion, a method of exchanging an organic carboxylic acid with the anion can be used. In addition, as the desalting method during the synthesis, a method of actively precipitating an salt in an organic solvent and removing the salt by filtration can be used.

Secondly, it is also preferable that the desalting purification is performed in the form of ink raw materials, that is, in a thick aqueous solution (ink solution) in which various materials are dissolved in a solvent such as water. In some cases, the desalting purification can also be performed on a complete ink product.

In a case where the betaine compound according to the present invention is used, bubbles may be formed in the ink. These bubbles cause printing defects during ink jet recording. Therefore, by adding a compound (=anti-foaming agent) having an action of removing the bubbles to the ink, this problem can be solved. As the anti-foaming agent, various anti-foaming agents such as an anti-foaming agent Pluronic (polyoxyethylene-polyoxypropylene anti-foaming agent) or a silicone anti-foaming agent can be used.

The viscosity of the ink jet recording ink according to the present invention is preferably 30 mPa·s or lower. In addition, the surface tension of the ink for ink jet textile printing according to the present invention is preferably 25 mN/m to 70 mN/m. The viscosity and the surface tension can be adjusted by adding various additives such as a viscosity adjuster, a surface tension adjuster, a specific resistance adjuster, a film conditioner, a ultraviolet absorber, an anti-oxidant, an anti-fading agent, a fungicide, a rust inhibitor, a dispersant, and a surfactant.

The ink jet recording ink according to the present invention can be used as any one of various color inks but is preferably used as a magenta ink. In addition, the ink jet recording ink according to the present invention can be used not only for forming a monochromic image but also for forming a full-color image. In order to form a full-color image, a magenta ink, a cyan ink, and a yellow ink can be used. In addition, in order to adjust the tone, a black ink may be further used.

As colorants to be applied, arbitrary colorants can be used. For example, colorants described in paragraphs "0105" to "0108" of JP2013-133394A can be used.

The ink composition according to the present invention can be used in an recording method such as printing, duplicating, marking, writing, drawing, or stamping and is particularly suitable in an ink jet recording method.

[Ink Jet Recording Method]

The present invention relates to an ink jet recording method forming an image using the coloring composition or the ink jet recording ink according to the present invention.

In the ink jet recording method according to the present invention, energy is applied to the ink jet recording ink to form an image on a well-known image receiving material, that is, plain paper or resin coated paper, for example, ink jet paper, films, electrophotographic common paper, fabric, glass, metal, or ceramic described in JP1996-169172A (JP-H08-169172A), JP1996-27693A (JP-H08-27693A), JP1990-276670A (JP-H02-276670A), JP1995-276789A (JP-H07-276789A), JP1997-323475A (JP-H09-323475A), JP1987-238783A (JP-S62-238783A), JP1998-153989A (JP-H10-153989A), JP1998-217473A (JP-H10-217473A), JP1998-235995A (JP-H10-235995A), and JP1998-337947A (JP-H10-337947A), JP1998-217597A (JP-H10-217597A).

During the formation of an image, in order to impart glossiness or water fastness or to improve weather fastness, a polymer particle dispersion (also referred to as a polymer latex) may also be used. Regarding the timing when the polymer latex is added to the image receiving material, the addition may be performed before, during, or after the addition of the colorants. Therefore, a position where the addition is performed may be the image receiving paper or the ink. Alternatively, a liquid material consisting only of the polymer latex may be used. Specifically, a method described in, for example, JP2000-363090, JP2000-315231, JP2000-354380, JP2000-343944, JP2000-268952, JP2000-299465, and JP2000-297365, can be preferably used.

[Ink Jet Printer Cartridge and Ink Jet Recorded Material]

An ink cartridge for ink jet recording according to the present invention is filled with the above-described ink jet recording ink according to the present invention. In addition, an ink jet recorded material according to the present invention is obtained by forming a color image on a recording material using the ink jet recording ink according to the present invention.

Regarding recording paper and recording films used to perform ink jet printing using the ink according to the present invention, for example, the contents described in paragraphs "0112" to "0121" of JP2013-133394A can be adopted.

The ink according to the present invention can be used in well-known ink jet recording methods without any particular limitation, for example, a charge control method of jetting ink using an electrostatic attraction force, a drop-on-demand method (pressure pulse method) using a vibration pressure of a piezoelectric element, an acoustic ink jet method of jetting ink by converting an electrical signal into an acoustic beam and irradiating the ink with the acoustic beam, or a thermal ink jet method of heating ink to form bubbles and using a pressure generated from the bubbles. Examples of the ink jet recording method include a method of jetting a plurality of droplets of a low-density ink called photo ink with a small volume, a method of improving image quality using a plurality of inks having substantially the same hue and different densities, and a method of using a colorless transparent ink.

EXAMPLES

Hereinafter, the present invention will be described using examples, but the present invention is not limited to these examples. Unless specified otherwise, "%" and "part(s)" represent "mass %" and "part(s) by mass".

Synthesis Example 1

Synthesis of Exemplary Compound (1-11)

Exemplary Compound (1-11) can be synthesized using a method according to Synthesis Example 2 of JP2011-148973A Synthesis Example 2

Synthesis of Exemplary Compound (1-12)

Exemplary Compound (1-12) can be synthesized, for example, using the following scheme.

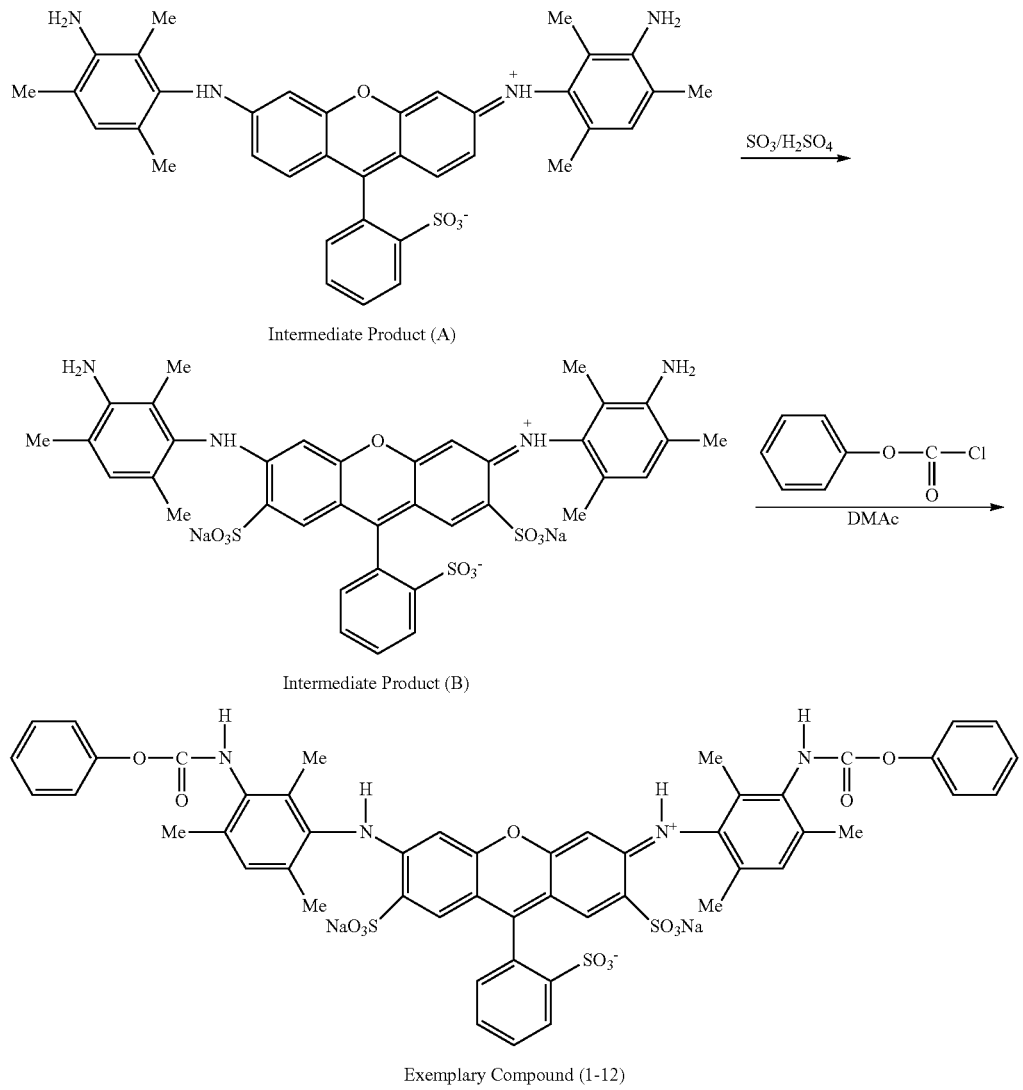

Exemplary Compound (1-12)

Synthesis of Intermediate Product (B)

23.0 g of Intermediate Product (A) (which was synthesized using a method described in paragraph "0065", p. 17 of JP2011-148973A) was added to 420 g of 10% fuming sulfuric acid, and a reaction was caused to occur at room temperature for 48 hours. The reaction solution was poured into a large excess of ethyl acetate, and precipitated crystals was separated by filtering. The separated crystals were dissolved in 500 mL of methanol, the solution was adjusted to pH 7 using a 28% sodium methoxide methanol solution, and precipitated sodium sulfate was removed by filtration. Next, the filtrate was condensed and dried using a rotary evaporator. The obtained residue was purified by column chromatography (filler: SEPHADEX LH-20 (manufactured by Pharmacia), developing solvent: methanol) to obtain crystals of Intermediate Product (B).

Yield amount: 21.0 g
Yield ratio: 68%
MS (m/z)=793 ([M-2Na+H]$^-$, 100%)

Synthesis of Exemplary Compound (1-12)

20 g of Intermediate Product (B) was dissolved in 120 mL of N,N-dimethylacetamide (DMAc), and the solution was cooled such that the internal temperature thereof reached 0° C. 10 mL of phenyl chloroformate (manufactured by Tokyo Chemical Industry Co., Ltd.) was added dropwise while maintaining the internal temperature thereof at 5° C. or lower, and then a reaction was caused to occur at 0° C. to 5° C. for 90 minutes. The obtained reaction solution was poured into 1500 mL of ethyl acetate, and precipitated crystals were separated by filtering. The obtained crystals were dissolved in 200 mL of water, and the pH thereof was adjusted to 7 using a diluted sodium hydroxide aqueous solution. The obtained aqueous solution was purified by column chromatography (filler: SEPHADEX LH-20 (manufactured by Pharmacia), developing solvent: water/methanol). The aqueous solution was condensed using a rotary evaporator, was dissolved in water again, and then was caused to pass through a strong acid ion exchange resin (AMBERLITE IR124-H (trade name), manufactured by Organo Corporation). In this way, the desalting purification was repeated, and then the removal of the salt was verified using an ion chromatograph. Next, the pH of the aqueous solution was adjusted to 7 using a diluted sodium hydroxide aqueous solution, and dust was removed by filtering using a membrane filter. Next, the aqueous solution was condensed and dried using a rotary evaporator. As a result, a green glossy solid of Exemplary Compound (1-12) was obtained.

Yield amount: 24 g
Yield ratio: 93%
MS (m/z)=1054 ([M-Na]$^-$, 100%)

In an absorption spectrum of Exemplary Compound (1-12) in the dilute aqueous solution, the absorption maximum was 531 nm.

Synthesis Example 3

Synthesis of Exemplary Compound (1-10)

Exemplary Compound (1-10) can be synthesized, for example, using the following scheme.

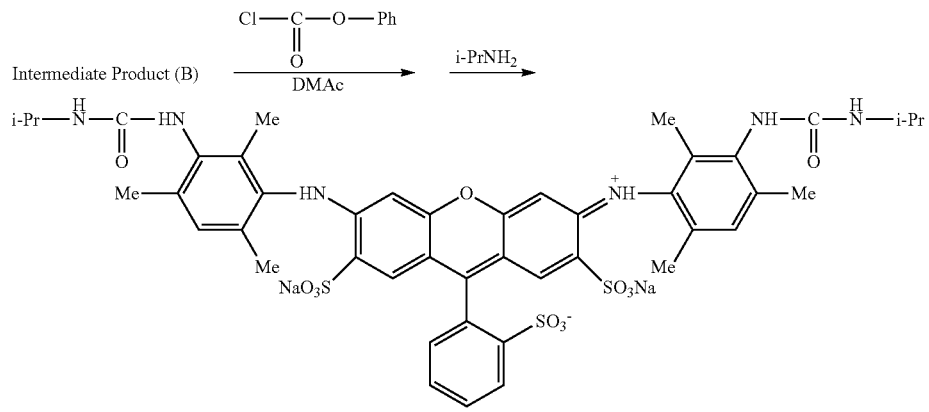

Exemplary Compound (1-10)

4 g of Intermediate Product (B) obtained as the synthetic intermediate product of Exemplary Compound (1-12) described above was dissolved in 56 mL of N,N-dimethylacetamide (DMAc), and the solution was cooled such that the internal temperature thereof reached 0° C. 4.8 mL of phenyl chloroformate (manufactured by Tokyo Chemical Industry Co., Ltd.) was added dropwise while maintaining the internal temperature thereof at 5° C. or lower, and then a reaction was caused to occur at room temperature for 90 minutes. The solution was cooled again such that the internal temperature reached 0° C., 4.0 mL of isopropylamine (manufactured by Wako Pure Chemical Industries, Ltd.) was added dropwise thereto at an internal temperature of 10° C. or lower, and the components were stirred at room temperature for 30 minutes. The obtained reaction solution was poured into a large excess of ethyl acetate, and precipitated solid was separated by filtering. The obtained solid was dissolved in water, and the pH thereof was adjusted to 7 using a diluted sodium hydroxide aqueous solution. The obtained aqueous solution was purified by column chromatography (filler: SEPHADEX LH-20 (manufactured by Pharmacia), developing solvent: water/methanol). The obtained aqueous solution was condensed using a rotary evaporator and then was dissolved in water again. Next, the pH of the aqueous solution was adjusted to 7 using a diluted sodium hydroxide aqueous solution, and dust was removed by filtering using a membrane filter. Next, the aqueous solution was condensed and dried using a rotary evaporator. As a result, a green glossy solid of Exemplary Compound (1-10) was obtained.

Yield amount: 3.1 g
Yield ratio: 67%
MS (m/z)=962 ([M-1]⁻, 100%)

In an absorption spectrum of Exemplary Compound (1-10) in the dilute aqueous solution, the absorption maximum was 531 nm, and the molar absorption coefficient was 65000. Separately, Exemplary Compound (1-10 was synthesized using the same method as in Synthesis Example 3, except that the desalting purification was performed by repeatedly causing the residue to pass through a strong acid ion exchange resin (AMBERLITE IR124-H (trade name), manufactured by Organo Corporation) before adjusting the pH to 7. A reduction in inorganic ions was verified using an ion chromatograph.

Synthesis of Exemplary Compound (1-13)

Exemplary Compound (1-13) can be synthesized, for example, using the following scheme.

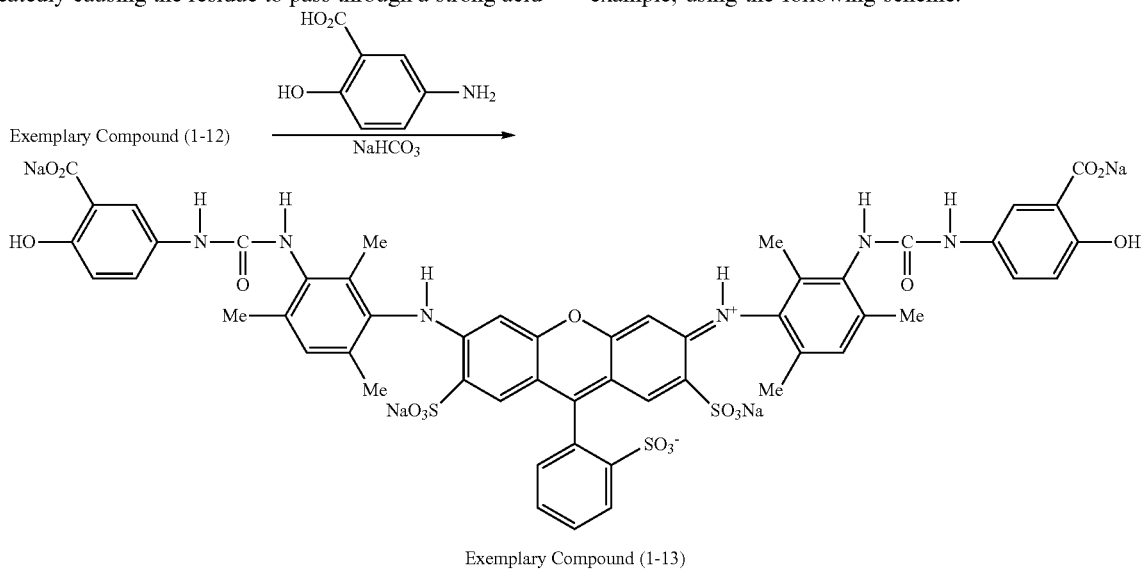

Exemplary Compound (1-13)

Synthesis of Exemplary Compound (1-13)

3 g of Exemplary Compound (1-12), 1.7 g of 5-aminosalicylic acid, and 1.4 g of sodium bicarbonate were added to 15 mL of N,N-dimethylacetamide (DMAc), and a reaction was caused to occur at an internal temperature of 60° C. for 6 hours. The reaction solution was added dropwise to 30 mL of 2-propanol, and crystals were obtained by filtration and were purified by column chromatography (filler: SEPHADEX LH-20 (manufactured by Pharmacia), developing solvent: methanol) to obtain crystals of Exemplary Compound (1-13).

Yield amount: 3.0 g
Yield ratio: 86%
MS (m/z)=1237 ([M-H]⁻, 100%) In an absorption spectrum of Exemplary Compound (1-13) in the dilute aqueous solution, the absorption maximum was 534 nm, and the molar absorption coefficient was 81200.

Synthesis of Exemplary Compound (1-3) and Exemplary Compound (1-4)

Exemplary Compounds (1-3) and (1-4) can be synthesized, for example, using the following scheme.

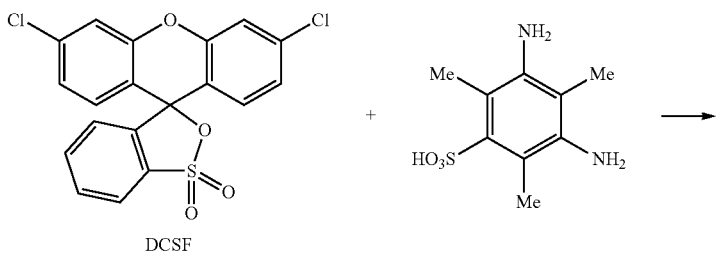

-continued

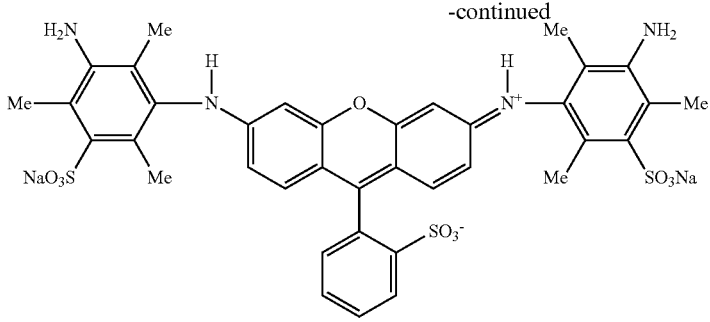

Intermediate Product (C)

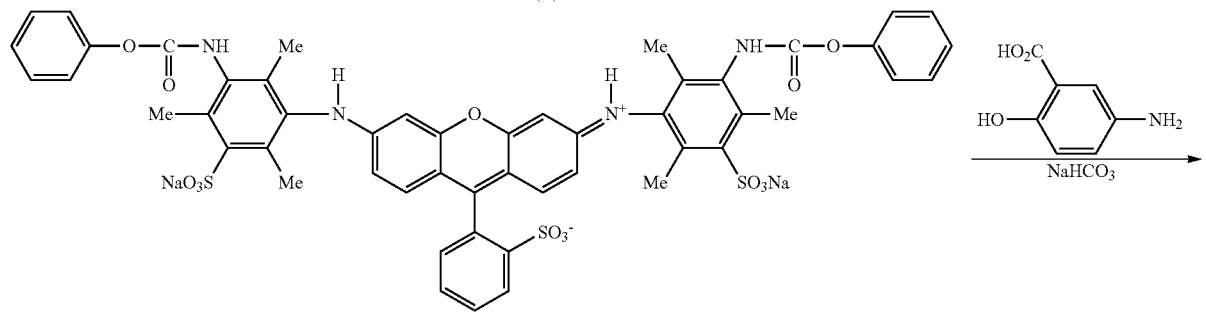

Exemplary Compound (1-3)

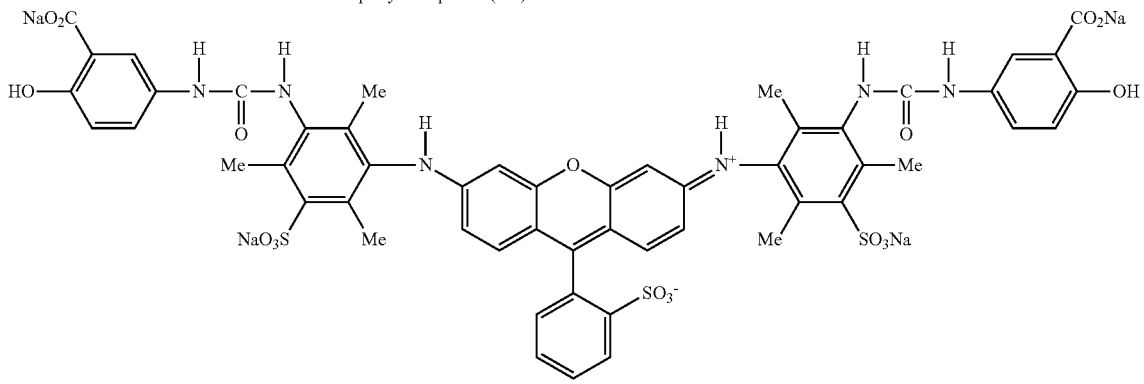

Exemplary Compound (1-4)

Synthesis of Intermediate Product (C)

20 g of dichloro sulfonephthalein (DCSF (trade name), manufactured by Chugai kasei Co., Ltd.), 46 g of 2,4-diaminomesitylene-6-sulfonic acid, 30 g of diazabicycloundecene (DBU), and 6.7 g of zinc chloride were added to 250 g of ethylene glycol to cause a reaction to occur at 150° C. for 6 hours. The obtained reaction solution was cooled to room temperature and was poured into 1 L of acetonitrile. The obtained crystals were purified by column chromatography (filler: SEPHADEX LH-20 (manufactured by Pharmacia), developing solvent: water/methanol) to obtain Intermediate Product (C).

Yield amount: 7.7 g
Yield ratio: 19%
MS (m/z)=836 ([M-1]$^-$, 100%)

Synthesis of Exemplary Compound (1-3)

3 g of Intermediate Product (C) was dissolved in 20 mL of N,N-dimethylacetamide (DMAc), and the solution was cooled to 0° C. 1.7 g of phenyl chloroformate was added dropwise to the solution, and a reaction was caused to occur at 0° C. for 1 hour. The reaction solution was added dropwise to 150 mL of ethyl acetate, precipitated crystals were separated by filtration, and were washed with ethyl acetate. The obtained crystals were dried at 60° C. for 6 hours to obtain crystals of Exemplary Compound (1-3).

Yield amount: 3.4 g
Yield ratio: 88%
MS (m/z)=1076 ([M-H]$^-$, 100%) In an absorption spectrum of Exemplary Compound (1-3) in the dilute aqueous solution, the absorption maximum was 530 nm, and the molar absorption coefficient was 93400.

Synthesis of Exemplary Compound (1-4)

3 g of Exemplary Compound (1-3), 1.7 g of 5-aminosalicylic acid, and 1.4 g of sodium bicarbonate were added to 15 mL of N,N-dimethylacetamide (DMAc), and a reaction was caused to occur at an internal temperature of 60° C. for 6 hours. The reaction solution was added dropwise to 30 mL of 2-propanol, and crystals were obtained by filtration and were purified by column chromatography (filler: SEPHA- DEX LH-20 (manufactured by Pharmacia), developing solvent: methanol) to obtain crystals of Exemplary Compound (1-4).

Yield amount: 3.1 g
Yield ratio: 90%
MS (m/z)=1237 ([M-H]⁻, 100%) In an absorption spectrum of Exemplary Compound (1-4) in the dilute aqueous solution, the absorption maximum was 529 nm, and the molar absorption coefficient was 92800.

Synthesis Example 4

Synthesis of Exemplary Compound (3-6)

3.0 g of Exemplary Compound (1-12) described above was dissolved in 30 mL of N,N-dimethylacetamide (DMAc), and the solution was cooled such that the internal temperature thereof reached 0° C. A solution in which 0.32 g of 1,3-cyclohexanediamine was dissolved in 10 mL of N,N-dimethylacetamide (DMAc) was added dropwise over 30 minutes, and a reaction was caused to occur at room temperature for 24 hours. The reaction solution was poured into 300 mL of isopropyl alcohol, and precipitated crystals were separated by filtration and were dissolved again in 100 mL of water. The solution was caused to pass through a strong acid ion exchange resin (AMBERLITE IR-124H (trade name), manufactured by Organo Corporation), and the pH thereof was adjusted to 7.0 using a diluted sodium hydroxide aqueous solution. Next, inorganic salts were removed from the aqueous solution using a dialysis membrane (molecular weight cutoff: 3500, Spectra/Por 3 dialysis Membrane (trade name, manufactured by SPECTRUM LABORATORIES, INC.)). The solution was condensed and dried to obtain 2.5 g of metal glossy crystals of Exemplary Compound (3-6). It was estimated by GPC measurement that the molecular weight of a repeating unit in terms of polystyrene was 6.5. In an UV-Vis spectrum of Exemplary Compound (3-6) in the dilute aqueous solution, the absorption maximum was 532 nm.

Synthesis Example 5

Synthesis of Exemplary Compound (4-5)

Exemplary Compound (4-5) can be synthesized, for example, using the following scheme.

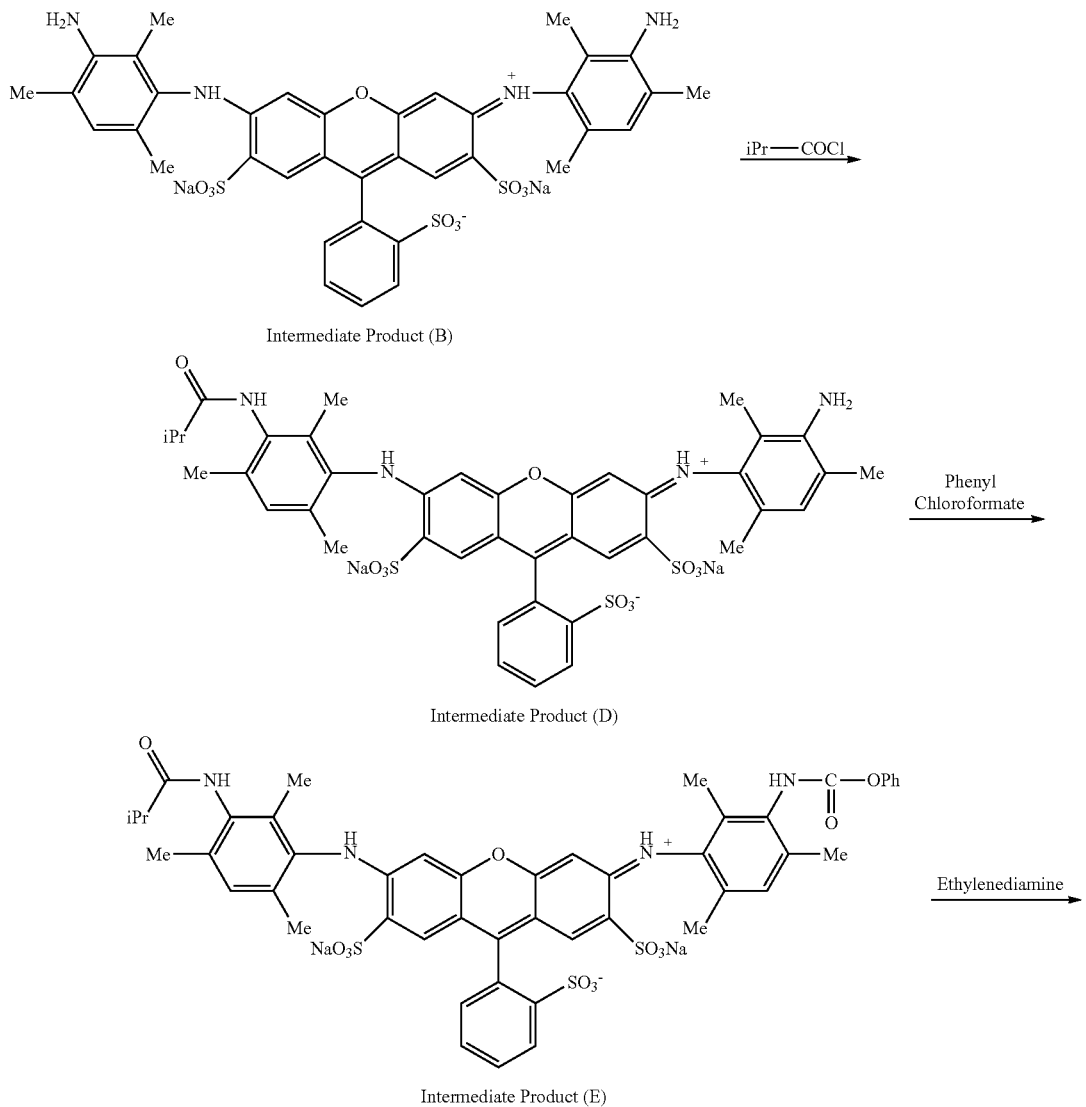

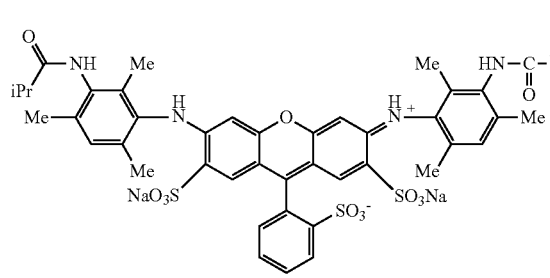 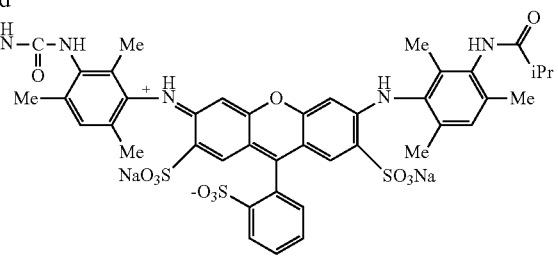

Exemplary Compound (4-5)

Synthesis of Intermediate Product (D)

20 g of Intermediate Product (B) was dissolved in 120 mL of N,N-dimethylacetamide (DMAc), and the solution was cooled such that the internal temperature thereof reached 0° C. 10 mL of isobutyl chloride (manufactured by Tokyo Chemical Industry Co., Ltd.) was added dropwise while maintaining the internal temperature thereof at 5° C. or lower, and then a reaction was caused to occur at 0° C. to 5° C. for 90 minutes. The obtained reaction solution was poured into 1500 mL of ethyl acetate, and precipitated crystals were separated by filtering. The obtained crystals were dissolved in 200 mL of water, and the pH thereof was adjusted to 7 using a diluted sodium hydroxide aqueous solution. The obtained aqueous solution was purified by column chromatography (filler: SEPHADEX LH-20 (manufactured by Pharmacia), developing solvent: water/methanol). The aqueous solution was condensed using a rotary evaporator, was dissolved in water again, and then was caused to pass through a strong acid ion exchange resin (AMBERLITE IR124-H (trade name), manufactured by Organo Corporation). Next, the pH of the aqueous solution was adjusted to 7 using a diluted sodium hydroxide aqueous solution, and dust was removed by filtering using a membrane filter. Next, the aqueous solution was condensed and dried using a rotary evaporator. As a result, a green glossy solid of Intermediate Product (D) was obtained.

Yield amount: 22 g
MS (m/z)=884.2 ([M-Na]$^-$, 100%)

Synthesis of Intermediate Product (E)

22 g of Intermediate Product (D) was dissolved in 120 mL of N,N-dimethylacetamide (DMAc), and the solution was cooled such that the internal temperature thereof reached 0° C. 5 mL of phenyl chloroformate (manufactured by Tokyo Chemical Industry Co., Ltd.) was added dropwise while maintaining the internal temperature thereof at 5° C. or lower, and then a reaction was caused to occur at 0° C. to 5° C. for 90 minutes. The obtained reaction solution was poured into 1500 mL of ethyl acetate, and precipitated crystals were separated by filtering. The obtained crystals were dissolved in 200 mL of water, and the pH thereof was adjusted to 7 using a diluted sodium hydroxide aqueous solution. The obtained aqueous solution was purified by column chromatography (filler: SEPHADEX LH-20 (manufactured by Pharmacia), developing solvent: water/methanol). The aqueous solution was condensed using a rotary evaporator, was dissolved in water again, and then was caused to pass through a strong acid ion exchange resin (AMBERLITE IR124-H (trade name), manufactured by Organo Corporation). Next, the pH of the aqueous solution was adjusted to 7 using a diluted sodium hydroxide aqueous solution, and dust was removed by filtering using a membrane filter. Next, the aqueous solution was condensed and dried using a rotary evaporator. As a result, a green glossy solid of Intermediate Product (E) was obtained.

Yield amount: 20 g
MS (m/z)=1004 ([M-Na]$^-$, 100%)

Synthesis of Exemplary Compound (4-5)

3.0 g of Intermediate Product (E) was dissolved in 30 mL of N,N-dimethylacetamide (DMAc), and the solution was cooled such that the internal temperature thereof reached 0° C. A solution in which 0.2 g of ethylenediamine was dissolved in 10 mL of N,N-dimethylacetamide (DMAc) was added dropwise over 30 minutes, and a reaction was caused to occur at room temperature for 24 hours. The reaction solution was poured into 300 mL of isopropyl alcohol, and precipitated crystals were separated by filtration and were dissolved again in 100 mL of water. The solution was caused to pass through a strong acid ion exchange resin (AMBERLITE IR-124H (trade name), manufactured by Organo Corporation), and the pH thereof was adjusted to 7.0 using a diluted sodium hydroxide aqueous solution. Next, inorganic salts were removed from the aqueous solution using a dialysis membrane (molecular weight cutoff: 3500, Spectra/Por 3 dialysis Membrane (trade name, manufactured by Spectrum, Inc.)). The solution was condensed and dried to obtain 2.5 g of metal glossy crystals of Exemplary Compound (4-5). In an UV-Vis spectrum of Exemplary Compound (4-5) in the dilute aqueous solution, the absorption maximum was 532 nm.

Other Exemplary Compounds can be synthesized using the above-described method.

Examples 1 to 34 and Comparative Examples 1 and 2

<Preparation of Ink Composition>

An ink composition having the following composition was stirred for 1 hour while heated at 30 to 40° C. Next, the pH of the ink composition was adjusted to 9 using 10 mol/L of KOH, and the obtained solution was filtered under reduced pressure through a microfilter having an average pore size of 0.25 μm. As a result, an ink solution for magenta was prepared. The prepared ink solution for magenta was used as the ink jet recording ink.

Ink Composition

| | |
|---|---|
| Dye compound shown in Table 1 | 3.5 mass % |
| Betaine compound shown in Table 1 | 1 mass % |

-continued

| | |
|---|---|
| Triethylene glycol monobutyl ether | 10 mass % |
| Glycerin | 10 mass % |
| Triethylene glycol | 5 mass % |
| Olefin E1010 (acetylenic glycol surfactant, manufactured by Nissin Chemical Co., Ltd.) | 2 mass % |
| Water | Balance |

At this time, the concentrations of inorganic ions in the respective inks were analyzed using an ion chromatograph, and the sum values thereof are collectively shown as concentrations (mass %) in Table 1.

The OD value of the printed material after the exposure was measured using a reflection densitometer "Spectrolino" (trade name, manufactured by Gretag Macbeth GmbH), and a residual optical density (ROD) was obtained from the following expression and was evaluated based on the following criteria.

$$ROD\ (\%) = (D/D0) \times 100$$

D: OD after the exposure test
D0: OD before the exposure test
(measurement conditions of light source: D50, view angle: 2°, and DIN-NB)

TABLE 1

| | Dye Compound | Betaine Compound | Concentration of Inorganic Ions in Ink (mass %) | Light Fastness | Moisture Fastness |
|---|---|---|---|---|---|
| Example 1 | Exemplary Compound (1-3) | X1-1 | 0.8 | A | A |
| Example 2 | Exemplary Compound (1-1) | X1-1 | 0.8 | A | A |
| Example 3 | Exemplary Compound (1-1) | X1-1 | 5.0 | A | B |
| Example 4 | Exemplary Compound (1-1) | X1-14 | 0.8 | A | A |
| Example 5 | Exemplary Compound (1-8) | X1-1 | 1.0 | A | A |
| Example 6 | Exemplary Compound (1-5) | X1-1 | 0.7 | A | A |
| Example 7 | Exemplary Compound (1-6) | X1-1 | 0.8 | A | A |
| Example 8 | Exemplary Compound (1-4) | X1-1 | 1.0 | A | A |
| Example 9 | Exemplary Compound (1-2) | X1-1 | 0.8 | A | A |
| Example 10 | Exemplary Compound (2-1) | X1-1 | 1.0 | A | A |
| Example 11 | Exemplary Compound (2-1) | X1-1 | 4.5 | A | B |
| Example 12 | Exemplary Compound (2-1) | X2-5 | 1.0 | A | A |
| Example 13 | Exemplary Compound (2-1) | X2-5 | 3.0 | A | B |
| Example 14 | Exemplary Compound (3-2) | X1-1 | 1.2 | A | A |
| Example 15 | Exemplary Compound (3-2) | X1-14 | 0.8 | A | A |
| Example 16 | Exemplary Compound (4-2) | X1-1 | 1.2 | A | A |
| Example 17 | Exemplary Compound (4-2) | X1-14 | 0.8 | A | A |
| Example 18 | Exemplary Compound (1-12) | X1-1 | 0.7 | A | A |
| Example 19 | Exemplary Compound (1-10) | X1-1 | 0.8 | A | A |
| Example 20 | Exemplary Compound (1-10) | X1-1 | 4.8 | A | B |
| Example 21 | Exemplary Compound (1-10) | X1-14 | 0.9 | A | A |
| Example 22 | Exemplary Compound (1-17) | X1-1 | 1.0 | A | A |
| Example 23 | Exemplary Compound (1-14) | X1-1 | 0.6 | A | A |
| Example 24 | Exemplary Compound (1-15) | X1-1 | 0.8 | A | A |
| Example 25 | Exemplary Compound (1-13) | X1-1 | 1.1 | A | A |
| Example 26 | Exemplary Compound (1-11) | X1-1 | 0.9 | A | A |
| Example 27 | Exemplary Compound (2-3) | X1-1 | 1.0 | A | A |
| Example 28 | Exemplary Compound (2-3) | X1-1 | 4.4 | A | B |
| Example 29 | Exemplary Compound (2-3) | X2-5 | 1.2 | A | A |
| Example 30 | Exemplary Compound (2-3) | X2-5 | 3.3 | A | B |
| Example 31 | Exemplary Compound (3-6) | X1-1 | 1.0 | A | A |
| Example 32 | Exemplary Compound (3-6) | X1-14 | 1.0 | A | A |
| Example 33 | Exemplary Compound (4-2) | X1-1 | 1.4 | A | A |
| Example 34 | Exemplary Compound (4-5) | X1-14 | 0.7 | A | A |
| Comparative Example 1 | C.I. Acid Red 289 | X1-1 | 1.2 | B | C |
| Comparative Example 2 | C.I. Acid Red 52 | X1-1 | 3.5 | C | D |

(Image Recording and Evaluation)

The ink jet recording inks according to Examples and Comparative Examples were evaluated as follows. The results are shown in Table 1 below.

In Table 1, light fastness and moisture fastness were evaluated after an image was formed on photo glossy paper (PM photographic paper <GLOSS> (KA420PSK, manufactured by Seiko Epson Corporation)) using each of the ink jet recording inks and an ink jet printer (PM-700C, manufactured by Seiko Epson Corporation).

<Light Fastness>

A solid magenta image was printed after adjusting an applied duty was adjusted such that the optical density (OD) was in a range of 0.9 to 1.1. Using a Xenon light fastness tester XL-75s (trade name; manufactured by Suga Test Instrument Co., Ltd.), the obtained printed material was exposed for 20 days under conditions of relative humidity at 23° C.: 50% and illuminance: 75000 lux.

A: ROD was 90% or higher
B: ROD was 80% or higher and lower than 90%
C: ROD was 70% or higher and lower than 80%
D: ROD was 60% or higher and lower than 70%
E: ROD was lower than 60%

<Moisture Fastness>

Regarding image bleeding under high-humidity conditions, a 3 cm×3 cm printing pattern was prepared by disposing 1 mm×1 mm magenta squares such that 0.5 mm white spaces were formed between the squares. After storing this image sample under conditions of a relative humidity of 90% at 25 for 72 hours, the bleeding of the magenta dye was observed in the white spaces.

Specifically, the OD values of the printed material before and after the exposure were measured using a reflection densitometer "Spectrolino" (trade name, manufactured by Gretag Macbeth GmbH), and an increase in the magenta density of the white space immediately after the printing was measured in a green filter of Status A. A case where the measured value was lower than 0.01 was evaluated as A, a case where the measured value was 0.01 or higher and lower than 0.05 was evaluated as B, a case where the measured value was 0.05 or higher was evaluated as C, and a case where the bleeding state was severe such that magenta bled over the entire area of the image was evaluated as D.

In addition to Exemplary Compounds according to the present invention, compounds used in Comparative Examples will be shown below.

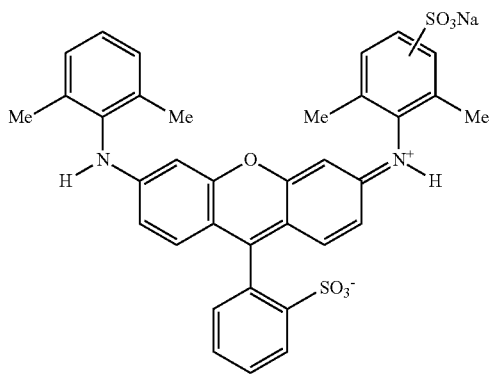

(C.I. Acid Red 289)

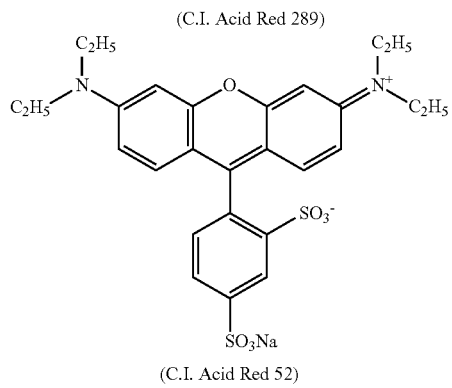

(C.I. Acid Red 52)

It can be seen from the results that, in the inks according to Examples in which the coloring composition according to the present invention including the betaine compound and at least one of the compound represented by Formula (1), the compound represented by Formula (2), the compound having the repeating unit represented by Formula (3), or the compound represented by Formula (4) was used, light fastness and moisture fastness were excellent as compared to the inks according to Comparative Examples.

INDUSTRIAL APPLICABILITY

By using the coloring composition according to the present invention, an image having excellent moisture fastness and light fastness can be formed.

The present invention has been described in detail with reference to the specific embodiment. However, it is obvious to those skilled in the art that various modifications and changes can be made within a range not departing from the scope of the present invention.

The present application is based on Japanese Patent Application (JP2014-202535) filed on Sep. 30, 2014 and Japanese Patent Application (JP2015-115102) filed on Jun. 5, 2015, the entire content of which is incorporated herein by reference.

What is claimed is:

1. A coloring composition comprising a betaine compound represented by Formula (A2), and at least one of a compound represented by Formula (1), a compound represented by Formula (2), a compound having a repeating unit represented by Formula (3), or a compound represented by Formula (4), wherein Formula (A2):

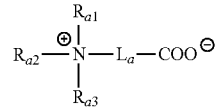

in Formula (A2), $R_{a1}$, $R_{a2}$, and $R_{a3}$ each independently represents an alkyl group, an aryl group, or a heterocyclic group, and may be linked to each other to form a cyclic structure, and $L_a$ represents a divalent linking group, Formula (1):

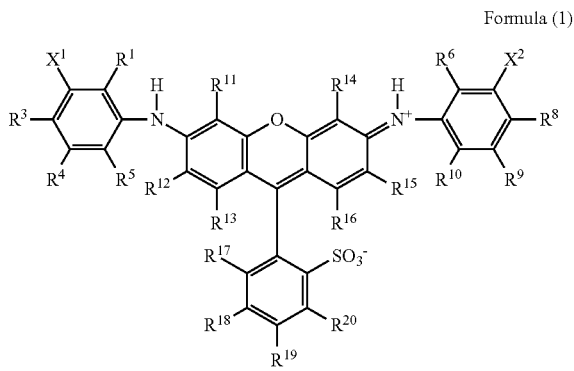

Formula (2):

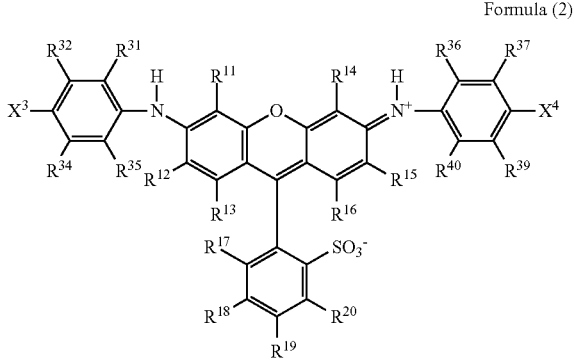

in Formula (1) and Formula (2), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ each independently represents a hydrogen atom or a substituent, and $X^1$, $X^2$, $X^3$, and $X^4$ each independently represents a hydroxyl group, a substituted or unsubstituted alkoxy group, a substituted or unsubstituted aryloxy group, a substituted or unsubstituted heterocyclic oxy group, a substituted or unsubstituted alkylamino group, a substituted or unsubstituted arylamino group, a substituted or unsubstituted heterylamino group, a substituted or unsubstituted carbonylamino group, a substituted or unsubstituted acyloxy group, a substituted or unsubstituted aminocarbonyloxy group, a substituted or unsubstituted sulfonylamino group, a substituted or unsubstituted alkoxycarbonylamino group, a substituted or unsubstituted aryloxycarbonylamino group, a substituted or unsubstituted ureido group, a substituted or unsubstituted alkylthio group, or a substituted or unsubstituted arylthio group, one hydrogen atom from the compound represented by Formula (1) or (2), $n^2$ represents an integer of 2 to 6, and a plurality of $D^2$'s may be the same as or different from each other.

2. The coloring composition according to claim 1, wherein the compound represented by Formula (1) or Formula (2) is a compound represented by the following Formula (1-1) or Formula (2-1), Formula (1-1):

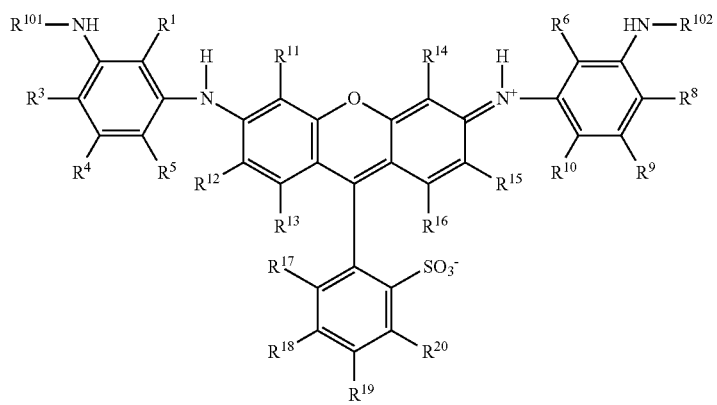

Formula (1-1)

Formula (2-1):

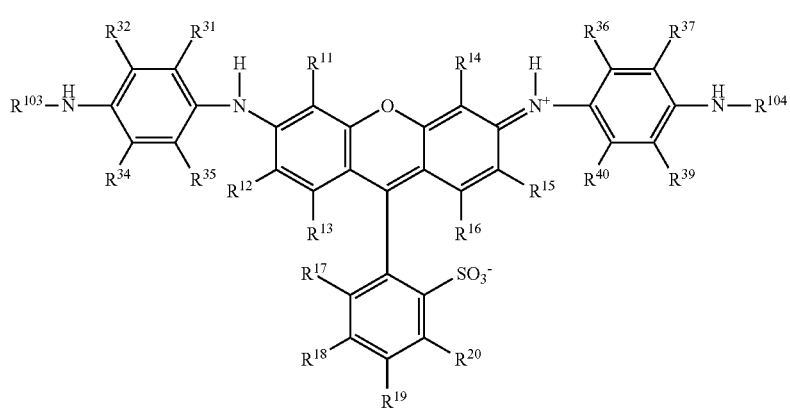

Formula (2-1)

Formula (3):

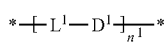

in Formula (3), $L^1$ represents a divalent linking group, $D^1$ represents a partial structure obtained by removing two hydrogen atoms from the compound represented by Formula (1) or (2), $n^1$ represents 2 to 100, and a plurality of $L^1$'s and a plurality of $D^1$'s may be the same as or different from each other, and Formula (4):

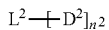

in Formula (4), $L^2$ represents a $n^2$-valent linking group, $D^2$ represents a partial structure obtained by removing in Formula (1-1) and Formula (2-1), $R^1$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{31}$, $R^{32}$, $R^{34}$, $R^{35}$, $R^{36}$, $R^{37}$, $R^{39}$, and $R^{40}$ each independently represents a hydrogen atom or a substituent, and $R^{101}$, $R^{102}$, $R^{103}$, and $R^{104}$ each independently represents a substituted or unsubstituted alkyl group, a substituted or unsubstituted aryl group, a substituted or unsubstituted heterocyclic group, a substituted or unsubstituted carbonyl group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group.

3. The coloring composition according to claim 2, wherein $R^{101}$, $R^{102}$, $R^{103}$, and $R^{104}$ each independently represents a substituted or unsubstituted alkyl group, a substituted or unsubstituted aryl group, a substituted or unsubstituted heterocyclic group, a substituted or unsubstituted sulfonyl group, a substituted or unsubstituted alkoxycarbonyl group, a substituted or unsubstituted aryloxycarbonyl group, a carbamoyl group, a substituted or unsubstituted monoalkylaminocarbonyl group, a substituted or unsubstituted dialkylaminocarbonyl group, a substituted or unsubstituted monoarylaminocarbonyl group, a substituted or unsubstituted diarylaminocarbonyl group, or a substituted or unsubstituted alkylarylaminocarbonyl group.

4. The coloring composition according to claim 1, wherein $R^1$, $R^5$, $R^6$, $R^{10}$, $R^{31}$, $R^{35}$, $R^{36}$, and $R^{40}$ in Formula (1), or Formula (2) each independently represents an alkyl group having 1 to 6 carbon atoms.

5. The coloring composition according to claim 1, wherein $R^4$ and $R^9$ in Formula (1) each independently represents a sulfo group.

6. The coloring composition according to claim 1, wherein $R^{12}$ and $R^{15}$ in Formula (1) each independently represents a sulfo group.

7. The coloring composition according to claim 1, wherein the content of at least one of the compound represented by Formula (1), the compound represented by Formula (2), the compound having the repeating unit represented by Formula (3), or the compound represented by Formula (4) is 1 to 20 mass %.

8. The coloring composition according to claim 1, wherein the content of the betaine compound is 0.01 to 20 mass %.

9. An ink jet recording ink comprising the coloring composition according to claim 1.

10. The ink jet recording ink according to claim 9 comprising a betaine compound, water, and at least one of a compound represented by Formula (1), a compound represented by Formula (2), a compound having a repeating unit represented by Formula (3), or a compound represented by Formula (4),
wherein the total mass of inorganic ions in the ink jet recording ink is 2 mass % or lower with respect to the mass of the ink jet recording ink.

11. An ink jet recording method comprising forming an image using the ink jet recording ink according to claim 9.

12. An ink jet recording method comprising forming an image using the coloring composition according to claim 1.

13. The coloring composition according to claim 1, wherein, in Formula (1) and Formula (2), $X^1$ and $X^2$ each independently represents a hydroxyl group, a substituted or unsubstituted alkoxy group, a substituted or unsubstituted aryloxy group, a substituted or unsubstituted heterocyclic oxy group, a substituted or unsubstituted alkylamino group, a substituted or unsubstituted arylamino group, a substituted or unsubstituted heterylamino group, a substituted or unsubstituted acyloxy group, a substituted or unsubstituted aminocarbonyloxy group, a substituted or unsubstituted sulfonylamino group, a substituted or unsubstituted alkoxycarbonylamino group, a substituted or unsubstituted aryloxycarbonylamino group, a substituted or unsubstituted ureido group, a substituted or unsubstituted alkylthio group, or a substituted or unsubstituted arylthio group.

* * * * *